(12) United States Patent
Gruber et al.

(10) Patent No.: US 11,321,116 B2
(45) Date of Patent: *May 3, 2022

(54) SYSTEMS AND METHODS FOR INTEGRATING THIRD PARTY SERVICES WITH A DIGITAL ASSISTANT

(71) Applicant: Apple Inc., Cupertino, CA (US)

(72) Inventors: Thomas R. Gruber, Seattle, WA (US); Christopher D. Brigham, San Jose, CA (US); Adam J. Cheyer, Oakland, CA (US); Daniel Keen, San Jose, CA (US); Kenneth Kocienda, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,962

(22) Filed: Jun. 22, 2021

(65) Prior Publication Data
US 2021/0318901 A1    Oct. 14, 2021

Related U.S. Application Data

(63) Continuation of application No. 16/532,930, filed on Aug. 6, 2019, which is a continuation of application (Continued)

(51) Int. Cl.
*G06F 9/48* (2006.01)
*G06F 9/50* (2006.01)
(Continued)

(52) U.S. Cl.
CPC ............. *G06F 9/46* (2013.01); *G06F 9/4806* (2013.01); *G06F 9/4843* (2013.01); (Continued)

(58) Field of Classification Search
CPC . G06F 9/46; G06F 9/48; G06F 9/4806; G06F 9/4843; G06F 9/4881; G06F 9/50; (Continued)

(56) References Cited

U.S. PATENT DOCUMENTS 6,401,085 B1    6/2002   Gershman et al.
6,446,004 B1    9/2002   Cao et al.
(Continued)

FOREIGN PATENT DOCUMENTS

AU    2009225364 A1    5/2010
AU    2014100581 B4    9/2014
(Continued)

OTHER PUBLICATIONS

Li et al, "A Probabilistic Topic-Based Ranking Framework for Location-Sensitive Domain Information Retrieval", SIGIR'09, Jul. 19-23, 2009, Boston MA, ACM, pp. 331-338 (Year: 2009).*

(Continued)

*Primary Examiner* — Charles M Swift
(74) *Attorney, Agent, or Firm* — Dentons Us LLP

(57) ABSTRACT

The electronic device with one or more processors and memory receives an input of a user. The electronic device, in accordance with the input, identifies a respective task type from a plurality of predefined task types associated with a plurality of third party service providers. The respective task type is associated with at least one third party service provider for which the user is authorized and at least one third party service provider for which the user is not authorized. In response to identifying the respective task type, the electronic device sends a request to perform at least a portion of a task to a third party service provider of the plurality of third party service providers that is associated with the respective task type.

33 Claims, 7 Drawing Sheets

Related U.S. Application Data

No. 13/894,350, filed on May 14, 2013, now Pat. No. 10,417,037.

(60) Provisional application No. 61/799,916, filed on Mar. 15, 2013, provisional application No. 61/647,434, filed on May 15, 2012.

(51) Int. Cl.
| | | |
|---|---|---|
| *G06F 9/46* | (2006.01) | |
| *H04W 4/00* | (2018.01) | |
| *G10L 15/00* | (2013.01) | |
| *G06Q 10/10* | (2012.01) | |
| *H04W 4/02* | (2018.01) | |
| *H04W 4/021* | (2018.01) | |
| *H04W 4/029* | (2018.01) | |

(52) U.S. Cl.
CPC .......... *G06F 9/4856* (2013.01); *G06F 9/4881* (2013.01); *G06F 9/50* (2013.01); *G06F 9/5005* (2013.01); *G06F 9/5027* (2013.01); *G06Q 10/10* (2013.01); *G10L 15/00* (2013.01); *H04W 4/00* (2013.01); *H04W 4/02* (2013.01); *H04W 4/021* (2013.01); *H04W 4/022* (2013.01); *H04W 4/023* (2013.01); *H04W 4/029* (2018.02)

(58) Field of Classification Search
CPC ..... G06F 9/5005; G06F 9/5027; G06Q 10/10; H04W 4/00; H04W 4/02; H04W 4/021; H04W 4/022; H04W 4/023; H04W 4/029
See application file for complete search history.

(56) References Cited

U.S. PATENT DOCUMENTS

| | | | |
|---|---|---|---|
| 6,493,712 B1 | 12/2002 | Karp et al. |
| 7,013,308 B1 | 3/2006 | Tunstall-Pedoe |
| 7,036,128 B1 | 4/2006 | Julia et al. |
| 7,539,619 B1 | 5/2009 | Seligman et al. |
| 7,584,278 B2 | 9/2009 | Rajarajan et al. |
| 7,865,817 B2 | 1/2011 | Ryan et al. |
| 7,869,998 B1 | 1/2011 | Fabbrizio et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,523 B2 | 1/2011 | Potter et al. |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,101 B2 | 2/2011 | Yokota |
| 7,889,184 B2 | 2/2011 | Blumenberg et al. |
| 7,889,185 B2 | 2/2011 | Blumenberg et al. |
| 7,890,329 B2 | 2/2011 | Wu et al. |
| 7,890,330 B2 | 2/2011 | Ozkaragoz et al. |
| 7,890,652 B2 | 2/2011 | Bull et al. |
| 7,895,039 B2 | 2/2011 | Braho et al. |
| 7,895,531 B2 | 2/2011 | Radtke et al. |
| 7,899,666 B2 | 3/2011 | Varone |
| 7,904,297 B2 | 3/2011 | Mirkovic et al. |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,364 B2 | 3/2011 | Yacoub |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,924,286 B2 | 4/2011 | Ostermann et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,933,399 B2 | 4/2011 | Knott et al. |
| 7,936,339 B2 | 5/2011 | Marggraff et al. |
| 7,936,861 B2 | 5/2011 | Knott et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,109 B2 | 5/2011 | Ostermann et al. |
| 7,949,529 B2 | 5/2011 | Weider et al. |
| 7,949,534 B2 | 5/2011 | Davis et al. |
| 7,949,752 B2 | 5/2011 | White et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,176 B2 | 7/2011 | Latzina et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,001,125 B1 | 8/2011 | Magdalin et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,010,367 B2 | 8/2011 | Muschett et al. |
| 8,010,614 B1 | 8/2011 | Musat et al. |
| 8,014,308 B2 | 9/2011 | Gates, III et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,018,455 B2 | 9/2011 | Shuster |
| 8,019,271 B1 | 9/2011 | Izdepski |
| 8,019,604 B2 | 9/2011 | Ma |
| 8,020,104 B2 | 9/2011 | Robarts et al. |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,032,409 B1 | 10/2011 | Mikurak |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |

(56) References Cited

U.S. PATENT DOCUMENTS

| | | |
|---|---|---|
| 8,042,053 B2 | 10/2011 | Darwish et al. |
| 8,046,231 B2 | 10/2011 | Hirota et al. |
| 8,046,363 B2 | 10/2011 | Cha et al. |
| 8,046,374 B1 | 10/2011 | Bromwich |
| 8,050,500 B1 | 11/2011 | Batty et al. |
| 8,050,919 B2 | 11/2011 | Das |
| 8,054,180 B1 | 11/2011 | Scofield et al. |
| 8,055,296 B1 | 11/2011 | Persson et al. |
| 8,055,502 B2 | 11/2011 | Clark et al. |
| 8,055,708 B2 | 11/2011 | Chitsaz et al. |
| 8,056,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,078,978 B2 | 12/2011 | Perry et al. |
| 8,082,153 B2 | 12/2011 | Coffman et al. |
| 8,082,498 B2 | 12/2011 | Salamon et al. |
| 8,086,751 B1 | 12/2011 | Ostermann et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,103,947 B2 | 1/2012 | Lunt et al. |
| 8,107,401 B2 | 1/2012 | John et al. |
| 8,112,275 B2 | 2/2012 | Kennewick et al. |
| 8,112,280 B2 | 2/2012 | Lu |
| 8,115,772 B2 | 2/2012 | Ostermann et al. |
| 8,117,026 B2 | 2/2012 | Lee et al. |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,368 B2 | 3/2012 | Eggenberger et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,156,060 B2 | 4/2012 | Borzestowski et al. |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,170,966 B1 | 5/2012 | Musat et al. |
| 8,171,137 B1 | 5/2012 | Parks et al. |
| 8,175,872 B2 | 5/2012 | Kristjansson et al. |
| 8,175,876 B2 | 5/2012 | Bou-ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,194,827 B2 | 6/2012 | Jaiswal et al. |
| 8,195,460 B2 | 6/2012 | Degani et al. |
| 8,195,467 B2 | 6/2012 | Mozer et al. |
| 8,195,468 B2 | 6/2012 | Weider et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,177 B2 | 6/2012 | Sakuma et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,555 B1 | 7/2012 | Mianji |
| 8,219,608 B2 | 7/2012 | alSafadi et al. |
| 8,224,649 B2 | 7/2012 | Chaudhari et al. |
| 8,224,757 B2 | 7/2012 | Bohle |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,545 B2 | 8/2012 | Paek et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,117 B1 | 9/2012 | Xu et al. |
| 8,260,247 B2 | 9/2012 | Lazaridis et al. |
| 8,260,617 B2 | 9/2012 | Dhanakshirur et al. |
| 8,260,619 B1 | 9/2012 | Bansal et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,275,736 B2 | 9/2012 | Guo et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,285,737 B1 | 10/2012 | Lynn et al. |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati |
| 8,326,627 B2 | 12/2012 | Kennewick et al. |
| 8,332,205 B2 | 12/2012 | Krishnan et al. |
| 8,332,218 B2 | 12/2012 | Cross, Jr. et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,346,757 B1 | 1/2013 | Lamping et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |

(56) References Cited

U.S. PATENT DOCUMENTS

| | | |
|---|---|---|
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka et al. |
| 8,391,844 B2 | 3/2013 | Novick et al. |
| 8,396,714 B2 | 3/2013 | Rogers et al. |
| 8,396,715 B2 | 3/2013 | Odell et al. |
| 8,401,163 B1 | 3/2013 | Kirchhoff et al. |
| 8,406,745 B1 | 3/2013 | Upadhyay et al. |
| 8,407,239 B2 | 3/2013 | Dean et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,434,133 B2 | 4/2013 | Kulkarni et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,452,602 B1 | 5/2013 | Bringert et al. |
| 8,453,058 B1 | 5/2013 | Coccaro et al. |
| 8,457,959 B2 | 6/2013 | Kaiser |
| 8,458,115 B2 | 6/2013 | Cai et al. |
| 8,458,278 B2 | 6/2013 | Christie et al. |
| 8,463,592 B2 | 6/2013 | Lu et al. |
| 8,464,150 B2 | 6/2013 | Davidson et al. |
| 8,473,289 B2 | 6/2013 | Jitkoff et al. |
| 8,473,485 B2 | 6/2013 | Wong et al. |
| 8,477,323 B2 | 7/2013 | Low et al. |
| 8,478,816 B2 | 7/2013 | Parks et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,514,197 B2 | 8/2013 | Shahraray et al. |
| 8,515,736 B1 | 8/2013 | Duta |
| 8,515,750 B1 | 8/2013 | Lei et al. |
| 8,521,513 B2 | 8/2013 | Millett et al. |
| 8,521,526 B1 | 8/2013 | Lloyd et al. |
| 8,521,531 B1 | 8/2013 | Kim |
| 8,521,533 B1 | 8/2013 | Ostermann et al. |
| 8,527,276 B1 | 9/2013 | Senior et al. |
| 8,533,266 B2 | 9/2013 | Koulomzin et al. |
| 8,537,033 B2 | 9/2013 | Gueziec |
| 8,539,342 B1 | 9/2013 | Lewis |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,560,366 B2 | 10/2013 | Mikurak |
| 8,571,528 B1 | 10/2013 | Channakeshava |
| 8,571,851 B1 | 10/2013 | Tickner et al. |
| 8,577,683 B2 | 11/2013 | Dewitt |
| 8,583,416 B2 | 11/2013 | Huang et al. |
| 8,583,511 B2 | 11/2013 | Hendrickson |
| 8,583,638 B2 | 11/2013 | Donelli |
| 8,589,156 B2 | 11/2013 | Burke et al. |
| 8,589,161 B2 | 11/2013 | Kennewick et al. |
| 8,589,374 B2 | 11/2013 | Chaudhari |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,606,577 B1 | 12/2013 | Stewart et al. |
| 8,615,221 B1 | 12/2013 | Cosenza et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,630,841 B2 | 1/2014 | Van Caldwell et al. |
| 8,635,073 B2 | 1/2014 | Chang |
| 8,638,363 B2 | 1/2014 | King et al. |
| 8,639,516 B2 | 1/2014 | Lindahl et al. |
| 8,645,128 B1 | 2/2014 | Agiomyrgiannakis |
| 8,645,137 B2 | 2/2014 | Bellegarda et al. |
| 8,645,138 B1 | 2/2014 | Weinstein et al. |
| 8,654,936 B1 | 2/2014 | Eslambolchi et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,924 B2 | 2/2014 | Hoch et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,273 B1 | 3/2014 | Fujisaki |
| 8,676,904 B2 | 3/2014 | Lindahl |
| 8,677,377 B2 | 3/2014 | Cheyer et al. |
| 8,681,950 B2 | 3/2014 | Vlack et al. |
| 8,682,667 B2 | 3/2014 | Haughay |
| 8,687,777 B1 | 4/2014 | Lavian et al. |
| 8,688,446 B2 | 4/2014 | Yanagihara |
| 8,688,453 B1 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |
| 8,713,418 B2 | 4/2014 | King et al. |
| 8,719,006 B2 | 5/2014 | Bellegarda |
| 8,719,014 B2 | 5/2014 | Wagner |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Davis et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen |
| 8,762,469 B2 | 6/2014 | Lindahl |
| 8,768,693 B2 | 7/2014 | Somekh et al. |
| 8,768,702 B2 | 7/2014 | Mason et al. |
| 8,775,154 B2 | 7/2014 | Clinchant et al. |
| 8,775,177 B1 | 7/2014 | Heigold et al. |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara |
| 8,799,000 B2 | 8/2014 | Guzzoni et al. |
| 8,805,690 B1 | 8/2014 | Lebeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,823,793 B2 | 9/2014 | Clayton et al. |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottier et al. |
| 8,868,111 B1 | 10/2014 | Kahn et al. |
| 8,868,409 B1 | 10/2014 | Mengibar et al. |
| 8,868,469 B2 | 10/2014 | Xu et al. |
| 8,868,529 B2 | 10/2014 | Lerenc |

(56) References Cited

U.S. PATENT DOCUMENTS

| | | |
|---|---|---|
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,964,947 B1 | 2/2015 | Noolu et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,984,098 B1 | 3/2015 | Tomkins et al. |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,015,036 B2 | 4/2015 | Karov Zangvil et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-jefri et al. |
| 9,043,208 B2 | 5/2015 | Koch et al. |
| 9,043,211 B2 | 5/2015 | Haiut et al. |
| 9,046,932 B2 | 6/2015 | Medlock et al. |
| 9,049,255 B2 | 6/2015 | Macfarlane et al. |
| 9,049,295 B1 | 6/2015 | Cooper et al. |
| 9,053,706 B2 | 6/2015 | Jitkoff et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,183,845 B1 | 11/2015 | Gopalakrishnan et al. |
| 9,190,062 B2 | 11/2015 | Haughay |
| 9,208,153 B1 | 12/2015 | Zaveri et al. |
| 9,213,754 B1 | 12/2015 | Zhan et al. |
| 9,218,122 B2 | 12/2015 | Thoma et al. |
| 9,218,809 B2 | 12/2015 | Bellegard et al. |
| 9,218,819 B1 | 12/2015 | Stekkelpa et al. |
| 9,223,537 B2 | 12/2015 | Brown et al. |
| 9,230,561 B2 | 1/2016 | Ostermann et al. |
| 9,236,047 B2 | 1/2016 | Rasmussen |
| 9,241,073 B1 | 1/2016 | Rensburg et al. |
| 9,245,151 B2 | 1/2016 | LeBeau et al. |
| 9,251,713 B1 | 2/2016 | Giovanniello et al. |
| 9,251,787 B1 | 2/2016 | Hart et al. |
| 9,255,812 B2 | 2/2016 | Maeoka et al. |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,280,535 B2 | 3/2016 | Varma et al. |
| 9,282,211 B2 | 3/2016 | Osawa |
| 9,286,910 B1 | 3/2016 | Li et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 | 5/2016 | Van Os et al. |
| 9,342,829 B2 | 5/2016 | Zhou et al. |
| 9,349,368 B1 | 5/2016 | Lebeau et al. |
| 9,355,472 B2 | 5/2016 | Kocienda et al. |
| 9,361,084 B1 | 6/2016 | Costa |
| 9,367,541 B1 | 6/2016 | Servan et al. |
| 9,368,114 B2 | 6/2016 | Larson et al. |
| 9,377,871 B2 | 6/2016 | Waddell et al. |
| 9,378,456 B2 | 6/2016 | White et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |
| 9,401,147 B2 | 7/2016 | Jitkoff et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |

(56) References Cited

U.S. PATENT DOCUMENTS

| | | |
|---|---|---|
| 9,465,864 B2 | 10/2016 | Hu et al. |
| 9,466,027 B2 | 10/2016 | Byrne et al. |
| 9,466,294 B1 | 10/2016 | Tunstall-pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,483,529 B1 | 11/2016 | Pasoi et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,516,014 B2 | 12/2016 | Zafiroglu et al. |
| 9,519,453 B2 | 12/2016 | Perkuhn et al. |
| 9,524,355 B2 | 12/2016 | Forbes et al. |
| 9,529,500 B1 | 12/2016 | Gauci et al. |
| 9,531,862 B1 | 12/2016 | Vadodaria |
| 9,535,906 B2 | 1/2017 | Lee et al. |
| 9,536,527 B1 | 1/2017 | Carlson |
| 9,536,544 B2 | 1/2017 | Osterman et al. |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,575,964 B2 | 2/2017 | Yadgar et al. |
| 9,576,575 B2 | 2/2017 | Heide |
| 9,578,173 B2 | 2/2017 | Sanghavi et al. |
| 9,607,612 B2 | 3/2017 | Deleeuw |
| 9,612,999 B2 | 4/2017 | Prakah-asante et al. |
| 9,619,200 B2 | 4/2017 | Chakladar et al. |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,633,674 B2 | 4/2017 | Sinha |
| 9,648,107 B1 | 5/2017 | Penilla et al. |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 | 5/2017 | Lynch et al. |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,672,822 B2 | 6/2017 | Brown et al. |
| 9,691,378 B1 | 6/2017 | Meyers et al. |
| 9,697,822 B1 | 7/2017 | Naik et al. |
| 9,697,827 B1 | 7/2017 | Lilly et al. |
| 9,698,999 B2 | 7/2017 | Mutagi |
| 9,720,907 B2 | 8/2017 | Bangalore et al. |
| 9,721,566 B2 | 8/2017 | Newendorp et al. |
| 9,721,570 B1 | 8/2017 | Beal et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,755,605 B1 | 9/2017 | Li et al. |
| 9,760,566 B2 | 9/2017 | Heck et al. |
| 9,767,710 B2 | 9/2017 | Lee et al. |
| 9,772,994 B2 | 9/2017 | Karov et al. |
| 9,786,271 B1 | 10/2017 | Combs et al. |
| 9,792,907 B2 | 10/2017 | Bocklet et al. |
| 9,798,719 B2 | 10/2017 | Karov et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,824,379 B2 | 11/2017 | Khandelwal et al. |
| 9,824,691 B1 | 11/2017 | Montero et al. |
| 9,830,044 B2 | 11/2017 | Brown et al. |
| 9,830,449 B1 | 11/2017 | Wagner |
| 9,842,168 B2 | 12/2017 | Heck et al. |
| 9,842,584 B1 | 12/2017 | Hart et al. |
| 9,846,685 B2 | 12/2017 | Li |
| 9,846,836 B2 | 12/2017 | Gao et al. |
| 9,858,925 B2 | 1/2018 | Gruber et al. |
| 9,858,927 B2 | 1/2018 | Williams et al. |
| 9,886,953 B2 | 2/2018 | Lemay et al. |
| 9,887,949 B2 | 2/2018 | Shepherd et al. |
| 9,916,839 B1 | 3/2018 | Scalise et al. |
| 9,922,642 B2 | 3/2018 | Pitschel et al. |
| 9,934,777 B1 | 4/2018 | Joseph et al. |
| 9,934,785 B1 | 4/2018 | Hulaud |
| 9,946,862 B2 | 4/2018 | Yun et al. |
| 9,948,728 B2 | 4/2018 | Linn et al. |
| 9,959,129 B2 | 5/2018 | Kannan et al. |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,984,686 B1 | 5/2018 | Mutagi et al. |
| 9,986,419 B2 | 5/2018 | Naik et al. |
| 9,990,129 B2 | 6/2018 | Yang et al. |
| 9,990,176 B1 | 6/2018 | Gray |
| 9,998,552 B1 | 6/2018 | Ledet |
| 10,001,817 B2 | 6/2018 | Zambetti et al. |
| 10,013,416 B1 | 7/2018 | Bhardwaj et al. |
| 10,013,654 B1 | 7/2018 | Levy et al. |
| 10,013,979 B1 | 7/2018 | Roma et al. |
| 10,019,436 B2 | 7/2018 | Huang |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,049,161 B2 | 8/2018 | Kaneko |
| 10,049,663 B2 | 8/2018 | Orr et al. |
| 10,049,668 B2 | 8/2018 | Huang et al. |
| 10,055,390 B2 | 8/2018 | Sharifi et al. |
| 10,055,681 B2 | 8/2018 | Brown et al. |
| 10,074,360 B2 | 9/2018 | Kim |
| 10,074,371 B1 | 9/2018 | Wang et al. |
| 10,078,487 B2 | 9/2018 | Gruber et al. |
| 10,083,213 B1 | 9/2018 | Podgorny et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,115,055 B2 | 10/2018 | Weiss et al. |
| 10,127,901 B2 | 11/2018 | Zhao et al. |
| 10,127,908 B1 | 11/2018 | Deller et al. |
| 10,134,425 B1 | 11/2018 | Johnson, Jr. |
| 10,135,965 B2 | 11/2018 | Woolsey et al. |
| 10,169,329 B2 | 1/2019 | Futrell et al. |
| 10,170,123 B2 | 1/2019 | Orr et al. |
| 10,170,135 B1 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,176,808 B1 | 1/2019 | Lovitt et al. |
| 10,178,301 B1 | 1/2019 | Welbourne et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |
| 10,192,557 B2 | 1/2019 | Lee et al. |
| 10,199,051 B2 | 2/2019 | Binder et al. |
| 10,200,824 B2 | 2/2019 | Gross et al. |
| 10,210,860 B1 | 2/2019 | Ward et al. |
| 10,216,351 B2 | 2/2019 | Yang |
| 10,216,832 B2 | 2/2019 | Bangalore et al. |

(56) References Cited

U.S. PATENT DOCUMENTS

| | | |
|---|---|---|
| 10,223,066 B2 | 3/2019 | Martel et al. |
| 10,225,711 B2 | 3/2019 | Parks et al. |
| 10,229,356 B1 | 3/2019 | Liu et al. |
| 10,237,711 B2 | 3/2019 | Linn et al. |
| 10,248,308 B2 | 4/2019 | Karunamuni et al. |
| 10,249,300 B2 | 4/2019 | Booker et al. |
| 10,255,922 B1 | 4/2019 | Sharifi et al. |
| 10,261,830 B2 | 4/2019 | Gupta et al. |
| 10,269,345 B2 | 4/2019 | Castillo Sanchez et al. |
| 10,275,513 B1 | 4/2019 | Cowan et al. |
| 10,289,205 B1 | 5/2019 | Sumter et al. |
| 10,296,160 B2 | 5/2019 | Shah et al. |
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |
| 10,311,871 B2 | 6/2019 | Newendorp et al. |
| 10,325,598 B2 | 6/2019 | Basye et al. |
| 10,332,513 B1 | 6/2019 | D'souza et al. |
| 10,332,518 B2 | 6/2019 | Garg et al. |
| 10,339,224 B2 | 7/2019 | Fukuoka |
| 10,346,540 B2 | 7/2019 | Karov et al. |
| 10,346,753 B2 | 7/2019 | Soon-Shiong et al. |
| 10,346,878 B1 | 7/2019 | Ostermann et al. |
| 10,353,975 B2 | 7/2019 | Oh et al. |
| 10,354,677 B2 | 7/2019 | Mohamed et al. |
| 10,356,243 B2 | 7/2019 | Sanghavi et al. |
| 10,360,716 B1 | 7/2019 | Van Der Meulen et al. |
| 10,365,887 B1 | 7/2019 | Mulherkar |
| 10,366,160 B2 | 7/2019 | Castelli et al. |
| 10,366,692 B1 | 7/2019 | Adams et al. |
| 10,372,814 B2 | 8/2019 | Gliozzo et al. |
| 10,372,881 B2 | 8/2019 | Ingrassia, Jr. et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,409,454 B2 | 9/2019 | Kagan et al. |
| 10,410,637 B2 | 9/2019 | Paulik et al. |
| 10,417,037 B2 | 9/2019 | Gruber et al. |
| 10,417,344 B2 | 9/2019 | Futrell et al. |
| 10,417,554 B2 | 9/2019 | Scheffler |
| 10,446,142 B2 | 10/2019 | Lim et al. |
| 10,453,117 B1 | 10/2019 | Reavely et al. |
| 10,469,665 B1 | 11/2019 | Bell et al. |
| 10,474,961 B2 | 11/2019 | Brigham et al. |
| 10,482,875 B2 | 11/2019 | Henry |
| 10,496,364 B2 | 12/2019 | Yao |
| 10,496,705 B1 | 12/2019 | Irani et al. |
| 10,497,365 B2 | 12/2019 | Gruber et al. |
| 10,504,518 B1 | 12/2019 | Irani et al. |
| 10,521,946 B1 | 12/2019 | Roche et al. |
| 10,528,386 B2 | 1/2020 | Yu |
| 10,566,007 B2 | 2/2020 | Fawaz et al. |
| 10,568,032 B2 | 2/2020 | Freeman et al. |
| 10,580,409 B2 | 3/2020 | Walker, II et al. |
| 10,582,355 B1 | 3/2020 | Lebeau et al. |
| 10,585,957 B2 | 3/2020 | Heck et al. |
| 10,586,369 B1 | 3/2020 | Roche et al. |
| 10,629,186 B1 | 4/2020 | Slifka |
| 10,630,795 B2 | 4/2020 | Aoki et al. |
| 10,642,934 B2 | 5/2020 | Heck et al. |
| 10,659,851 B2 | 5/2020 | Lister et al. |
| 10,671,428 B2 | 6/2020 | Zeitlin |
| 10,706,841 B2 | 7/2020 | Gruber et al. |
| 10,721,190 B2 | 7/2020 | Zhao et al. |
| 10,732,708 B1 | 8/2020 | Roche et al. |
| 10,755,032 B2 | 8/2020 | Douglas et al. |
| 10,757,499 B1 | 8/2020 | Vautrin et al. |
| 10,769,385 B2 | 9/2020 | Evermann |
| 10,783,151 B1 | 9/2020 | Bushkin et al. |
| 10,783,883 B2 | 9/2020 | Mixter et al. |
| 10,791,176 B2 | 9/2020 | Phipps et al. |
| 10,795,944 B2 | 10/2020 | Brown et al. |
| 10,796,100 B2 | 10/2020 | Bangalore et al. |
| 10,803,255 B2 | 10/2020 | Dubyak et al. |
| 10,811,013 B1 | 10/2020 | Secker-Walker et al. |
| 10,842,968 B1 | 11/2020 | Kahn et al. |
| 10,846,618 B2 | 11/2020 | Ravi et al. |
| 10,860,629 B1 | 12/2020 | Gangadharaiah et al. |
| 10,885,277 B2 | 1/2021 | Ravi et al. |
| 10,957,311 B2 | 3/2021 | Solomon et al. |
| 10,974,139 B2 | 4/2021 | Feder et al. |
| 10,978,090 B2 | 4/2021 | Binder et al. |
| 11,037,565 B2 | 6/2021 | Kudurshian et al. |
| 11,061,543 B1 | 7/2021 | Blatz et al. |
| 2003/0187775 A1 | 10/2003 | Du et al. |
| 2004/0203847 A1 | 10/2004 | Knauerhase et al. |
| 2005/0075875 A1 | 4/2005 | Shozakai et al. |
| 2005/0165015 A1 | 7/2005 | Ncube et al. |
| 2005/0246726 A1 | 11/2005 | Labrou et al. |
| 2006/0165105 A1 | 7/2006 | Shenfield et al. |
| 2007/0032247 A1 | 2/2007 | Shaffer et al. |
| 2007/0240172 A1 | 10/2007 | Banker et al. |
| 2009/0138430 A1 | 5/2009 | Nambiar et al. |
| 2009/0234655 A1 | 9/2009 | Kwon |
| 2009/0252305 A1 | 10/2009 | Rohde et al. |
| 2010/0066546 A1 | 3/2010 | Aaron |
| 2010/0100825 A1 | 4/2010 | Sharoni |
| 2010/0302056 A1 | 12/2010 | Dutton et al. |
| 2011/0002487 A1 | 1/2011 | Panther et al. |
| 2011/0004475 A1 | 1/2011 | Bellegarda |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0018870 A1 | 1/2011 | Shuster |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Wäller et al. |
| 2011/0022394 A1 | 1/2011 | Wide |
| 2011/0022472 A1 | 1/2011 | Zon |
| 2011/0022952 A1 | 1/2011 | Wu et al. |
| 2011/0028083 A1 | 2/2011 | Soitis |
| 2011/0029616 A1 | 2/2011 | Wang et al. |
| 2011/0029637 A1 | 2/2011 | Morse |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0039584 A1 | 2/2011 | Merrett |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047246 A1 | 2/2011 | Frissora et al. |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055244 A1 | 3/2011 | Donelli |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg |
| 2011/0060807 A1 | 3/2011 | Martin et al. |
| 2011/0060812 A1 | 3/2011 | Middleton |
| 2011/0064378 A1 | 3/2011 | Gharaat et al. |
| 2011/0064387 A1 | 3/2011 | Mendeloff et al. |
| 2011/0064388 A1 | 3/2011 | Brown et al. |
| 2011/0065456 A1 | 3/2011 | Brennan et al. |
| 2011/0066366 A1 | 3/2011 | Ellanti et al. |
| 2011/0066436 A1 | 3/2011 | Bezar |

(56) References Cited

U.S. PATENT DOCUMENTS

| | | |
|---|---|---|
| 2011/0066468 A1 | 3/2011 | Huang et al. |
| 2011/0066602 A1 | 3/2011 | Studer et al. |
| 2011/0066634 A1 | 3/2011 | Phillips et al. |
| 2011/0072033 A1 | 3/2011 | White et al. |
| 2011/0072114 A1 | 3/2011 | Hoffert et al. |
| 2011/0072492 A1 | 3/2011 | Mohler et al. |
| 2011/0075818 A1 | 3/2011 | Vance et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard |
| 2011/0093272 A1 | 4/2011 | Isobe et al. |
| 2011/0099000 A1 | 4/2011 | Rai et al. |
| 2011/0099157 A1 | 4/2011 | LeBeau et al. |
| 2011/0102161 A1 | 5/2011 | Heubel et al. |
| 2011/0103682 A1 | 5/2011 | Chidlovskii et al. |
| 2011/0105097 A1 | 5/2011 | Tadayon et al. |
| 2011/0106534 A1 | 5/2011 | Lebeau et al. |
| 2011/0106536 A1 | 5/2011 | Klappert |
| 2011/0106736 A1 | 5/2011 | Aharonson et al. |
| 2011/0106878 A1 | 5/2011 | Cho et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Bellegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116480 A1 | 5/2011 | Li et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119713 A1 | 5/2011 | Chang et al. |
| 2011/0119715 A1 | 5/2011 | Chang et al. |
| 2011/0123004 A1 | 5/2011 | Chang et al. |
| 2011/0123100 A1 | 5/2011 | Carroll et al. |
| 2011/0125498 A1 | 5/2011 | Pickering et al. |
| 2011/0125540 A1 | 5/2011 | Jang et al. |
| 2011/0125701 A1 | 5/2011 | Nair et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0137664 A1 | 6/2011 | Kho et al. |
| 2011/0141141 A1 | 6/2011 | Kankainen |
| 2011/0143718 A1 | 6/2011 | Engelhart, Sr. |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151415 A1 | 6/2011 | Darling et al. |
| 2011/0151830 A1 | 6/2011 | Blanda, Jr. et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153325 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0166855 A1 | 7/2011 | Vermeulen et al. |
| 2011/0166862 A1 | 7/2011 | Eshed et al. |
| 2011/0167350 A1 | 7/2011 | Hoellwarth |
| 2011/0173003 A1 | 7/2011 | Levanon et al. |
| 2011/0173537 A1 | 7/2011 | Hemphill |
| 2011/0175810 A1 | 7/2011 | Markovic et al. |
| 2011/0178804 A1 | 7/2011 | Inoue et al. |
| 2011/0179002 A1 | 7/2011 | Dumitru et al. |
| 2011/0179372 A1 | 7/2011 | Moore et al. |
| 2011/0183627 A1 | 7/2011 | Ueda et al. |
| 2011/0183650 A1 | 7/2011 | McKee |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0184789 A1 | 7/2011 | Kirsch |
| 2011/0185288 A1 | 7/2011 | Gupta et al. |
| 2011/0191105 A1 | 8/2011 | Spears |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Dang et al. |
| 2011/0197128 A1 | 8/2011 | Assadollahi |
| 2011/0199312 A1 | 8/2011 | Okuta |
| 2011/0201385 A1 | 8/2011 | Higginbotham |
| 2011/0201387 A1 | 8/2011 | Paek et al. |
| 2011/0202526 A1 | 8/2011 | Lee et al. |
| 2011/0202594 A1 | 8/2011 | Ricci |
| 2011/0202874 A1 | 8/2011 | Ramer et al. |
| 2011/0205149 A1 | 8/2011 | Tom |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0214149 A1 | 9/2011 | Schlacht |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231189 A1 | 9/2011 | Anastasiadis et al. |
| 2011/0231218 A1 | 9/2011 | Tovar |
| 2011/0231432 A1 | 9/2011 | Sata et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1 | 10/2011 | Ohki |
| 2011/0246471 A1 | 10/2011 | Rakib |
| 2011/0246891 A1 | 10/2011 | Schubert et al. |
| 2011/0249144 A1 | 10/2011 | Chang |
| 2011/0250570 A1 | 10/2011 | Mack |
| 2011/0252108 A1 | 10/2011 | Morris et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264530 A1 | 10/2011 | Santangelo et al. |
| 2011/0264643 A1 | 10/2011 | Cao |
| 2011/0264999 A1 | 10/2011 | Bells et al. |
| 2011/0270604 A1 | 11/2011 | Qi et al. |
| 2011/0274303 A1 | 11/2011 | Filson et al. |

(56) References Cited

U.S. PATENT DOCUMENTS

| | | |
|---|---|---|
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0280143 A1 | 11/2011 | Li et al. |
| 2011/0282663 A1 | 11/2011 | Talwar et al. |
| 2011/0282888 A1 | 11/2011 | Koperski et al. |
| 2011/0282903 A1 | 11/2011 | Zhang |
| 2011/0282906 A1 | 11/2011 | Wong |
| 2011/0283189 A1 | 11/2011 | McCarty |
| 2011/0283190 A1 | 11/2011 | Poltorak |
| 2011/0288852 A1 | 11/2011 | Dymetman et al. |
| 2011/0288855 A1 | 11/2011 | Roy |
| 2011/0288861 A1 | 11/2011 | Kurzwei et al. |
| 2011/0288863 A1 | 11/2011 | Rasmussen |
| 2011/0288866 A1 | 11/2011 | Rasmussen |
| 2011/0288917 A1 | 11/2011 | Wanek et al. |
| 2011/0289530 A1 | 11/2011 | Dureau et al. |
| 2011/0295590 A1 | 12/2011 | Lloyd et al. |
| 2011/0298585 A1 | 12/2011 | Barry |
| 2011/0301943 A1 | 12/2011 | Patch |
| 2011/0302162 A1 | 12/2011 | Xiao et al. |
| 2011/0302645 A1 | 12/2011 | Headley |
| 2011/0306426 A1 | 12/2011 | Novak et al. |
| 2011/0307241 A1 | 12/2011 | Waibel et al. |
| 2011/0307254 A1 | 12/2011 | Hunt et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0313803 A1 | 12/2011 | Friend et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0314539 A1 | 12/2011 | Horton |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1* | 1/2012 | Gruber ............... G10L 15/183 704/275 |
| 2012/0019400 A1 | 1/2012 | Patel et al. |
| 2012/0020490 A1 | 1/2012 | Leichter |
| 2012/0020503 A1 | 1/2012 | Endo et al. |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0026395 A1 | 2/2012 | Jin et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0039578 A1 | 2/2012 | Issa et al. |
| 2012/0041752 A1 | 2/2012 | Wang et al. |
| 2012/0041756 A1 | 2/2012 | Hanazawa et al. |
| 2012/0041759 A1 | 2/2012 | Barker et al. |
| 2012/0042014 A1 | 2/2012 | Desai et al. |
| 2012/0042343 A1 | 2/2012 | Laligand et al. |
| 2012/0052945 A1 | 3/2012 | Miyamoto et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0056815 A1 | 3/2012 | Mehra |
| 2012/0059655 A1 | 3/2012 | Cartales |
| 2012/0059813 A1 | 3/2012 | Sejnoha et al. |
| 2012/0060052 A1 | 3/2012 | White et al. |
| 2012/0062473 A1 | 3/2012 | Xiao et al. |
| 2012/0064975 A1 | 3/2012 | Gault et al. |
| 2012/0065972 A1 | 3/2012 | Strifler et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0075184 A1 | 3/2012 | Madhvanath |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084087 A1 | 4/2012 | Yang et al. |
| 2012/0084089 A1 | 4/2012 | Lloyd et al. |
| 2012/0084251 A1 | 4/2012 | Lingenfelder et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0089659 A1 | 4/2012 | Halevi et al. |
| 2012/0094645 A1 | 4/2012 | Jeffrey |
| 2012/0101823 A1 | 4/2012 | Weng et al. |
| 2012/0105257 A1 | 5/2012 | Murillo et al. |
| 2012/0108166 A1 | 5/2012 | Hymel |
| 2012/0108221 A1 | 5/2012 | Thomas et al. |
| 2012/0109632 A1 | 5/2012 | Sugiura et al. |
| 2012/0109753 A1 | 5/2012 | Kennewick et al. |
| 2012/0109997 A1 | 5/2012 | Sparks et al. |
| 2012/0110456 A1 | 5/2012 | Larco et al. |
| 2012/0114108 A1 | 5/2012 | Katis et al. |
| 2012/0116770 A1 | 5/2012 | Chen et al. |
| 2012/0117499 A1 | 5/2012 | Mori et al. |
| 2012/0117590 A1 | 5/2012 | Agnihotri et al. |
| 2012/0124126 A1 | 5/2012 | Alcazar et al. |
| 2012/0124177 A1 | 5/2012 | Sparks |
| 2012/0124178 A1 | 5/2012 | Sparks |
| 2012/0128322 A1 | 5/2012 | Shaffer et al. |
| 2012/0130709 A1 | 5/2012 | Bocchieri et al. |
| 2012/0130995 A1 | 5/2012 | Risvik et al. |
| 2012/0135714 A1 | 5/2012 | King, II |
| 2012/0136529 A1 | 5/2012 | Curtis et al. |
| 2012/0136572 A1 | 5/2012 | Norton |
| 2012/0136649 A1 | 5/2012 | Freising et al. |
| 2012/0136658 A1 | 5/2012 | Shrum, Jr. et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0287067 A1 | 5/2012 | Ikegami |
| 2012/0148077 A1 | 6/2012 | Aldaz et al. |
| 2012/0149342 A1 | 6/2012 | Cohen et al. |
| 2012/0149394 A1 | 6/2012 | Singh et al. |
| 2012/0150532 A1 | 6/2012 | Mirowski et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166177 A1 | 6/2012 | Beld et al. |
| 2012/0166196 A1 | 6/2012 | Ju et al. |
| 2012/0166429 A1 | 6/2012 | Moore et al. |

(56) References Cited

U.S. PATENT DOCUMENTS

| | | |
|---|---|---|
| 2012/0166942 A1 | 6/2012 | Ramerth et al. |
| 2012/0166959 A1 | 6/2012 | Hilerio et al. |
| 2012/0166998 A1 | 6/2012 | Cotterill et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0176255 A1 | 7/2012 | Choi et al. |
| 2012/0179457 A1 | 7/2012 | Newman et al. |
| 2012/0179467 A1 | 7/2012 | Williams et al. |
| 2012/0179471 A1 | 7/2012 | Newman et al. |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0185803 A1 | 7/2012 | Wang et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197967 A1 | 8/2012 | Sivavakeesar |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0203767 A1 | 8/2012 | Williams et al. |
| 2012/0209454 A1 | 8/2012 | Miller et al. |
| 2012/0209654 A1 | 8/2012 | Romagnino et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0210378 A1 | 8/2012 | Mccoy et al. |
| 2012/0214141 A1 | 8/2012 | Raya et al. |
| 2012/0214517 A1 | 8/2012 | Singh et al. |
| 2012/0215640 A1 | 8/2012 | Ramer et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl |
| 2012/0233207 A1 | 9/2012 | Mohajer |
| 2012/0233266 A1 | 9/2012 | Hassan et al. |
| 2012/0233280 A1 | 9/2012 | Ebara |
| 2012/0239403 A1 | 9/2012 | Cano et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0262296 A1 | 10/2012 | Bezar |
| 2012/0265482 A1 | 10/2012 | Grokop et al. |
| 2012/0265528 A1 | 10/2012 | Gruber et al. |
| 2012/0265535 A1 | 10/2012 | Bryant-Rich et al. |
| 2012/0265787 A1 | 10/2012 | Hsu et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0278744 A1 | 11/2012 | Kozitsyn et al. |
| 2012/0278812 A1 | 11/2012 | Wang |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0290657 A1 | 11/2012 | Parks et al. |
| 2012/0290680 A1 | 11/2012 | Hwang |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297341 A1 | 11/2012 | Glazer et al. |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0304239 A1 | 11/2012 | Shahraray et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O"Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316774 A1 | 12/2012 | Yariv et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0316955 A1 | 12/2012 | Panguluri et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0323560 A1 | 12/2012 | Perez Cortes et al. |
| 2012/0323933 A1 | 12/2012 | He et al. |
| 2012/0324391 A1 | 12/2012 | Tocci |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0018659 A1 | 1/2013 | Chi |
| 2013/0018863 A1 | 1/2013 | Regan et al. |
| 2013/0024277 A1 | 1/2013 | Tuchman et al. |
| 2013/0024576 A1 | 1/2013 | Dishneau et al. |
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagkos et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0176208 A1 | 1/2013 | Tanaka et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0038437 A1 | 2/2013 | Talati et al. |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |

(56) References Cited

U.S. PATENT DOCUMENTS

| | | |
|---|---|---|
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0060571 A1 | 3/2013 | Soemo et al. |
| 2013/0061139 A1 | 3/2013 | Mahkovec et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0073676 A1 | 3/2013 | Cockcroft |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0082967 A1 | 4/2013 | Hillis et al. |
| 2013/0084882 A1 | 4/2013 | Khorashadi et al. |
| 2013/0085755 A1 | 4/2013 | Bringert et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | LeBeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0107053 A1 | 5/2013 | Ozaki |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0124672 A1 | 5/2013 | Pan |
| 2013/0125168 A1 | 5/2013 | Agnihotri et al. |
| 2013/0130669 A1 | 5/2013 | Xiao et al. |
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore |
| 2013/0151258 A1 | 6/2013 | Chandrasekar et al. |
| 2013/0151339 A1 | 6/2013 | Kim et al. |
| 2013/0152092 A1 | 6/2013 | Yadgar |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottler et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0173610 A1 | 7/2013 | Hu et al. |
| 2013/0174034 A1 | 7/2013 | Brown et al. |
| 2013/0176147 A1 | 7/2013 | Anderson et al. |
| 2013/0176244 A1 | 7/2013 | Yamamoto et al. |
| 2013/0176592 A1 | 7/2013 | Sasaki |
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0179806 A1 | 7/2013 | Bastide et al. |
| 2013/0183942 A1 | 7/2013 | Novick et al. |
| 2013/0183944 A1 | 7/2013 | Mozer et al. |
| 2013/0185059 A1 | 7/2013 | Riccardi |
| 2013/0185066 A1 | 7/2013 | Tzirkel-hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0212501 A1 | 8/2013 | Anderson et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0225128 A1 | 8/2013 | Gomar |
| 2013/0226935 A1 | 8/2013 | Bai et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar |
| 2013/0238326 A1 | 9/2013 | Kim et al. |
| 2013/0238540 A1 | 9/2013 | O'donoghue et al. |
| 2013/0238647 A1 | 9/2013 | Thompson |
| 2013/0238729 A1 | 9/2013 | Holzman et al. |
| 2013/0244615 A1 | 9/2013 | Miller |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0260739 A1 | 10/2013 | Saino |

(56) References Cited

U.S. PATENT DOCUMENTS

| | | |
|---|---|---|
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275136 A1 | 10/2013 | Czahor |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0288722 A1 | 10/2013 | Ramanujam et al. |
| 2013/0289991 A1 | 10/2013 | Eshwar et al. |
| 2013/0289993 A1 | 10/2013 | Rao |
| 2013/0289994 A1 | 10/2013 | Newman et al. |
| 2013/0290905 A1 | 10/2013 | Luvogt et al. |
| 2013/0291015 A1 | 10/2013 | Pan |
| 2013/0297078 A1 | 11/2013 | Kolavennu |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304476 A1 | 11/2013 | Kim et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318478 A1 | 11/2013 | Ogura |
| 2013/0321267 A1 | 12/2013 | Bhatti et al. |
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325844 A1 | 12/2013 | Plaisant |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0326576 A1 | 12/2013 | Zhang et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332113 A1 | 12/2013 | Piemonte et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0332721 A1 | 12/2013 | Chaudhri et al. |
| 2013/0339256 A1 | 12/2013 | Shroff |
| 2013/0339454 A1 | 12/2013 | Walker et al. |
| 2013/0339991 A1 | 12/2013 | Ricci |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346065 A1 | 12/2013 | Davidson et al. |
| 2013/0346068 A1 | 12/2013 | Solem et al. |
| 2013/0346347 A1 | 12/2013 | Patterson et al. |
| 2013/0347018 A1 | 12/2013 | Limp et al. |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |
| 2014/0002338 A1 | 1/2014 | Raffa et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006028 A1 | 1/2014 | Hu |
| 2014/0006030 A1 | 1/2014 | Fleizach et al. |
| 2014/0006153 A1 | 1/2014 | Thangam et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0006951 A1 | 1/2014 | Hunter |
| 2014/0006955 A1 | 1/2014 | Greenzeiger et al. |
| 2014/0008163 A1 | 1/2014 | Mikonaho et al. |
| 2014/0012574 A1 | 1/2014 | Pasupalak et al. |
| 2014/0012580 A1 | 1/2014 | Ganong, III et al. |
| 2014/0012586 A1 | 1/2014 | Rubin et al. |
| 2014/0012587 A1 | 1/2014 | Park |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028029 A1 | 1/2014 | Jochman |
| 2014/0028477 A1 | 1/2014 | Michalske |
| 2014/0028735 A1 | 1/2014 | Williams et al. |
| 2014/0032453 A1 | 1/2014 | Eustice et al. |
| 2014/0032678 A1 | 1/2014 | Koukoumidis et al. |
| 2014/0033071 A1 | 1/2014 | Gruber et al. |
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040918 A1 | 2/2014 | Li |
| 2014/0040961 A1 | 2/2014 | Green et al. |
| 2014/0046934 A1 | 2/2014 | Zhou et al. |
| 2014/0047001 A1 | 2/2014 | Phillips et al. |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0068751 A1 | 3/2014 | Last |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074482 A1 | 3/2014 | Ohno |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0075453 A1 | 3/2014 | Bellessort et al. |
| 2014/0078065 A1 | 3/2014 | Akkok |
| 2014/0079195 A1 | 3/2014 | Srivastava et al. |

(56) References Cited

U.S. PATENT DOCUMENTS

| | | |
|---|---|---|
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082545 A1 | 3/2014 | Zhai et al. |
| 2014/0082715 A1 | 3/2014 | Grajek et al. |
| 2014/0086458 A1 | 3/2014 | Rogers |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0092007 A1 | 4/2014 | Kim et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095601 A1 | 4/2014 | Abuelsaad et al. |
| 2014/0095965 A1 | 4/2014 | Li |
| 2014/0096077 A1 | 4/2014 | Jacob et al. |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |
| 2014/0108391 A1 | 4/2014 | Volkert |
| 2014/0112556 A1 | 4/2014 | Kalinli-akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0120961 A1 | 5/2014 | Buck |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0123022 A1 | 5/2014 | Lee et al. |
| 2014/0128021 A1 | 5/2014 | Walker et al. |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0143784 A1 | 5/2014 | Mistry et al. |
| 2014/0146200 A1 | 5/2014 | Scott et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156279 A1 | 6/2014 | Okamoto et al. |
| 2014/0157319 A1 | 6/2014 | Kimura et al. |
| 2014/0157422 A1 | 6/2014 | Livshits et al. |
| 2014/0163751 A1 | 6/2014 | Davis et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163978 A1 | 6/2014 | Basye et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0169795 A1 | 6/2014 | Clough |
| 2014/0171064 A1 | 6/2014 | Das |
| 2014/0172412 A1 | 6/2014 | Viegas et al. |
| 2014/0172878 A1 | 6/2014 | Clark et al. |
| 2014/0173445 A1 | 6/2014 | Grassiotto |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim |
| 2014/0180697 A1 | 6/2014 | Torok et al. |
| 2014/0181865 A1 | 6/2014 | Koganei |
| 2014/0188460 A1 | 7/2014 | Ouyang et al. |
| 2014/0188477 A1 | 7/2014 | Zhang |
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat et al. |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215367 A1 | 7/2014 | Kim et al. |
| 2014/0215513 A1 | 7/2014 | Ramer et al. |
| 2014/0218372 A1 | 8/2014 | Missig et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229158 A1 | 8/2014 | Zweig et al. |
| 2014/0229184 A1 | 8/2014 | Shires |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |

(56) References Cited

U.S. PATENT DOCUMENTS

| | | |
|---|---|---|
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0257902 A1 | 9/2014 | Moore et al. |
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong, III et al. |
| 2014/0274211 A1 | 9/2014 | Sejnoha et al. |
| 2014/0278051 A1 | 9/2014 | Mcgavran et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong, III et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282559 A1 | 9/2014 | Verduzco et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324429 A1 | 10/2014 | Weilhammer et al. |
| 2014/0324884 A1 | 10/2014 | Lindahl et al. |
| 2014/0330560 A1 | 11/2014 | Venkatesha et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0343834 A1 | 11/2014 | Demerchant et al. |
| 2014/0343943 A1 | 11/2014 | Al-telmissani |
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0358549 A1 | 12/2014 | O'connor et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Magahern et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2014/0379798 A1 | 12/2014 | Bunner et al. |
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0006148 A1 | 1/2015 | Goldszmit et al. |
| 2015/0006157 A1 | 1/2015 | Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0012862 A1 | 1/2015 | Ikeda et al. |
| 2015/0019219 A1 | 1/2015 | Tzirkel-Hancock et al. |
| 2015/0019221 A1 | 1/2015 | Lee et al. |
| 2015/0019944 A1 | 1/2015 | Kalgi |

(56) References Cited

U.S. PATENT DOCUMENTS

| | | |
|---|---|---|
| 2015/0019954 A1 | 1/2015 | Dalal et al. |
| 2015/0019974 A1 | 1/2015 | Doi et al. |
| 2015/0025405 A1 | 1/2015 | Vairavan et al. |
| 2015/0025890 A1 | 1/2015 | Jagatheesan et al. |
| 2015/0026620 A1 | 1/2015 | Kwon et al. |
| 2015/0027178 A1 | 1/2015 | Scalisi |
| 2015/0031416 A1 | 1/2015 | Labowicz et al. |
| 2015/0032443 A1 | 1/2015 | Karov et al. |
| 2015/0032457 A1 | 1/2015 | Koo et al. |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobson et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russell et al. |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1 | 3/2015 | Slayton |
| 2015/0067485 A1 | 3/2015 | Kim et al. |
| 2015/0067819 A1 | 3/2015 | Shribman et al. |
| 2015/0067822 A1 | 3/2015 | Randall |
| 2015/0071121 A1 | 3/2015 | Patil et al. |
| 2015/0073788 A1 | 3/2015 | Sak et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082180 A1 | 3/2015 | Ames et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095031 A1 | 4/2015 | Conkie et al. |
| 2015/0095268 A1 | 4/2015 | Greenzeiger et al. |
| 2015/0095278 A1 | 4/2015 | Flinn et al. |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106085 A1 | 4/2015 | Lindahl |
| 2015/0106093 A1 | 4/2015 | Weeks et al. |
| 2015/0106737 A1 | 4/2015 | Montoy-Wilson et al. |
| 2015/0113407 A1 | 4/2015 | Hoffert et al. |
| 2015/0113435 A1 | 4/2015 | Phillips |
| 2015/0120296 A1 | 4/2015 | Stern et al. |
| 2015/0120641 A1 | 4/2015 | Soon-shiong et al. |
| 2015/0120723 A1 | 4/2015 | Deshmukh et al. |
| 2015/0121216 A1 | 4/2015 | Brown et al. |
| 2015/0123898 A1 | 5/2015 | Kim et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0140934 A1 | 5/2015 | Abdurrahman et al. |
| 2015/0141150 A1 | 5/2015 | Zha |
| 2015/0142420 A1 | 5/2015 | Sarikaya et al. |
| 2015/0142438 A1 | 5/2015 | Dai et al. |
| 2015/0142440 A1 | 5/2015 | Parkinson et al. |
| 2015/0142447 A1 | 5/2015 | Kennewick et al. |
| 2015/0142851 A1 | 5/2015 | Gupta et al. |
| 2015/0143419 A1 | 5/2015 | Bhagwat et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154001 A1 | 6/2015 | Knox et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161291 A1 | 6/2015 | Gur et al. |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162000 A1 | 6/2015 | Di Censo et al. |
| 2015/0162001 A1 | 6/2015 | Kar et al. |
| 2015/0162006 A1 | 6/2015 | Kummer |
| 2015/0163558 A1 | 6/2015 | Wheatley |
| 2015/0169081 A1 | 6/2015 | Neels et al. |
| 2015/0169284 A1 | 6/2015 | Quast et al. |
| 2015/0169336 A1 | 6/2015 | Harper et al. |
| 2015/0169696 A1 | 6/2015 | Krishnappa et al. |
| 2015/0170073 A1 | 6/2015 | Baker |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0178388 A1 | 6/2015 | Winnemoeller et al. |
| 2015/0178785 A1 | 6/2015 | Salonen |
| 2015/0179168 A1 | 6/2015 | Hakkani-tur et al. |
| 2015/0179176 A1 | 6/2015 | Ryu et al. |
| 2015/0181285 A1 | 6/2015 | Zhang et al. |
| 2015/0185964 A1 | 7/2015 | Stout |
| 2015/0185993 A1 | 7/2015 | Wheatley et al. |
| 2015/0185996 A1 | 7/2015 | Brown et al. |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0186538 A1 | 7/2015 | Yan et al. |
| 2015/0186783 A1 | 7/2015 | Byrne et al. |
| 2015/0186892 A1 | 7/2015 | Zhang et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0194165 A1 | 7/2015 | Faaborg et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |

(56) References Cited

U.S. PATENT DOCUMENTS

| | | |
|---|---|---|
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0201077 A1 | 7/2015 | Konig et al. |
| 2015/0205425 A1 | 7/2015 | Kuscher et al. |
| 2015/0205568 A1 | 7/2015 | Matsuoka |
| 2015/0205632 A1 | 7/2015 | Gaster |
| 2015/0205858 A1 | 7/2015 | Xie et al. |
| 2015/0206529 A1 | 7/2015 | Kwon et al. |
| 2015/0208226 A1 | 7/2015 | Kuusilinna et al. |
| 2015/0212791 A1 | 7/2015 | Kumar et al. |
| 2015/0213140 A1 | 7/2015 | Volkert |
| 2015/0213796 A1 | 7/2015 | Waltermann et al. |
| 2015/0215258 A1 | 7/2015 | Nowakowski et al. |
| 2015/0215350 A1 | 7/2015 | Slayton et al. |
| 2015/0220264 A1 | 8/2015 | Lewis et al. |
| 2015/0220507 A1 | 8/2015 | Mohajer et al. |
| 2015/0220715 A1 | 8/2015 | Kim et al. |
| 2015/0220972 A1 | 8/2015 | Subramanya et al. |
| 2015/0221302 A1 | 8/2015 | Han et al. |
| 2015/0221304 A1 | 8/2015 | Stewart |
| 2015/0221307 A1 | 8/2015 | Shah et al. |
| 2015/0222586 A1 | 8/2015 | Ebersman et al. |
| 2015/0227505 A1 | 8/2015 | Morimoto |
| 2015/0227633 A1 | 8/2015 | Shapira |
| 2015/0228274 A1 | 8/2015 | Leppanen et al. |
| 2015/0228275 A1 | 8/2015 | Watanabe et al. |
| 2015/0228281 A1 | 8/2015 | Raniere |
| 2015/0228283 A1 | 8/2015 | Ehsani et al. |
| 2015/0228292 A1 | 8/2015 | Goldstein et al. |
| 2015/0230095 A1 | 8/2015 | Smith et al. |
| 2015/0234556 A1 | 8/2015 | Zhu et al. |
| 2015/0234636 A1 | 8/2015 | Barnes, Jr. |
| 2015/0234800 A1 | 8/2015 | Patrick et al. |
| 2015/0237301 A1 | 8/2015 | Shi et al. |
| 2015/0242091 A1 | 8/2015 | Lu et al. |
| 2015/0242385 A1 | 8/2015 | Bao et al. |
| 2015/0243278 A1 | 8/2015 | Kibre et al. |
| 2015/0243279 A1 | 8/2015 | Morse et al. |
| 2015/0243283 A1 | 8/2015 | Halash et al. |
| 2015/0244665 A1 | 8/2015 | Choi et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0249715 A1 | 9/2015 | Helvik et al. |
| 2015/0253146 A1 | 9/2015 | Annapureddy et al. |
| 2015/0253885 A1 | 9/2015 | Kagan et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0262583 A1 | 9/2015 | Kanda et al. |
| 2015/0269139 A1 | 9/2015 | McAteer et al. |
| 2015/0269617 A1 | 9/2015 | Mikurak |
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278348 A1 | 10/2015 | Paruchuri et al. |
| 2015/0278370 A1 | 10/2015 | Stratvert et al. |
| 2015/0278737 A1 | 10/2015 | Chen Huebscher et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0294670 A1 | 10/2015 | Roblek et al. |
| 2015/0295915 A1 | 10/2015 | Xiu |
| 2015/0301796 A1 | 10/2015 | Visser et al. |
| 2015/0302316 A1 | 10/2015 | Buryak et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0308470 A1 | 10/2015 | Graham et al. |
| 2015/0309691 A1 | 10/2015 | Seo et al. |
| 2015/0309997 A1 | 10/2015 | Lee et al. |
| 2015/0310114 A1 | 10/2015 | Ryger et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0319411 A1 | 11/2015 | Kasmir et al. |
| 2015/0324041 A1 | 11/2015 | Varley et al. |
| 2015/0324334 A1 | 11/2015 | Lee et al. |
| 2015/0324362 A1 | 11/2015 | Glass et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340034 A1 | 11/2015 | Schalkwyk et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thörn |
| 2015/0365251 A1 | 12/2015 | Kinoshita et al. |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371664 A1 | 12/2015 | Bar-or et al. |
| 2015/0371665 A1 | 12/2015 | Naik et al. |

(56) References Cited

U.S. PATENT DOCUMENTS

| | | |
|---|---|---|
| 2015/0373183 A1 | 12/2015 | Woolsey et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1 | 12/2015 | Van Os et al. |
| 2015/0382079 A1 | 12/2015 | Lister et al. |
| 2015/0382147 A1 | 12/2015 | Clark et al. |
| 2016/0004499 A1 | 1/2016 | Kim et al. |
| 2016/0004690 A1 | 1/2016 | Bangalore et al. |
| 2016/0005320 A1 | 1/2016 | deCharms et al. |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0021414 A1 | 1/2016 | Padi et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0029316 A1 | 1/2016 | Mohan et al. |
| 2016/0034042 A1 | 2/2016 | Joo |
| 2016/0034811 A1 | 2/2016 | Paulik et al. |
| 2016/0036953 A1 | 2/2016 | Lee et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0061623 A1 | 3/2016 | Pahwa et al. |
| 2016/0062605 A1 | 3/2016 | Agarwal et al. |
| 2016/0063094 A1 | 3/2016 | Udupa et al. |
| 2016/0063998 A1 | 3/2016 | Krishnamoorthy et al. |
| 2016/0065626 A1 | 3/2016 | Jain et al. |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071521 A1 | 3/2016 | Haughay |
| 2016/0072940 A1 | 3/2016 | Cronin |
| 2016/0077794 A1 | 3/2016 | Kim et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091871 A1 | 3/2016 | Marti et al. |
| 2016/0091967 A1 | 3/2016 | Prokofieva et al. |
| 2016/0092434 A1 | 3/2016 | Bellegarda |
| 2016/0092447 A1 | 3/2016 | Pathurudeen et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Palakovich et al. |
| 2016/0099984 A1 | 4/2016 | Karagiannis et al. |
| 2016/0104480 A1 | 4/2016 | Sharifi |
| 2016/0104486 A1 | 4/2016 | Penilla et al. |
| 2016/0111091 A1 | 4/2016 | Bakish |
| 2016/0112746 A1 | 4/2016 | Zhang et al. |
| 2016/0112792 A1 | 4/2016 | Lee et al. |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132290 A1 | 5/2016 | Raux |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0148610 A1 | 5/2016 | Kennewick, Jr. et al. |
| 2016/0148612 A1 | 5/2016 | Guo et al. |
| 2016/0149966 A1 | 5/2016 | Remash et al. |
| 2016/0150020 A1 | 5/2016 | Farmer et al. |
| 2016/0151668 A1 | 6/2016 | Barnes et al. |
| 2016/0154624 A1 | 6/2016 | Son et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170710 A1 | 6/2016 | Kim et al. |
| 2016/0170966 A1 | 6/2016 | Kolo |
| 2016/0173578 A1 | 6/2016 | Sharma et al. |
| 2016/0173617 A1 | 6/2016 | Allinson |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189198 A1 | 6/2016 | Mckenzie et al. |
| 2016/0189715 A1 | 6/2016 | Nishikawa |
| 2016/0189717 A1 | 6/2016 | Kannan et al. |
| 2016/0196110 A1 | 7/2016 | Yehoshua et al. |
| 2016/0198319 A1 | 7/2016 | Huang et al. |
| 2016/0203002 A1 | 7/2016 | Kannan et al. |
| 2016/0203193 A1 | 7/2016 | Haverlock et al. |
| 2016/0210551 A1 | 7/2016 | Lee et al. |
| 2016/0210981 A1 | 7/2016 | Lee |
| 2016/0212208 A1 | 7/2016 | Kulkarni et al. |
| 2016/0212488 A1 | 7/2016 | Os et al. |
| 2016/0217784 A1 | 7/2016 | Gelfenbeyn et al. |
| 2016/0224540 A1 | 8/2016 | Stewart et al. |
| 2016/0224559 A1 | 8/2016 | Hicks et al. |
| 2016/0224774 A1 | 8/2016 | Pender |
| 2016/0225372 A1 | 8/2016 | Cheung et al. |
| 2016/0227107 A1 | 8/2016 | Beaumont |
| 2016/0232500 A1 | 8/2016 | Wang et al. |
| 2016/0239645 A1 | 8/2016 | Heo et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labský et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0266871 A1 | 9/2016 | Schmid et al. |
| 2016/0267904 A1 | 9/2016 | Biadsy et al. |
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0283185 A1 | 9/2016 | Mclaren et al. |

(56) References Cited

U.S. PATENT DOCUMENTS

| | | |
|---|---|---|
| 2016/0284005 A1 | 9/2016 | Daniel et al. |
| 2016/0284199 A1 | 9/2016 | Dotan-Cohen et al. |
| 2016/0285808 A1 | 9/2016 | Franklin et al. |
| 2016/0286045 A1 | 9/2016 | Shaltiel et al. |
| 2016/0293157 A1 | 10/2016 | Chen et al. |
| 2016/0293168 A1 | 10/2016 | Chen |
| 2016/0294755 A1 | 10/2016 | Prabhu |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0299977 A1 | 10/2016 | Hreha |
| 2016/0300571 A1 | 10/2016 | Foerster et al. |
| 2016/0301639 A1 | 10/2016 | Liu et al. |
| 2016/0307566 A1 | 10/2016 | Bellegarda |
| 2016/0308799 A1 | 10/2016 | Schubert et al. |
| 2016/0309035 A1 | 10/2016 | Li |
| 2016/0313906 A1 | 10/2016 | Kilchenko et al. |
| 2016/0314788 A1 | 10/2016 | Jitkoff et al. |
| 2016/0314789 A1 | 10/2016 | Marcheret et al. |
| 2016/0314792 A1 | 10/2016 | Alvarez et al. |
| 2016/0315996 A1 | 10/2016 | Ha et al. |
| 2016/0317924 A1 | 11/2016 | Tanaka et al. |
| 2016/0321239 A1 | 11/2016 | Iso-Sipilä et al. |
| 2016/0321261 A1 | 11/2016 | Spasojevic et al. |
| 2016/0321358 A1 | 11/2016 | Kanani et al. |
| 2016/0322043 A1 | 11/2016 | Bellegarda |
| 2016/0322044 A1 | 11/2016 | Jung et al. |
| 2016/0322045 A1 | 11/2016 | Hatfield et al. |
| 2016/0322048 A1 | 11/2016 | Amano et al. |
| 2016/0322050 A1 | 11/2016 | Wang et al. |
| 2016/0328147 A1 | 11/2016 | Zhang et al. |
| 2016/0328205 A1 | 11/2016 | Agrawal et al. |
| 2016/0328893 A1 | 11/2016 | Cordova et al. |
| 2016/0329060 A1 | 11/2016 | Ito et al. |
| 2016/0334973 A1 | 11/2016 | Reckhow et al. |
| 2016/0335138 A1 | 11/2016 | Surti et al. |
| 2016/0335532 A1 | 11/2016 | Sanghavi et al. |
| 2016/0336007 A1 | 11/2016 | Hanazawa et al. |
| 2016/0336010 A1 | 11/2016 | Lindahl |
| 2016/0336011 A1 | 11/2016 | Koll et al. |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342317 A1 | 11/2016 | Lim et al. |
| 2016/0342685 A1 | 11/2016 | Basu et al. |
| 2016/0342781 A1 | 11/2016 | Jeon |
| 2016/0350650 A1 | 12/2016 | Leeman-Munk et al. |
| 2016/0351190 A1 | 12/2016 | Piernot et al. |
| 2016/0352567 A1 | 12/2016 | Robbins et al. |
| 2016/0352924 A1 | 12/2016 | Senarath et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0372119 A1 | 12/2016 | Sak et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379632 A1 | 12/2016 | Hoffmeister et al. |
| 2016/0379633 A1 | 12/2016 | Lehman et al. |
| 2016/0379639 A1 | 12/2016 | Weinstein et al. |
| 2016/0379641 A1 | 12/2016 | Liu et al. |
| 2017/0000348 A1 | 1/2017 | Karsten et al. |
| 2017/0003931 A1 | 1/2017 | Dvortsov et al. |
| 2017/0004824 A1 | 1/2017 | Yoo et al. |
| 2017/0005818 A1 | 1/2017 | Gould |
| 2017/0011091 A1 | 1/2017 | Chehreghani |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0013331 A1 | 1/2017 | Watanabe et al. |
| 2017/0018271 A1 | 1/2017 | Khan et al. |
| 2017/0019987 A1 | 1/2017 | Dragone et al. |
| 2017/0023963 A1 | 1/2017 | Davis et al. |
| 2017/0025124 A1 | 1/2017 | Mixter et al. |
| 2017/0026318 A1 | 1/2017 | Daniel et al. |
| 2017/0026509 A1 | 1/2017 | Rand |
| 2017/0031576 A1 | 2/2017 | Saoji et al. |
| 2017/0032783 A1 | 2/2017 | Lord et al. |
| 2017/0032787 A1 | 2/2017 | Dayal |
| 2017/0032791 A1 | 2/2017 | Elson et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0041388 A1 | 2/2017 | Tal et al. |
| 2017/0047063 A1 | 2/2017 | Ohmura et al. |
| 2017/0053652 A1 | 2/2017 | Choi et al. |
| 2017/0055895 A1 | 3/2017 | Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0069308 A1 | 3/2017 | Aleksic et al. |
| 2017/0075653 A1 | 3/2017 | Dawidowsky et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0084277 A1 | 3/2017 | Sharifi |
| 2017/0085547 A1 | 3/2017 | De Aguiar et al. |
| 2017/0090428 A1 | 3/2017 | Oohara |
| 2017/0090569 A1 | 3/2017 | Levesque |
| 2017/0091168 A1 | 3/2017 | Bellegarda et al. |
| 2017/0091169 A1 | 3/2017 | Bellegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0097743 A1 | 4/2017 | Hameed et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0103752 A1 | 4/2017 | Senior et al. |
| 2017/0105190 A1 | 4/2017 | Logan et al. |
| 2017/0110117 A1 | 4/2017 | Chakladar et al. |
| 2017/0116177 A1 | 4/2017 | Walia |
| 2017/0116982 A1 | 4/2017 | Gelfenbeyn et al. |
| 2017/0116989 A1 | 4/2017 | Yadgar et al. |
| 2017/0124190 A1 | 5/2017 | Wang et al. |
| 2017/0124311 A1 | 5/2017 | Li et al. |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0140041 A1 | 5/2017 | Dotan-Cohen et al. |
| 2017/0140052 A1 | 5/2017 | Bufe, III et al. |
| 2017/0140644 A1 | 5/2017 | Hwang et al. |
| 2017/0140760 A1 | 5/2017 | Sachdev |
| 2017/0147841 A1 | 5/2017 | Stagg et al. |
| 2017/0148044 A1 | 5/2017 | Fukuda et al. |
| 2017/0154033 A1 | 6/2017 | Lee |
| 2017/0154055 A1 | 6/2017 | Dimson et al. |
| 2017/0155940 A1 | 6/2017 | Jin et al. |
| 2017/0155965 A1 | 6/2017 | Ward |
| 2017/0161018 A1 | 6/2017 | Lemay et al. |

(56) References Cited

U.S. PATENT DOCUMENTS

| | | |
|---|---|---|
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0162191 A1 | 6/2017 | Grost et al. |
| 2017/0162203 A1 | 6/2017 | Huang et al. |
| 2017/0169818 A1 | 6/2017 | Vanblon et al. |
| 2017/0169819 A1 | 6/2017 | Mese et al. |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195495 A1 | 7/2017 | Deora et al. |
| 2017/0195636 A1 | 7/2017 | Child et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0206899 A1 | 7/2017 | Bryant et al. |
| 2017/0215052 A1 | 7/2017 | Koum et al. |
| 2017/0221486 A1 | 8/2017 | Kurata et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0238039 A1 | 8/2017 | Sabattini |
| 2017/0242478 A1 | 8/2017 | Ma |
| 2017/0242653 A1 | 8/2017 | Lang et al. |
| 2017/0242657 A1 | 8/2017 | Jarvis et al. |
| 2017/0243468 A1 | 8/2017 | Dotan-Cohen et al. |
| 2017/0243576 A1 | 8/2017 | Millington et al. |
| 2017/0243586 A1 | 8/2017 | Civelli et al. |
| 2017/0249309 A1 | 8/2017 | Sarikaya |
| 2017/0256256 A1 | 9/2017 | Wang et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0263254 A1 | 9/2017 | Dewan et al. |
| 2017/0264451 A1 | 9/2017 | Yu et al. |
| 2017/0264711 A1 | 9/2017 | Natarajan et al. |
| 2017/0270822 A1 | 9/2017 | Cohen |
| 2017/0270912 A1 | 9/2017 | Levit et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0308552 A1 | 10/2017 | Soni et al. |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316782 A1 | 11/2017 | Haughay |
| 2017/0319123 A1 | 11/2017 | Voss et al. |
| 2017/0323637 A1 | 11/2017 | Naik |
| 2017/0329466 A1 | 11/2017 | Krenkler et al. |
| 2017/0329490 A1 | 11/2017 | Esinovskaya et al. |
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0336920 A1 | 11/2017 | Chan et al. |
| 2017/0337035 A1 | 11/2017 | Choudhary et al. |
| 2017/0337478 A1 | 11/2017 | Sarikaya et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1 | 11/2017 | Sanghavi et al. |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357529 A1 | 12/2017 | Venkatraman et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0359680 A1 | 12/2017 | Ledvina et al. |
| 2017/0365251 A1 | 12/2017 | Park et al. |
| 2017/0371509 A1 | 12/2017 | Jung et al. |
| 2017/0371885 A1 | 12/2017 | Aggarwal et al. |
| 2017/0374093 A1 | 12/2017 | Dhar et al. |
| 2017/0374176 A1 | 12/2017 | Agrawal et al. |
| 2018/0004396 A1 | 1/2018 | Ying |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0018814 A1 | 1/2018 | Dahm et al. |
| 2018/0024985 A1 | 1/2018 | Asano |
| 2018/0025124 A1 | 1/2018 | Mohr et al. |
| 2018/0028918 A1 | 2/2018 | Tang et al. |
| 2018/0033431 A1 | 2/2018 | Newendorp et al. |
| 2018/0033436 A1 | 2/2018 | Zhou |
| 2018/0047201 A1 | 2/2018 | Filev et al. |
| 2018/0047391 A1 | 2/2018 | Baik et al. |
| 2018/0047393 A1 | 2/2018 | Tian et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063308 A1 | 3/2018 | Crystal et al. |
| 2018/0063324 A1 | 3/2018 | Van Meter, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Bellegarda et al. |
| 2018/0068074 A1 | 3/2018 | Shen |
| 2018/0069743 A1 | 3/2018 | Bakken et al. |
| 2018/0075847 A1 | 3/2018 | Lee et al. |
| 2018/0077095 A1 | 3/2018 | Deyle et al. |
| 2018/0088969 A1 | 3/2018 | Vanblon et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091604 A1 | 3/2018 | Yamashita et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0101599 A1 | 4/2018 | Arnold et al. |
| 2018/0101925 A1 | 4/2018 | Brinig et al. |
| 2018/0102914 A1 | 4/2018 | Kawachi et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |

(56) References Cited

U.S. PATENT DOCUMENTS

| | | |
|---|---|---|
| 2018/0113673 A1 | 4/2018 | Sheynblat |
| 2018/0314362 A1 | 4/2018 | Kim et al. |
| 2018/0121432 A1 | 5/2018 | Parson et al. |
| 2018/0122376 A1 | 5/2018 | Kojima |
| 2018/0122378 A1 | 5/2018 | Mixter et al. |
| 2018/0126260 A1 | 5/2018 | Chansoriya et al. |
| 2018/0129967 A1 | 5/2018 | Herreshoff |
| 2018/0130470 A1 | 5/2018 | Lemay et al. |
| 2018/0130471 A1 | 5/2018 | Trufinescu et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143967 A1 | 5/2018 | Anbazhagan et al. |
| 2018/0144465 A1 | 5/2018 | Hsieh et al. |
| 2018/0144615 A1 | 5/2018 | Kinney et al. |
| 2018/0144746 A1 | 5/2018 | Mishra et al. |
| 2018/0144748 A1 | 5/2018 | Leong |
| 2018/0146089 A1 | 5/2018 | Rauenbuehler et al. |
| 2018/0150744 A1 | 5/2018 | Orr et al. |
| 2018/0152557 A1 | 5/2018 | White et al. |
| 2018/0157372 A1 | 6/2018 | Kurabayashi |
| 2018/0157992 A1 | 6/2018 | Susskind et al. |
| 2018/0158548 A1 | 6/2018 | Taheri et al. |
| 2018/0158552 A1 | 6/2018 | Liu et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |
| 2018/0182376 A1 | 6/2018 | Gysel et al. |
| 2018/0188840 A1 | 7/2018 | Tamura et al. |
| 2018/0188948 A1 | 7/2018 | Ouyang et al. |
| 2018/0189267 A1 | 7/2018 | Takiel |
| 2018/0190263 A1 | 7/2018 | Calef, III |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0210874 A1 | 7/2018 | Fuxman et al. |
| 2018/0213448 A1 | 7/2018 | Segal et al. |
| 2018/0218735 A1 | 8/2018 | Hunt et al. |
| 2018/0225274 A1 | 8/2018 | Tommy et al. |
| 2018/0232203 A1 | 8/2018 | Gelfenbeyn et al. |
| 2018/0233132 A1 | 8/2018 | Herold et al. |
| 2018/0233140 A1 | 8/2018 | Koishida et al. |
| 2018/0247065 A1 | 8/2018 | Rhee et al. |
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0268023 A1 | 9/2018 | Korpusik et al. |
| 2018/0268106 A1 | 9/2018 | Velaga |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293984 A1 | 10/2018 | Lindahl |
| 2018/0293988 A1 | 10/2018 | Huang et al. |
| 2018/0299878 A1 | 10/2018 | Cella et al. |
| 2018/0300317 A1 | 10/2018 | Bradbury |
| 2018/0300400 A1 | 10/2018 | Paulus |
| 2018/0300608 A1 | 10/2018 | Sevrens et al. |
| 2018/0308470 A1 | 10/2018 | Park et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0314552 A1 | 11/2018 | Kim et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0324518 A1 | 11/2018 | Dusan et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0332389 A1 | 11/2018 | Ekkizogloy et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336885 A1 | 11/2018 | Mukherjee et al. |
| 2018/0336892 A1 | 11/2018 | Kim et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336920 A1 | 11/2018 | Bastian et al. |
| 2018/0338191 A1 | 11/2018 | Van Scheltinga et al. |
| 2018/0341643 A1 | 11/2018 | Alders et al. |
| 2018/0343557 A1 | 11/2018 | Naik et al. |
| 2018/0349084 A1 | 12/2018 | Nagasaka et al. |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0349728 A1 | 12/2018 | Wang et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365653 A1 | 12/2018 | Cleaver et al. |
| 2018/0366105 A1 | 12/2018 | Kim |
| 2018/0373487 A1 | 12/2018 | Gruber et al. |
| 2018/0373493 A1 | 12/2018 | Watson et al. |
| 2018/0373796 A1 | 12/2018 | Rathod |
| 2018/0374484 A1 | 12/2018 | Huang et al. |
| 2019/0005024 A1 | 1/2019 | Somech et al. |
| 2019/0012141 A1 | 1/2019 | Piersol et al. |
| 2019/0012449 A1 | 1/2019 | Cheyer |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035405 A1 | 1/2019 | Haughay |
| 2019/0037258 A1 | 1/2019 | Lewis et al. |
| 2019/0042059 A1 | 2/2019 | Baer |
| 2019/0042627 A1 | 2/2019 | Osotio et al. |
| 2019/0043507 A1 | 2/2019 | Huang et al. |
| 2019/0045040 A1 | 2/2019 | Lee et al. |
| 2019/0051309 A1 | 2/2019 | Kim et al. |
| 2019/0057697 A1 | 2/2019 | Giuli et al. |
| 2019/0065144 A1 | 2/2019 | Sumner et al. |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0173996 A1 | 2/2019 | Butcher et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0079476 A1 | 3/2019 | Funes |
| 2019/0080685 A1 | 3/2019 | Johnson, Jr. |
| 2019/0080698 A1 | 3/2019 | Miller |
| 2019/0082044 A1 | 3/2019 | Melendez et al. |
| 2019/0087412 A1 | 3/2019 | Seyed Ibrahim et al. |

(56) References Cited

U.S. PATENT DOCUMENTS

| | | |
|---|---|---|
| 2019/0087455 A1 | 3/2019 | He et al. |
| 2019/0095050 A1 | 3/2019 | Gruber et al. |
| 2019/0095171 A1 | 3/2019 | Carson et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129615 A1 | 5/2019 | Sundar et al. |
| 2019/0132694 A1 | 5/2019 | Hanes et al. |
| 2019/0134501 A1 | 5/2019 | Feder et al. |
| 2019/0138704 A1 | 5/2019 | Shrivastava et al. |
| 2019/0139541 A1 | 5/2019 | Andersen et al. |
| 2019/0141494 A1 | 5/2019 | Gross et al. |
| 2019/0147880 A1 | 5/2019 | Booker et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0164546 A1 | 5/2019 | Piernot et al. |
| 2019/0172467 A1 | 6/2019 | Kim et al. |
| 2019/0179607 A1 | 6/2019 | Thangarathnam et al. |
| 2019/0179890 A1 | 6/2019 | Evermann |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |
| 2019/0189125 A1 | 6/2019 | Van Os et al. |
| 2019/0197053 A1 | 6/2019 | Graham et al. |
| 2019/0213601 A1 | 7/2019 | Hackman et al. |
| 2019/0213774 A1 | 7/2019 | Jiao et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0220727 A1 | 7/2019 | Dohrmann et al. |
| 2019/0222684 A1 | 7/2019 | Li et al. |
| 2019/0230215 A1 | 7/2019 | Zhu et al. |
| 2019/0236130 A1 | 8/2019 | Li et al. |
| 2019/0236459 A1 | 8/2019 | Cheyer et al. |
| 2019/0244618 A1 | 8/2019 | Newendorp et al. |
| 2019/0251339 A1 | 8/2019 | Hawker |
| 2019/0251960 A1 | 8/2019 | Maker et al. |
| 2019/0259386 A1 | 8/2019 | Kudurshian et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |
| 2019/0287012 A1 | 9/2019 | Celikyilmaz et al. |
| 2019/0287522 A1 | 9/2019 | Lambourne et al. |
| 2019/0295544 A1 | 9/2019 | Garcia et al. |
| 2019/0303442 A1 | 10/2019 | Peitz et al. |
| 2019/0310765 A1 | 10/2019 | Napolitano et al. |
| 2019/0311708 A1 | 10/2019 | Bengio et al. |
| 2019/0318739 A1 | 10/2019 | Garg et al. |
| 2019/0339784 A1 | 11/2019 | Lemay et al. |
| 2019/0341027 A1 | 11/2019 | Vescovi et al. |
| 2019/0341056 A1 | 11/2019 | Paulik et al. |
| 2019/0347063 A1 | 11/2019 | Liu et al. |
| 2019/0348022 A1 | 11/2019 | Park et al. |
| 2019/0354548 A1 | 11/2019 | Orr et al. |
| 2019/0355346 A1 | 11/2019 | Bellegarda |
| 2019/0355384 A1 | 11/2019 | Sereshki et al. |
| 2019/0361729 A1 | 11/2019 | Gruber et al. |
| 2019/0369748 A1 | 12/2019 | Hindi et al. |
| 2019/0369842 A1 | 12/2019 | Dolbakian et al. |
| 2019/0369868 A1 | 12/2019 | Tang et al. |
| 2019/0370292 A1 | 12/2019 | Irani et al. |
| 2019/0370323 A1 | 12/2019 | Davidson et al. |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2019/0385418 A1 | 12/2019 | Mixter et al. |
| 2020/0019609 A1 | 1/2020 | Yu et al. |
| 2020/0042334 A1 | 2/2020 | Radebaugh et al. |
| 2020/0043482 A1 | 2/2020 | Gruber et al. |
| 2020/0043489 A1 | 2/2020 | Bradley et al. |
| 2020/0044485 A1 | 2/2020 | Smith et al. |
| 2020/0053218 A1 | 2/2020 | Gray |
| 2020/0058299 A1 | 2/2020 | Lee et al. |
| 2020/0075018 A1 | 3/2020 | Chen |
| 2020/0076538 A1 | 3/2020 | Soultan et al. |
| 2020/0081615 A1 | 3/2020 | Lu et al. |
| 2020/0091958 A1 | 3/2020 | Curtis et al. |
| 2020/0092625 A1 | 3/2020 | Raffle |
| 2020/0098362 A1 | 3/2020 | Piernot |
| 2020/0098368 A1 | 3/2020 | Lemay et al. |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piernot |
| 2020/0118566 A1 | 4/2020 | Zhou |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0135180 A1 | 4/2020 | Mukherjee et al. |
| 2020/0135209 A1 | 4/2020 | Delfarah et al. |
| 2020/0137230 A1 | 4/2020 | Spohrer |
| 2020/0143812 A1 | 5/2020 | Walker, II et al. |
| 2020/0152186 A1 | 5/2020 | Koh et al. |
| 2020/0159579 A1 | 5/2020 | Shear et al. |
| 2020/0160179 A1 | 5/2020 | Chien et al. |
| 2020/0169637 A1 | 5/2020 | Sanghavi et al. |
| 2020/0175566 A1 | 6/2020 | Bender et al. |
| 2020/0184964 A1 | 6/2020 | Myers et al. |
| 2020/0184966 A1 | 6/2020 | Yavagal |
| 2020/0193997 A1 | 6/2020 | Piernot |
| 2020/0210142 A1 | 7/2020 | Mu et al. |
| 2020/0218780 A1 | 7/2020 | Mei et al. |
| 2020/0221155 A1 | 7/2020 | Hansen et al. |
| 2020/0227034 A1 | 7/2020 | Summa et al. |
| 2020/0227044 A1 | 7/2020 | Lindahl |
| 2020/0243069 A1 | 7/2020 | Amores et al. |
| 2020/0249985 A1 | 8/2020 | Zeitlin |
| 2020/0252508 A1 | 8/2020 | Gray |
| 2020/0258508 A1 | 8/2020 | Aggarwal et al. |
| 2020/0267222 A1 | 8/2020 | Phipps et al. |
| 2020/0272485 A1 | 8/2020 | Karashchuk et al. |
| 2020/0279556 A1 | 9/2020 | Gruber et al. |
| 2020/0279576 A1 | 9/2020 | Binder et al. |
| 2020/0279627 A1 | 9/2020 | Nida et al. |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0294494 A1 | 9/2020 | Suyama et al. |
| 2020/0301950 A1 | 9/2020 | Lorrain-Hale et al. |
| 2020/0302356 A1 | 9/2020 | Gruber et al. |
| 2020/0302919 A1 | 9/2020 | Greborio et al. |
| 2020/0302925 A1 | 9/2020 | Shah et al. |
| 2020/0302930 A1 | 9/2020 | Chen et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0310513 A1 | 10/2020 | Nicholson et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0327895 A1 | 10/2020 | Gruber et al. |
| 2020/0334492 A1 | 10/2020 | Yuan et al. |
| 2020/0342849 A1 | 10/2020 | Yu et al. |
| 2020/0342863 A1 | 10/2020 | Aggarwal et al. |
| 2020/0356243 A1 | 11/2020 | Meyer et al. |
| 2020/0357391 A1 | 11/2020 | Ghoshal et al. |
| 2020/0357406 A1 | 11/2020 | York et al. |

(56) References Cited

U.S. PATENT DOCUMENTS

| | | | |
|---|---|---|---|
| 2020/0357409 A1 | 11/2020 | Sun et al. |
| 2020/0364411 A1 | 11/2020 | Evermann |
| 2020/0365155 A1 | 11/2020 | Milden |
| 2020/0372904 A1 | 11/2020 | Vescovi et al. |
| 2020/0374243 A1 | 11/2020 | Jina et al. |
| 2020/0379610 A1 | 12/2020 | Ford et al. |
| 2020/0379640 A1 | 12/2020 | Bellegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380980 A1 | 12/2020 | Shum et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |
| 2021/0110106 A1 | 12/2020 | Vescovi et al. |
| 2021/0006943 A1 | 1/2021 | Gross et al. |
| 2021/0011557 A1 | 1/2021 | Lemay et al. |
| 2021/0012775 A1 | 1/2021 | Kang et al. |
| 2021/0012776 A1 | 1/2021 | Peterson et al. |
| 2021/0065698 A1 | 3/2021 | Topcu et al. |
| 2021/0067631 A1 | 3/2021 | Van Os et al. |
| 2021/0072953 A1 | 3/2021 | Amarilio et al. |
| 2021/0090314 A1 | 3/2021 | Hussen et al. |
| 2021/0097998 A1 | 4/2021 | Kim et al. |
| 2021/0105528 A1 | 4/2021 | Van Os et al. |
| 2021/0110115 A1 | 4/2021 | Hermann et al. |
| 2021/0110254 A1 | 4/2021 | Hoang et al. |
| 2021/0141839 A1 | 5/2021 | Tang et al. |
| 2021/0149629 A1 | 5/2021 | Martel et al. |
| 2021/0149996 A1 | 5/2021 | Bellegarda |
| 2021/0150151 A1 | 5/2021 | Xu et al. |
| 2021/0151041 A1 | 5/2021 | Gruber et al. |
| 2021/0151070 A1 | 5/2021 | Binder et al. |
| 2021/0152684 A1 | 5/2021 | Weinstein et al. |
| 2021/0165826 A1 | 6/2021 | Graham et al. |
| 2021/0191603 A1 | 6/2021 | Napolitano et al. |
| 2021/0191968 A1 | 6/2021 | Orr et al. |
| 2021/0216760 A1 | 7/2021 | Howell et al. |
| 2021/0224032 A1 | 7/2021 | Orr et al. |
| 2021/0224474 A1 | 7/2021 | Bellegarda et al. |

FOREIGN PATENT DOCUMENTS

| | | | |
|---|---|---|---|
| AU | 2015203483 A1 | 7/2015 |
| AU | 2015101171 A4 | 10/2015 |
| AU | 2018100187 A4 | 3/2018 |
| AU | 2017222436 A1 | 10/2018 |
| CA | 2792412 A1 | 7/2011 |
| CA | 2666438 C | 6/2013 |
| CH | 709795 A1 | 12/2015 |
| CN | 1518695 A | 8/2004 |
| CN | 1757027 A | 4/2006 |
| CN | 101499156 A | 8/2009 |
| CN | 101655876 A | 2/2010 |
| CN | 101727274 A | 6/2010 |
| CN | 101939740 A | 1/2011 |
| CN | 101951553 A | 1/2011 |
| CN | 101958958 A | 1/2011 |
| CN | 101971250 A | 2/2011 |
| CN | 101983501 A | 3/2011 |
| CN | 101992779 A | 3/2011 |
| CN | 102056026 A | 5/2011 |
| CN | 102074234 A | 5/2011 |
| CN | 102096717 A | 6/2011 |
| CN | 102122506 A | 7/2011 |
| CN | 102124515 A | 7/2011 |
| CN | 102137085 A | 7/2011 |
| CN | 102137193 A | 7/2011 |
| CN | 102160043 A | 8/2011 |
| CN | 102201235 A | 9/2011 |
| CN | 102214187 A | 10/2011 |
| CN | 102237088 A | 11/2011 |
| CN | 102246136 A | 11/2011 |
| CN | 202035047 U | 11/2011 |
| CN | 102282609 A | 12/2011 |
| CN | 202092650 U | 12/2011 |
| CN | 102340590 A | 2/2012 |
| CN | 102346557 A | 2/2012 |
| CN | 102368256 A | 3/2012 |
| CN | 102402985 A | 4/2012 |
| CN | 102405463 A | 4/2012 |
| CN | 102449438 A | 5/2012 |
| CN | 102498457 A | 6/2012 |
| CN | 102510426 A | 6/2012 |
| CN | 102520789 A | 6/2012 |
| CN | 101661754 B | 7/2012 |
| CN | 102629246 A | 8/2012 |
| CN | 102651217 A | 8/2012 |
| CN | 102663016 A | 9/2012 |
| CN | 102681896 A | 9/2012 |
| CN | 102682769 A | 9/2012 |
| CN | 102682771 A | 9/2012 |
| CN | 102685295 A | 9/2012 |
| CN | 102693725 A | 9/2012 |
| CN | 102694909 A | 9/2012 |
| CN | 202453859 U | 9/2012 |
| CN | 102722478 A | 10/2012 |
| CN | 102737104 A | 10/2012 |
| CN | 102750087 A | 10/2012 |
| CN | 102792320 A | 11/2012 |
| CN | 102801853 A | 11/2012 |
| CN | 102820033 A | 12/2012 |
| CN | 102844738 A | 12/2012 |
| CN | 102866828 A | 1/2013 |
| CN | 102870065 A | 1/2013 |
| CN | 102882752 A | 1/2013 |
| CN | 102890936 A | 1/2013 |
| CN | 102915731 A | 2/2013 |
| CN | 102917004 A | 2/2013 |
| CN | 102917271 A | 2/2013 |
| CN | 102918493 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103064956 A | 4/2013 |
| CN | 103093334 A | 5/2013 |
| CN | 103135916 A | 6/2013 |
| CN | 103198831 A | 7/2013 |
| CN | 103209369 A | 7/2013 |
| CN | 103226949 A | 7/2013 |
| CN | 103236260 A | 8/2013 |
| CN | 103246638 A | 8/2013 |
| CN | 103268315 A | 8/2013 |
| CN | 103280218 A | 9/2013 |
| CN | 103292437 A | 9/2013 |
| CN | 103327063 A | 9/2013 |
| CN | 103365279 A | 10/2013 |
| CN | 103366741 A | 10/2013 |
| CN | 203249629 U | 10/2013 |
| CN | 103390016 A | 11/2013 |
| CN | 103412789 A | 11/2013 |
| CN | 103414949 A | 11/2013 |
| CN | 103426428 A | 12/2013 |
| CN | 103455234 A | 12/2013 |
| CN | 103456306 A | 12/2013 |
| CN | 103475551 A | 12/2013 |
| CN | 103477592 A | 12/2013 |
| CN | 103533143 A | 1/2014 |
| CN | 103533154 A | 1/2014 |
| CN | 103543902 A | 1/2014 |
| CN | 103562863 A | 2/2014 |
| CN | 103582896 A | 2/2014 |
| CN | 103608859 A | 2/2014 |
| CN | 103620605 A | 3/2014 |
| CN | 103645876 A | 3/2014 |
| CN | 103677261 A | 3/2014 |
| CN | 103714816 A | 4/2014 |
| CN | 103716454 A | 4/2014 |

(56) References Cited

FOREIGN PATENT DOCUMENTS

| | | | |
|---|---|---|---|
| CN | 103727948 A | 4/2014 |
| CN | 103744761 A | 4/2014 |
| CN | 103760984 A | 4/2014 |
| CN | 103765385 A | 4/2014 |
| CN | 103792985 A | 5/2014 |
| CN | 103794212 A | 5/2014 |
| CN | 103795850 A | 5/2014 |
| CN | 103809548 A | 5/2014 |
| CN | 103841268 A | 6/2014 |
| CN | 103885663 A | 6/2014 |
| CN | 103902373 A | 7/2014 |
| CN | 103930945 A | 7/2014 |
| CN | 103959751 A | 7/2014 |
| CN | 203721183 U | 7/2014 |
| CN | 103971680 A | 8/2014 |
| CN | 104007832 A | 8/2014 |
| CN | 104036774 A | 9/2014 |
| CN | 104038621 A | 9/2014 |
| CN | 104050153 A | 9/2014 |
| CN | 104090652 A | 10/2014 |
| CN | 104113471 A | 10/2014 |
| CN | 104125322 A | 10/2014 |
| CN | 104144377 A | 11/2014 |
| CN | 104145304 A | 11/2014 |
| CN | 104169837 A | 11/2014 |
| CN | 104180815 A | 12/2014 |
| CN | 104243699 A | 12/2014 |
| CN | 104281259 A | 1/2015 |
| CN | 104281390 A | 1/2015 |
| CN | 104284257 A | 1/2015 |
| CN | 104335207 A | 2/2015 |
| CN | 104335234 A | 2/2015 |
| CN | 104350454 A | 2/2015 |
| CN | 104360990 A | 2/2015 |
| CN | 104374399 A | 2/2015 |
| CN | 104423625 A | 3/2015 |
| CN | 104423780 A | 3/2015 |
| CN | 104427104 A | 3/2015 |
| CN | 104463552 A | 3/2015 |
| CN | 104464733 A | 3/2015 |
| CN | 104487929 A | 4/2015 |
| CN | 104516522 A | 4/2015 |
| CN | 104573472 A | 4/2015 |
| CN | 104575493 A | 4/2015 |
| CN | 104575501 A | 4/2015 |
| CN | 104584010 A | 4/2015 |
| CN | 104604274 A | 5/2015 |
| CN | 104679472 A | 6/2015 |
| CN | 104699746 A | 6/2015 |
| CN | 104769584 A | 7/2015 |
| CN | 104821934 A | 8/2015 |
| CN | 104836909 A | 8/2015 |
| CN | 104854583 A | 8/2015 |
| CN | 104867492 A | 8/2015 |
| CN | 104869342 A | 8/2015 |
| CN | 104951077 A | 9/2015 |
| CN | 104967748 A | 10/2015 |
| CN | 104969289 A | 10/2015 |
| CN | 104978963 A | 10/2015 |
| CN | 105025051 A | 11/2015 |
| CN | 105027197 A | 11/2015 |
| CN | 105093526 A | 11/2015 |
| CN | 105100356 A | 11/2015 |
| CN | 105164719 A | 12/2015 |
| CN | 105190607 A | 12/2015 |
| CN | 105247511 A | 1/2016 |
| CN | 105247551 A | 1/2016 |
| CN | 105264524 A | 1/2016 |
| CN | 105278681 A | 1/2016 |
| CN | 105320251 A | 2/2016 |
| CN | 105320726 A | 2/2016 |
| CN | 105379234 A | 3/2016 |
| CN | 105430186 A | 3/2016 |
| CN | 105471705 A | 4/2016 |
| CN | 105472587 A | 4/2016 |
| CN | 105556592 A | 5/2016 |
| CN | 105808200 A | 7/2016 |
| CN | 105830048 A | 8/2016 |
| CN | 105869641 A | 8/2016 |
| CN | 105917311 A | 8/2016 |
| CN | 106030699 A | 10/2016 |
| CN | 106062734 A | 10/2016 |
| CN | 106415412 A | 2/2017 |
| CN | 106462383 A | 2/2017 |
| CN | 106463114 A | 2/2017 |
| CN | 106465074 A | 2/2017 |
| CN | 106534469 A | 3/2017 |
| CN | 106773742 A | 5/2017 |
| CN | 106776581 A | 5/2017 |
| CN | 107004412 A | 8/2017 |
| CN | 107450800 A | 12/2017 |
| CN | 107480161 A | 12/2017 |
| CN | 107491285 A | 12/2017 |
| CN | 107491468 A | 12/2017 |
| CN | 107545262 A | 1/2018 |
| CN | 107608998 A | 1/2018 |
| CN | 107615378 A | 1/2018 |
| CN | 107623616 A | 1/2018 |
| CN | 107786730 A | 3/2018 |
| CN | 107852436 A | 3/2018 |
| CN | 107871500 A | 4/2018 |
| CN | 107919123 A | 4/2018 |
| CN | 107924313 A | 4/2018 |
| CN | 107978313 A | 5/2018 |
| CN | 108647681 A | 10/2018 |
| CN | 109447234 A | 3/2019 |
| CN | 109657629 A | 4/2019 |
| CN | 110135411 A | 8/2019 |
| CN | 105164719 B | 11/2019 |
| CN | 110531860 A | 12/2019 |
| CN | 110598671 A | 12/2019 |
| CN | 110647274 A | 1/2020 |
| CN | 110825469 A | 2/2020 |
| CN | 111316203 A | 6/2020 |
| DE | 202016008226 U1 | 5/2017 |
| EP | 1410203 A2 | 4/2004 |
| EP | 2184668 A1 | 5/2010 |
| EP | 2309491 A1 | 4/2011 |
| EP | 2329348 A1 | 6/2011 |
| EP | 2339576 A2 | 6/2011 |
| EP | 2355093 A2 | 8/2011 |
| EP | 2393056 A1 | 12/2011 |
| EP | 2400373 A1 | 12/2011 |
| EP | 2431842 A2 | 3/2012 |
| EP | 2523109 A1 | 11/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2639792 A1 | 9/2013 |
| EP | 2669889 A2 | 12/2013 |
| EP | 2672229 A2 | 12/2013 |
| EP | 2672231 A2 | 12/2013 |
| EP | 2675147 A1 | 12/2013 |
| EP | 2680257 A1 | 1/2014 |
| EP | 2683147 A1 | 1/2014 |
| EP | 2683175 A1 | 1/2014 |
| EP | 2672231 A3 | 4/2014 |
| EP | 2717259 A2 | 4/2014 |
| EP | 2725577 A2 | 4/2014 |
| EP | 2733598 A2 | 5/2014 |
| EP | 2733896 A1 | 5/2014 |
| EP | 2743846 A2 | 6/2014 |
| EP | 2760015 A1 | 7/2014 |
| EP | 2779160 A1 | 9/2014 |
| EP | 2781883 A2 | 9/2014 |
| EP | 2787683 A1 | 10/2014 |
| EP | 2801890 A1 | 11/2014 |
| EP | 2801972 A1 | 11/2014 |
| EP | 2801974 A2 | 11/2014 |
| EP | 2824564 A1 | 1/2015 |
| EP | 2849177 A1 | 3/2015 |
| EP | 2879402 A1 | 6/2015 |

(56) References Cited

FOREIGN PATENT DOCUMENTS

| | | |
|---|---|---|
| EP | 2881939 A1 | 6/2015 |
| EP | 2891049 A1 | 7/2015 |
| EP | 2930715 A1 | 10/2015 |
| EP | 2938022 A1 | 10/2015 |
| EP | 2940556 A1 | 11/2015 |
| EP | 2947859 A1 | 11/2015 |
| EP | 2950307 A1 | 12/2015 |
| EP | 2957986 A1 | 12/2015 |
| EP | 2973380 A2 | 1/2016 |
| EP | 2985984 A2 | 2/2016 |
| EP | 2891049 A4 | 3/2016 |
| EP | 3032532 A1 | 6/2016 |
| EP | 3035329 A1 | 6/2016 |
| EP | 3038333 A1 | 6/2016 |
| EP | 3115905 A1 | 1/2017 |
| EP | 3125097 A2 | 2/2017 |
| EP | 2672231 B1 | 5/2017 |
| EP | 3161612 A1 | 5/2017 |
| EP | 3224708 A1 | 10/2017 |
| EP | 3246916 A1 | 11/2017 |
| EP | 3300074 A1 | 3/2018 |
| EP | 2973380 B1 | 8/2018 |
| EP | 2983065 B1 | 8/2018 |
| EP | 3392876 A1 | 10/2018 |
| EP | 3401773 A1 | 11/2018 |
| EP | 2973002 B1 | 6/2019 |
| EP | 3506151 A1 | 7/2019 |
| EP | 3323058 B1 | 2/2020 |
| IN | 2011MU01369 A | 7/2011 |
| IN | 2011MU01537 A | 7/2011 |
| IN | 2011MU01120 A | 8/2011 |
| IN | 2011MU01174 A | 8/2011 |
| IN | 2011MU00868 A | 9/2011 |
| IN | 2011MU03716 A | 2/2012 |
| IN | 2012MU01227 A | 6/2012 |
| JP | 8-339288 A | 12/1996 |
| JP | 2004-235894 A | 8/2004 |
| JP | 2005-275925 A | 10/2005 |
| JP | 2006-227611 A | 8/2006 |
| JP | 2008-70805 A | 3/2008 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-237621 A | 11/2011 |
| JP | 2011-238022 A | 11/2011 |
| JP | 2011-250027 A | 12/2011 |
| JP | 2012-14394 A | 1/2012 |
| JP | 2012-502377 A | 1/2012 |
| JP | 2012-22478 A | 2/2012 |
| JP | 2012-33997 A | 2/2012 |
| JP | 2012-37619 A | 2/2012 |
| JP | 2012-63536 A | 3/2012 |
| JP | 2012-508530 A | 4/2012 |
| JP | 2012-89020 A | 5/2012 |
| JP | 2012-116442 A | 6/2012 |
| JP | 2012-142744 A | 7/2012 |
| JP | 2012-147063 A | 8/2012 |
| JP | 2012-150804 A | 8/2012 |
| JP | 2012-518847 A | 8/2012 |
| JP | 2012-211932 A | 11/2012 |
| JP | 2013-37688 A | 2/2013 |
| JP | 2013-46171 A | 3/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-80476 A | 5/2013 |
| JP | 2013-517566 A | 5/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2013-148419 A | 8/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2013-257694 A | 12/2013 |
| JP | 2013-258600 A | 12/2013 |
| JP | 2014-2586 A | 1/2014 |
| JP | 2014-10688 A | 1/2014 |
| JP | 2014-502445 A | 1/2014 |
| JP | 2014-26629 A | 2/2014 |
| JP | 2014-45449 A | 3/2014 |
| JP | 2014-507903 A | 3/2014 |
| JP | 2014-60600 A | 4/2014 |
| JP | 2014-72586 A | 4/2014 |
| JP | 2014-77969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-519648 A | 8/2014 |
| JP | 2014-191272 A | 10/2014 |
| JP | 2014-219614 A | 11/2014 |
| JP | 2014-222514 A | 11/2014 |
| JP | 2015-4928 A | 1/2015 |
| JP | 2015-8001 A | 1/2015 |
| JP | 2015-12301 A | 1/2015 |
| JP | 2015-18365 A | 1/2015 |
| JP | 2015-501022 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 2015-519675 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-504651 A | 2/2016 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2016-536648 A | 11/2016 |
| JP | 2017-19331 A | 1/2017 |
| JP | 2017-516153 A | 6/2017 |
| JP | 2017-123187 A | 7/2017 |
| JP | 2017-537361 A | 12/2017 |
| JP | 6291147 B1 | 2/2018 |
| JP | 2018-101242 A | 6/2018 |
| JP | 2018-113035 A | 7/2018 |
| JP | 2018-525950 A | 9/2018 |
| KR | 2001-0092415 | 10/2001 |
| KR | 10-2006-0061190 A | 6/2006 |
| KR | 10-2007-0061116 A | 6/2007 |
| KR | 10-2007-0094767 A | 9/2007 |
| KR | 10-2007-0098957 A | 10/2007 |
| KR | 10-2008-0059332 A | 6/2008 |
| KR | 10-2010-0048571 A | 5/2010 |
| KR | 10-2011-0005937 A | 1/2011 |
| KR | 10-2011-0013625 A | 2/2011 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |

(56) References Cited

FOREIGN PATENT DOCUMENTS

| | | |
|---|---|---|
| KR | 10-2011-0086492 A | 7/2011 |
| KR | 10-2011-0100620 A | 9/2011 |
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |
| KR | 10-2012-0066523 A | 6/2012 |
| KR | 10-2012-0082371 A | 7/2012 |
| KR | 10-2012-0084472 A | 7/2012 |
| KR | 10-1178310 B1 | 8/2012 |
| KR | 10-2012-0120316 A | 11/2012 |
| KR | 10-2012-0137424 A | 12/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0024271 A | 2/2014 |
| KR | 10-2014-0031283 A | 3/2014 |
| KR | 10-2014-0033574 A | 3/2014 |
| KR | 10-2014-0042994 A | 4/2014 |
| KR | 10-2014-0055204 A | 5/2014 |
| KR | 10-2014-0059697 A | 5/2014 |
| KR | 10-2014-0068752 A | 6/2014 |
| KR | 10-2014-0088449 A | 7/2014 |
| KR | 10-2014-0106715 A | 9/2014 |
| KR | 10-2014-0147557 A | 12/2014 |
| KR | 10-2015-0013631 A | 2/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-2015-0062811 A | 6/2015 |
| KR | 10-2015-0095624 A | 8/2015 |
| KR | 10-1555742 B1 | 9/2015 |
| KR | 10-2015-0113127 A | 10/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101198 A | 8/2016 |
| KR | 10-2016-0105847 A | 9/2016 |
| KR | 10-2016-0121585 A | 10/2016 |
| KR | 10-2016-0140694 A | 12/2016 |
| KR | 10-2017-0036805 A | 4/2017 |
| KR | 10-2017-0104006 A | 9/2017 |
| KR | 10-2017-0107058 A | 9/2017 |
| KR | 10-1776673 B1 | 9/2017 |
| KR | 10-2018-0032632 A | 3/2018 |
| KR | 10-2018-0034637 A | 4/2018 |
| KR | 10-1959328 B1 | 3/2019 |
| KR | 10-2020-0105519 A | 9/2020 |
| TW | 201110108 A | 3/2011 |
| TW | 201142823 A1 | 12/2011 |
| TW | 201227715 A | 7/2012 |
| TW | 201245989 A | 11/2012 |
| TW | 201312548 A | 3/2013 |
| TW | 201407184 A | 2/2014 |
| TW | 201610982 A | 3/2016 |
| TW | 201629750 A | 8/2016 |
| WO | 2002/075542 A2 | 9/2002 |
| WO | 2002/088880 A2 | 11/2002 |
| WO | 2010/054373 A2 | 5/2010 |
| WO | 2010/109358 A1 | 9/2010 |
| WO | 2011/028842 A2 | 3/2011 |
| WO | 2011/057346 A1 | 5/2011 |
| WO | 2011/060106 A1 | 5/2011 |
| WO | 2011/082521 A1 | 7/2011 |
| WO | 2011/088053 A2 | 7/2011 |
| WO | 2011/093025 A1 | 8/2011 |
| WO | 2011/100142 A2 | 8/2011 |
| WO | 2011/116309 A1 | 9/2011 |
| WO | 2011/123122 A1 | 10/2011 |
| WO | 2011/133543 A1 | 10/2011 |
| WO | 2011/133573 A2 | 10/2011 |
| WO | 2011/097309 A3 | 12/2011 |
| WO | 2011/150730 A1 | 12/2011 |
| WO | 2011/163350 A1 | 12/2011 |
| WO | 2011/088053 A3 | 1/2012 |
| WO | 2012/008434 A1 | 1/2012 |
| WO | 2012/019020 A1 | 2/2012 |
| WO | 2012/019637 A1 | 2/2012 |
| WO | 2012/063260 A2 | 5/2012 |
| WO | 2012/084965 A1 | 6/2012 |
| WO | 2012/092562 A1 | 7/2012 |
| WO | 2012/112331 A2 | 8/2012 |
| WO | 2012/129231 A1 | 9/2012 |
| WO | 2012/063260 A3 | 10/2012 |
| WO | 2012/135157 A2 | 10/2012 |
| WO | 2012/154317 A1 | 11/2012 |
| WO | 2012/154748 A1 | 11/2012 |
| WO | 2012/155079 A2 | 11/2012 |
| WO | 2012/160567 A1 | 11/2012 |
| WO | 2012/167168 A2 | 12/2012 |
| WO | 2012/173902 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/057153 A1 | 4/2013 |
| WO | 2013/101489 A1 | 7/2013 |
| WO | 2013/118988 A1 | 8/2013 |
| WO | 2013/122310 A1 | 8/2013 |
| WO | 2013/128999 A1 | 9/2013 |
| WO | 2013/133533 A1 | 9/2013 |
| WO | 2013/137660 A1 | 9/2013 |
| WO | 2013/163113 A1 | 10/2013 |
| WO | 2013/163857 A1 | 11/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/004544 A2 | 1/2014 |
| WO | 2014/021967 A1 | 2/2014 |
| WO | 2014/022148 A1 | 2/2014 |
| WO | 2014/028735 A2 | 2/2014 |
| WO | 2014/028797 A1 | 2/2014 |
| WO | 2014/031505 A1 | 2/2014 |
| WO | 2014/032461 A1 | 3/2014 |
| WO | 2014/046475 A1 | 3/2014 |
| WO | 2014/047047 A1 | 3/2014 |
| WO | 2014/048855 A1 | 4/2014 |
| WO | 2014/066352 A1 | 5/2014 |
| WO | 2014/070872 A2 | 5/2014 |
| WO | 2014/078965 A1 | 5/2014 |
| WO | 2014/093339 A1 | 6/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144395 A2 | 9/2014 |
| WO | 2014/144579 A1 | 9/2014 |
| WO | 2014/144949 A2 | 9/2014 |
| WO | 2014/151153 A2 | 9/2014 |
| WO | 2014/124332 A3 | 10/2014 |
| WO | 2014/159578 A1 | 10/2014 |
| WO | 2014/159581 A1 | 10/2014 |
| WO | 2014/162570 A1 | 10/2014 |
| WO | 2014/169269 A1 | 10/2014 |
| WO | 2014/173189 A1 | 10/2014 |

(56) References Cited

FOREIGN PATENT DOCUMENTS

| | | |
|---|---|---|
| WO | 2013/173504 A8 | 12/2014 |
| WO | 2014/197336 A1 | 12/2014 |
| WO | 2014/197635 A2 | 12/2014 |
| WO | 2014/197730 A1 | 12/2014 |
| WO | 2014/200728 A1 | 12/2014 |
| WO | 2014/204659 A2 | 12/2014 |
| WO | 2014/210392 A2 | 12/2014 |
| WO | 2015/018440 A1 | 2/2015 |
| WO | 2015/020942 A1 | 2/2015 |
| WO | 2015/029379 A1 | 3/2015 |
| WO | 2015/030796 A1 | 3/2015 |
| WO | 2015/036817 A1 | 3/2015 |
| WO | 2015/041882 A1 | 3/2015 |
| WO | 2015/041892 A1 | 3/2015 |
| WO | 2015/047932 A1 | 4/2015 |
| WO | 2015/053485 A1 | 4/2015 |
| WO | 2015/080530 A1 | 6/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/098306 A1 | 7/2015 |
| WO | 2015/099939 A1 | 7/2015 |
| WO | 2015/112625 A1 | 7/2015 |
| WO | 2015/116151 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/039992 A1 | 3/2016 |
| WO | 2016/040721 A1 | 3/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/085776 A1 | 6/2016 |
| WO | 2016/089029 A1 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/144983 A1 | 9/2016 |
| WO | 2016/175354 A1 | 11/2016 |
| WO | 2016/187149 A1 | 11/2016 |
| WO | 2016/190950 A1 | 12/2016 |
| WO | 2016/209444 A1 | 12/2016 |
| WO | 2016/209924 A1 | 12/2016 |
| WO | 2017/044160 A1 | 3/2017 |
| WO | 2017/044257 A1 | 3/2017 |
| WO | 2017/044260 A1 | 3/2017 |
| WO | 2017/044629 A1 | 3/2017 |
| WO | 2017/053311 A1 | 3/2017 |
| WO | 2017/058293 A1 | 4/2017 |
| WO | 2017/059388 A1 | 4/2017 |
| WO | 2017/071420 A1 | 5/2017 |
| WO | 2017/142116 A1 | 8/2017 |
| WO | 2017/160487 A1 | 9/2017 |
| WO | 2017/213678 A1 | 12/2017 |
| WO | 2017/213682 A1 | 12/2017 |
| WO | 2017/218194 A1 | 12/2017 |
| WO | 2018/009397 A1 | 1/2018 |
| WO | 2018/044633 A1 | 3/2018 |
| WO | 2018/067528 A1 | 4/2018 |
| WO | 2018/213401 A1 | 11/2018 |
| WO | 2018/213415 A1 | 11/2018 |
| WO | 2019/067930 A1 | 4/2019 |
| WO | 2019/078576 A1 | 4/2019 |
| WO | 2019/079017 A1 | 4/2019 |
| WO | 2019/143397 A1 | 7/2019 |
| WO | 2019/147429 A1 | 8/2019 |
| WO | 2019/236217 A1 | 12/2019 |
| WO | 2020/010530 A1 | 1/2020 |

OTHER PUBLICATIONS

Aaaaplay, "Sony Media Remote for iOS and Android", Online available at: <https://www.youtube.com/watch?v=W8QoeQhlGok>, Feb. 4, 2012, 3 pages.
"Accessibility on iOS", Apple Inc., Online available at: https://developer.apple.com/accessibility/ios/, Retrieved on Jul. 26, 2021, 2 pages.
Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.
Android Authority, "How to use Tasker: A Beginner's Guide", Online available at:—<https://youtube.com/watch?v= rDpdS_YWzFc>, May 1, 2013, 1 page.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
beointegration.com, "BeoLink Gateway—Programming Example", Online Available at: <https://www.youtube.com/watch?v=TXDaJFm5UH4>, Mar. 4, 2015, 3 pages.
Blum, et al., "What's around Me? Spatialized Audio Augmented Reality for Blind Users with a Smartphone", In International Conference on Mobile and Ubiquitous Systems: Computing, Networking, and Services. Springer, Online available at: https://eudl.eu/pdf/10.1007/978-3-642-30973-1_5, 2011, pp. 49-62.
Bodapati et al., "Neural Word Decomposition Models for Abusive Language Detection", Proceedings of the Third Workshop on Abusive Language Online, Aug. 1, 2019, pp. 135-145.
Büttner, et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
Chen et al., "A Convolutional Neural Network with Dynamic Correlation Pooling", 13th International Conference on Computational Intelligence and Security, IEEE, 2017, pp. 496-499.
Chen, Angela, "Amazon's Alexa now handles patient health information", Available online at: <https:/www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at https://www.ifanr.com/weizhizao/612531, Jan. 25, 2016, 7 pages (Official Copy Only). {See communication under 37 CFR § 1.98(a) (3)}.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Coulouris et al., "Distributed Systems: Conceptsand Design (Fifth Edition)", Addison-Wesley, 2012, 391 pages.
Dai, et al., "Transformer-XL: Attentive Language Models Beyond a Fixed-Length Context", Online available at: arXiv:1901.02860v3, Jun. 2, 2019, 20 pages.
Derrick, Amanda, "How to Set Up Google Home for Multiple Users", Lifewire, Online available at:—<https://www.lifewire.com/set-up-google-home-multiple-users-4685691>, Jun. 8, 2020, 9 pages.

(56) References Cited

OTHER PUBLICATIONS

Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
Dwork et al., "The Algorithmic Foundations of Differential Privacy", Foundations and Trends in Theoretical Computer Science: vol. 9: No. 3-4, 211-407, 2014, 281 pages.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Gadget Hacks, "Tasker Too Complicated? Give MacroDroid a Try [How-To]", Online available at: <https://www.youtube.com/watch?v=8YL9cWCykKc>, May 27, 2016, 1 page.
Gatys et al., "Image Style Transfer Using Convolutional Neural Networks", Proceedings of IEEE International Conference on Acoustics, Speech and Signal Processing (ICASSP), 2016, pp. 2414 2423.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Graves, Alex, "Sequence Transduction with Recurrent Neural Networks", Proceeding of International Conference of Machine Learning (ICML) Representation Learning Workshop, Nov. 14, 2012, 9 pages.
Gu et al., "BadNets: Evaluating Backdooring Attacks on Deep Neural Networks", IEEE Access, vol. 7, Mar. 21, 2019, pp. 47230-47244.
Guo et al., "Time-Delayed Bottleneck Highway Networks Using a DFT Feature for Keyword Spotting", IEEE International Conference on Acoustics, Speech and Signal Processing (Icassp). IEEE, 2018, 5 pages.
Guo, et al., "StateLens: A Reverse Engineering Solution for Making Existing Dynamic Touchscreens Accessible", In Proceedings of the 32nd Annual Symposium on User Interface Software and Technology (UIST'19), New Orleans, LA, USA, Online available at: https://dl.acm.org/doi/pdf/10.1145/3332165.3347873, October 20-23, 2019, pp. 371-385.
Guo, et al., "VizLens: A Robust and Interactive Screen Reader for Interfaces in the Real World", In Proceedings of the 29th Annual Symposium on User Interface Software and Technology (UIST'16), Tokyo, Japan, Online available at: https://dl.acm.org/doi/pdf/10.1145/2984511.2984518, Oct. 16-19, 2016, pp. 651-664.
Gupta, Naresh, "Inside Bluetooth Low Energy", Artech House, 2013, 274 pages.
Haung et al., "A Study for Improving Device-Directed Speech Detection Toward Frictionless Human-Machine Interaction", in Proc. Interspeech, 2019, 5 pages.
Heller, et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hinton et al., "Distilling the Knowledge in A Neural Network", arXiv preprintarXiv:1503.02531, Mar. 2, 2015, 9 pages.
Hutsko et al., "iPhone All-in-One For Dummies", 3rd Edition, 2013, 98 pages.
Idasallinen, "What's The 'Like' Meter Based on?", Online Available at:—<https://community.spotify.com/t5/Content-Questions/What-s-the-like-meter-based-on/td-p/1209974>, Sep. 22, 2015, 6 pages.
Ikeda, Masaru, "beGLOBAL SEOUL 2015 Startup Battle: Talkey", YouTube Publisher, Online Available at:—<https://www.youtube.com/watch?v=4Wkp7sAAIdg>, May 14, 2015, 1 page.
"IPhone 6 Smart Guide Full Version for SoftBank", Gijutsu-Hyohron Co., Ltd., vol. 1, Dec. 1, 2014, 4 pages (Official Copy Only). {See communication under 37 CFR § 1.98(a) (3)}.
Jayant, et al., "Supporting Blind Photography", In Proceedings of the 13th International ACM SIGACCESS Conference on Computers and Accessibility, ASSETS'11, Dundee, Scotland, UK, Online available at: https://dl.acm.org/doi/pdf/10.1145/2049536.2049573, Oct. 24-26, 2011, pp. 203-210.
Jeon et al., "Voice Trigger Detection from LVCSR Hypothesis Lattices Using Bidirectional Lattice Recurrent Neural Networks", International Conference on Acoustics, Speech and Signal Processing (ICASSP). IEEE, Feb. 29, 2020, 5 pages.
Jiangwei606, "[Zhuan] Play "Zhuan" Siri-Siri Function Excavation", Available online at: https://www.feng.com/post/3255659, Nov. 12, 2011, 30 pages (17 pages of English Translation and 13 pages of Official Copy).
Kannan et al., "Smart Reply: Automated Response Suggestion for Email", Available Online at: https://arxiv.org/pdf/1606.04870.pdf, Jun. 15, 2016, 10 pages.
Kastrenakes, Jacob, "Siri's creators will unveil their new AI bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.
Kondrat, Tomek, "Automation for Everyone with MacroDroid", Online available at: https://www.xda-developers.com/automation-for-everyone-with-macrodroid/, Nov. 17, 2013, 6 pages.
Kumatani et al., "Direct Modeling of Raw Audio with DNNS For Wake Word Detection", in 2017 IEEE Automatic Speech Recognition and Understanding Workshop (ASRU), 2017, 6 pages.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at:—<https://support.google.com/assistant/answer/9071681?co=GENIE.Platform%3DAndroid&hl=en>, Retrieved on Jul. 1, 2020, 2 pages.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.
Maas et al., "Combining Acoustic Embeddings And Decoding Features for End-Of-Utterance Detection in Real-Time Far-Field Speech Recognition Systems", in 2018 IEEE International Conference on Acoustics, Speech and Signal Processing (ICASSP). IEEE, 2018, 5 pages.
Mallidi et al., "Device-Directed Utterance Detection", Proc. Interspeech, Aug. 7, 2018, 4 pages.
"Microsoft Soundscape—A map delivered in 3D sound", Microsoft Research, Online available at: https://www.microsoft.com/en-us/research/product/soundscape/, Retrieved on Jul. 26, 2021, 5 pages.
Mnih et al., "Human-Level Control Through Deep Reinforcement Learning", Nature, vol. 518, Feb. 26, 2015, pp. 529-533.
Modern Techies,"Braina-Artificial Personal Assistant for PC (like Cortana, Siri)!!!!", Online available at: <https://www.youtube.com/watch?v=_Coo2P8ilqQ>, Feb. 24, 2017, 3 pages.
Muller et al., "Control Theoretic Models of Pointing", ACM Transactions on Computer-Human Interaction, Aug. 2017, 36 pages.
Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.

(56) References Cited

OTHER PUBLICATIONS

Nakamura et al., "Study of Methods to Diminish Spoilers of Sports Match: Potential of a Novel Concept"Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412 (Official Copy Only). {See communication under 37 CFR § 1.98(a) (3)}.
Norouzian et al., "Exploring Attention Mechanism for Acoustic based Classification of Speech Utterances into System-Directed and Non-System-Directed", International Conference on Acoustics, Speech and Signal Processing (ICASSP). IEEE, Feb. 1, 2019, 5 pages.
Notice of Allowance received for Japanese Patent Application No. 2018-162033, dated Jan. 31, 2020, 6 pages (3 pages of English Translation and 3 pages of Official Copy).
Notice of Allowance received for Korean Patent Application No. 10-2020-7025769, dated Jun. 9, 2021, 3 pages (1 page of English Translation and 2 pages of Official Copy).
Office Action received for Australian Patent Application No. 2020201464, dated Feb. 11, 2021, 4 pages.
Office Action received for Chinese Patent Application No. 202010842958.0, dated Feb. 26, 2021, 16 pages (7 pages of English Translation and 9 pages of Official Copy).
Office Action received for Chinese Patent Application No. 202010844566.8, dated Mar. 26, 2021, 13 pages (5 pages of English Translation and 8 pages of Official Copy).
Office Action received for Korean Patent Application No. 10-2020-7025769, dated Apr. 8, 2021, 6 pages (3 pages of English Translation and 3 pages of Official Copy).
Office Action received for Korean Patent Application No. 10-2020-7025769, dated Dec. 2, 2020, 9 pages (4 pages of English Translation and 5 pages of Official Copy).
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pavlopoulos et al., "ConvAI at SemEval—2019 Task 6: Offensive Language Identification and Categorization with Perspective and BERT", Proceedings of the 13th International Workshop on Semantic Evaluation (SemEval—2019), Jun. 6-7, 2019, pp. 571-576.
PC MAG, "How to Voice Train Your Google Home Smart Speaker", Online available at: <https://in.pcmag.com/google-home/126520/how-to-voice-train-your-google-home-smart-speaker>, Oct. 25, 2018, 12 pages.
Philips, Chris, "Thumbprint Radio: A Uniquely Personal Station Inspired By All of Your Thumbs Up", Pandora News, Online Available at:—<https://blog.pandora.com/author/chris-phillips/>, Dec. 14, 2015, 7 pages.
Ping, et al., "Deep Voice 3: Scaling Text to Speech with Convolutional Sequence Learning", Available online at: https://arxiv.org/abs/1710.07654, Feb. 22, 2018, 16 pages.
pocketables.com,"AutoRemote example profile", Online available at: https://www.youtube.com/watch?v=kC_zhUnNZj8, Jun. 25, 2013, 1 page.
Pose, Cambridge Dictionary Definition of Pose, Available online at: <https://dictionary.cambridge.org/dictionary/english/pose>, 4 pages.
"Radio Stations Tailored to You Based on the Music You Listen to on iTunes", Apple Announces iTunes Radio, Press Release, Jun. 10, 2013, 3 pages.
Rasch, Katharina, "Smart Assistants for Smart Homes", Doctoral Thesis in Electronic and Computer Systems, 2013, 150 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Ritchie, Rene, "QuickType keyboard in iOS 8: Explained", Online Available at:—<https://www.imore.com/quicktype-keyboards-ios-8-explained>, Jun. 21, 2014, pp. 1-19.
Rodrigues, et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.
Ross, et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Rowland et al., "Designing Connected Products: UX for the Consumer Internet of Things", O'Reilly, May 2015, 452 pages.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Seroter et al., "SOA Patterns with BizTalk Server 2013 and Microsoft Azure", Packt Publishing, Jun. 2015, 454 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages (Official Copy Only). {See communication under 37 CFR § 1.98(a) (3)}.
Siou, Serge, "How To Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages (Official Copy Only). {See communication under 37 CFR § 1.98(a) (3)}.
Song, Yang, "Research of Chinese Continuous Digital Speech Input System Based on HTK", Computer and Digital Engineering, vol. 40, No. 4, Dec. 31, 2012, 5 pages (Official Copy Only). {See communication under 37 CFR § 1.98(a) (3)}.
Speicher, et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy, Association for Computational Linguistics., Jun. 4, 2019, 13 pages.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tech Target Contributor, "AI Accelerator", Available online at: https://searchenterpriseai.techtarget.com/definition/AI-accelerator, Apr. 2018, 3 pages.
Tkachenko, Sergey, "Chrome will automatically create Tab Groups", Available online at: https://winaero.com/chrome-will-automatically-create-tab-groups/, Sep. 18, 2020, 5 pages.
Tkachenko, Sergey, "Enable Tab Groups Auto Create in Google Chrome", Available online at: https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages (Official Copy Only). {See communication under 37 CFR § 1.98(a) (3)}.
Vazquez, et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.

(56) References Cited

OTHER PUBLICATIONS

Villemure et al., "The Dragon Drive Innovation Showcase: Advancing the State-of-the-art in Automotive Assistants", 2018, 7 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang, et al., "Tacotron: Towards End to End Speech Synthesis", Available online at: https://arxiv.org/abs/1703.10135, Apr. 6, 2017, 10 pages.
Wang, et al., "Training Deep Neural Networks with 8-bit Floating Point Numbers", 32nd Conference on Neural Information Processing Systems (Neurl PS 2018), 2018, 10 pages.
"What's on Spotify?", Music for everyone, Online Available at:—<https://web.archive.org/web/20160428115328/https://www.spotify.com/us/>, Apr. 28, 2016, 6 pages.
Win, et al., "Myanmar Text to Speech System based on Tacotron-2", International Conference on Information and Communication Tehcnology Convergence (ICTC), Oct. 21-23, 2020, pp. 578-583.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
Xu et al., "Show, Attend and Tell: Neural Image Caption Generation with Visual Attention", Proceedings of the 32nd International Conference on Machine Learning, Lille, France, 2015, 10 pages.
Yang Astor, "Control Android TV via Mobile Phone APP RKRemoteControl", Online Available at: <https://www.youtube.com/watch?v=zpmUeOX_xro>, Mar. 31, 2015, 4 pages.
Ye et al., "iPhone 4S Native Secret", Jun. 30, 2012, 1 page (Official Copy Only). {See communication under 37 CFR § 1.98(a) (3)}.
Young et al., "POMDP-Based Statistical Spoken Dialog Systems: A Review", Proceedings of the IEEE, vol. 101, No. 5, 2013, 18 pages.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Zhan et al., "Play with Android Phones", Feb. 29, 2012, 1 page (Official Copy Only). {See communication under 37 CFR § 1.98(a) (3)}.
Zhang et al., "Very Deep Convolutional Networks for End-To-End Speech Recognition", IEEE International Conference on Acoustics, Speech and Signal Processing (ICASSP), 2017, 5 pages.
Zhang, et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.
Zhao, et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao, et al., "Enabling People with Visual Impairmentsto Navigate Virtual Reality with a Haptic and Auditory Cane Simulation", In Proceedings of the 2018 CHI Conference on Human Factors in Computing Systems (CHI '18). ACM, Article 116, Montreal, QC, Canada, Online available at: https://dl.acm.org/doi/pdf/10.1145/3173574.3173690, Apr. 21-26, 2018, 14 pages.
Zhao, et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zheng, et al., "Intent Detection and Semantic Parsing for Navigation Dialogue Language Processing", 2017 IEEE 20th International Conference on Intelligent Transportation Systems (ITSC), 2017, 6 pages.
Zhou et al., "Learning Dense Correspondence via 3D-guided Cycle Consistency", Proceedings of the IEEE Conference on Computer Vision and Pattern Recognition (CVPR), 2016, 10 pages.
Notice of Acceptance received for Australian Patent Application No. 2020201464, dated Sep. 7, 2021, 3 pages.
Decision on Appeal received for U.S. Appl. No. 16/532,930, dated Aug. 2, 2021, 8 pages.
Record of Oral Hearing received for U.S. Appl. No. 16/532,930, dated Aug. 4, 2021, 13 pages.
Adium, "AboutAdium—Adium X—Trac", Online available at:—<http://web.archive.org/web/20070819113247/http://trac.adiumx.com/wiki/AboutAdium>, retrieved on Nov. 25, 2011, 2 pages.
Advisory Action received for U.S. Appl. No. 13/894,350, dated Sep. 21, 2017, 3 pages.
"Alexa, Turn Up the Heat!, Smartthings Samsung [online]", Online available at:—<https://web.archive.org/web/20160329142041/https://blog.smartthings.com/news/smar tthingsupdates/alexa-turn-up-the-heat/>, Mar. 3, 2016, 3 pages.
Alfred App, "Alfred", Online available at:—<http://www.alfredapp.com/>, retrieved on Feb. 8, 2012, 5 pages.
Anania Peter, "Amazon Echo with Home Automation (Smartthings)", Online available at:—<https://www.youtube.com/watch?v=LMW6aXmsWNE>, Dec. 20, 2015, 1 page.
Api.Ai, "Android App Review—Speaktoit Assistant", Online available at:—<https://www.youtube.com/watch?v=myE498nyfGw>, Mar. 30, 2011, 3 pages.
Apple, "VoiceOver for OS X", Online available at:—<http://www.apple.com/accessibility/voiceover/>, May 19, 2014, pp. 1-3.
Applicant-Initiated Interview Summary received for U.S. Appl. No. 16/532,930, dated Jun. 30, 2020, 5 pages.
Asakura et al., "What LG thinks; How the TV should be in the Living Room", HiVi, vol. 31, No. 7, Stereo Sound Publishing, Inc., Jun. 17, 2013, pp. 68-71.
Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
Berry et al., "PTIME: Personalized Assistance for Calendaring", ACM Transactions on Intelligent Systems and Technology, vol. 2, No. 4, Article 40, Jul. 2011, pp. 1-22.
Bertolucci, Jeff, "Google Adds Voice Search to Chrome Browser", PC World, Jun. 14, 2011, 5 pages.
Board Opinion received for Chinese Patent Application No. 201380028514.1, dated Jul. 21, 2020, 10 pages.
Burgess, Brian, "Amazon Echo Tip: Enable the Wake Up Sound", Online available at:—<https://www.groovypost.com/howto/amazon-echo-tip-enable-wake-up-sound/>, Jun. 30, 2015, 4 pages.
Butcher, Mike, "EVI Arrives in Town to go Toe-to-Toe with Siri", TechCrunch, Jan. 23, 2012, pp. 1-2.
Cambria et al., "Jumping NLP curves: A Review of Natural Language Processing Research.", IEEE Computational Intelligence magazine, 2014, vol. 9, May 2014, pp. 48-57.
Caraballo et al., "Language Identification Based on a Discriminative Text Categorization Technique", Iberspeech 2012—VII Jornadas En Tecnologia Del Habla And III Iberian Sltech Workshop, Nov. 21, 2012, pp. 1-10.
Castleos, "Whole House Voice Control Demonstration", Online available at:—<https://www.youtube.com/watch?v=9SRCoxrZ_W4>, Jun. 2, 2012, 1 pages.
Chang et al., "Monaural Multi-Talker Speech Recognition with Attention Mechanism and Gated Convolutional Networks", Interspeech 2018, Sep. 2-6, 2018, pp. 1586-1590.

(56) References Cited

OTHER PUBLICATIONS

Chen et al., "Progressive Joint Modeling in Unsupervised Single-Channel Overlapped Speech Recognition", IEEE/ACM Transactions On Audio, Speech, And Language Processing, vol. 26, No. 1, Jan. 2018, pp. 184-196.
Chen, Yi, "Multimedia Siri Finds and Plays Whatever You Ask For", PSFK Report, Feb. 9, 2012, pp. 1-9.
Cheyer, Adam, "Adam Cheyer—About", Online available at:—<http://www.adam.cheyer.com/about.html>, retrieved on Sep. 17, 2012, pp. 1-2.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Corrected Notice of Allowance received for U.S. Appl. No. 13/894,350, dated Jul. 31, 2019, 4 pages.
Czech Lucas, "A System for Recognizing Natural Spelling of English Words", Diploma Thesis, Karlsruhe Institute of Technology, May 7, 2014, 107 pages.
Decision to Grant received for Japanese Patent Application No. 2017-032503, dated Aug. 17, 2018, 4 pages.
Deedeevuu, "Amazon Echo Alarm Feature", Online available at:—<https://www.youtube.com/watch?v=fdjU8eRLk7c>, Feb. 16, 2015, 1 page.
Delcroix et al., "Context Adaptive Deep Neural Networks For Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
"DIRECTV™ Voice", Now Part of the DIRECTTV Mobile App for Phones, Sep. 18, 2013, 5 pages.
Earthling1984, "Samsung Galaxy Smart Stay Feature Explained", Online available at:—<https://www.youtube.com/watch?v=RpjBNtSjupl>, May 29, 2013, 1 page.
Evi, "Meet Evi: The One Mobile Application that Provides Solutions for your Everyday Problems", Feb. 2012, 3 pages.
Examiner's Answer to Appeal Brief received for U.S. Appl. No. 16/532,930, dated Feb. 12, 2021, 12 pages.
Filipowicz, Luke, "How to use the QuickType keyboard in iOS 8", Online available at:—<https://www.imore.com/comment/568232>, Oct. 11, 2014, pp. 1-17.
Final Office Action received for U.S. Appl. No. 13/894,350, dated Dec. 14, 2018, 23 pages.
Final Office Action received for U.S. Appl. No. 13/894,350, dated Jan. 21, 2016, 20 pages.
Final Office Action received for U.S. Appl. No. 13/894,350, dated May 4, 2017, 34 pages.
Final Office Action received for U.S. Appl. No. 16/532,930, dated Jul. 16, 2020, 16 pages.
Findlater et al., "Beyond QWERTY: Augmenting Touch-Screen Keyboards with Multi-Touch Gestures for Non-Alphanumeric Input", CHI '12, May 5-10, 2012, 4 pages.
"Galaxy S7: How to Adjust Screen Timeout & Lock Screen Timeout", Online available at:—<https://www.youtube.com/watch?v=n6e1WKUS2ww>, Jun. 9, 2016, 1 page.
Gannes, Liz, "Alfred App Gives Personalized Restaurant Recommendations", AllThingsD, Jul. 18, 2011, pp. 1-3.
Gasic et al., "Effective Handling of Dialogue State in the Hidden Information State POMDP-based Dialogue Manager", ACM Transactions on Speech and Language Processing, May 2011, pp. 1-25.
Google Developers,"Voice search in your app", Online available at:—<https://www.youtube.com/watch?v=PS1FbB5qWEI>, Nov. 12, 2014, 1 page.
Guay, Matthew, "Location-Driven Productivity with Task Ave", Online available at:—<http://iphone.appstorm.net/reviews/productivity/location-driven-productivity-with-task-ave/>, Feb. 19, 2011, 7 pages.
Guim, Mark, "How to Set a Person-Based Reminder with Cortana", Online available at:—<http://www.wpcentral.com/how-to-person-based-reminder-cortana>, Apr. 26, 2014, 15 pages.

Gupta et al., "I-vector-based Speaker Adaptation Of Deep Neural Networks For French Broadcast Audio Transcription", ICASSP, 2014, 2014, pp. 6334-6338.
Hardawar, Devindra, "Driving App Waze Builds its own Siri for Hands-Free Voice Control", Online available at:—<http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, which can be Operated with your Voice", Shuwa System Co., Ltd., vol. 1, Jul. 5, 2012, pp. 8, 130, 131.
"Headset Button Controller v7.3 APK Full APP Download for Andriod, Blackberry, iPhone", Online available at:—<http://fullappdownload.com/headset-button-controller-v7-3-apk/>, Jan. 27, 2014, 11 pages.
"Hear Voice from Google Translate", Online available at:—<https://www.youtube.com/watch?v=18AvMhFqD28>, Jan. 28, 2011, 1 page.
Hershey et al., "Deep Clustering: Discriminative Embeddings For Segmentation And Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
"How To Enable Google Assistant on Galaxy S7 and Other Android Phones (No Root)", Online available at:—<https://www.youtube.com/watch?v=HeklQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
id3.org, "id3v2.4.0-Frames", Online available at:—<http://id3.org/id3v2.4.0-frames?action=print>, retrieved on Jan. 22, 2015, pp. 1-41.
Inews and Tech,"How To Use The QuickType Keyboard In IOS 8", Online available at:—<http://www.inewsandtech.com/how-to-use-the-quicktype-keyboard-in-ios-8/>, Sep. 17, 2014, 6 pages.
"Interactive Voice", Online available at:—<http://www.helloivee.com/company/>, retrieved on Feb. 10, 2014, 2 pages.
International Preliminary Report on Patentability received for PCT Patent Application No. PCT/US2013/041225, dated Nov. 27, 2014, 9 pages.
International Search Report and Written Opinion received for PCT Patent Application No. PCT/US2013/041225, dated Aug. 23, 2013, 10 pages.
Internet Services and Social Net, "How to Search for Similar Websites", Online available at:—<https://www.youtube.com/watch?v=nLf2uirpt5s>, see from 0:17 to 1:06, Jul. 4, 2013, 1 page.
Isik et al., "Single-Channel Multi-Speaker Separation using Deep Clustering", Interspeech 2016, Sep. 8-12, 2016, pp. 545-549.
Jawaid et al., "Machine Translation with Significant Word Reordering and Rich Target-Side Morphology", WDS'11 Proceedings of Contributed Papers, Part I, 2011, pp. 161-166.
Jonsson et al., "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012,, pp. 4821-4824.
Karn, Ujjwal, "An Intuitive Explanation of Convolutional Neural Networks", The Data Science Blog, Aug. 11, 2016, 23 pages.
Kazmucha Allyson, "How to Send Map Locations Using iMessage", iMore.com, Online available at:—<http://www.imore.com/how-use-imessage-share-your-location-your-iphone>, Aug. 2, 2012, 6 pages.
Kickstarter, "Ivee Sleek: Wi-Fi Voice-Activated Assistant", Online available at:—<https://www.kickstarter.com/projects/ivee/ivee-sleek-wi-fi-voice-activated-assistant>, retrieved on Feb. 10, 2014, pp. 1-13.
King et al., "Robust Speech Recognition Via Anchor Word Representations", Interspeech 2017, Aug. 20-24, 2017, pp. 2471-2475.
Lee, Sungjin, "Structured Discriminative Model For Dialog State Tracking", Proceedings of the SIGDIAL 2013 Conference, Aug. 22-24, 2013, pp. 442-451.
Lewis Cameron, "Task Ave for iPhone Review", Mac Life, Online available at:—<http://www.maclife.com/article/reviews/task_ave_iphone_review>, Mar. 3, 2011, 5 pages.

(56) References Cited

OTHER PUBLICATIONS

Liou et al., "Autoencoder for Words", Neurocomputing, vol. 139, Sep. 2014, pp. 84-96.
Luo et al., "Speaker-Independent Speech Separation With Deep Attractor Network", IEEE/ACM Transactions On Audio, Speech, And Language Processing, vol. 26, No. 4, Apr. 2018, pp. 787-796.
Marketing Land,"Amazon Echo: Play music", Online Available at:—<https://www.youtube.com/watch?v=A7V5NPbsXi4>, Apr. 27, 2015, 3 pages.
"Meet Ivee, Your Wi-Fi Voice Activated Assistant", Availale Online at:—<http://www.helloivee.com/>, retrieved on Feb. 10, 2014, 8 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Miller Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.
"Mobile Speech Solutions, Mobile Accessibility", SVOX AG Product Information Sheet, Online available at:—<http://www.svox.com/site/bra840604/con782768/mob965831936.aSQ?osLang=1>, Sep. 27, 2012, 1 page.
Morrison Jonathan, "iPhone 5 Siri Demo", Online Available at:—<https://www.youtube.com/watch?v=_wHWwG5IhWc>, Sep. 21, 2012, 3 pages.
My Cool Aids, "What's New", Online available at:—<http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group, Feb. 28, 2011, 11 pages.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony Smartwatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 13/894,350, dated Aug. 12, 2016, 22 pages.
Non-Final Office Action received for U.S. Appl. No. 13/894,350, dated Mar. 3, 2015, 15 pages.
Non-Final Office Action received for U.S. Appl. No. 13/894,350, dated Mar. 22, 2018, 23 pages.
Non-Final Office Action received for U.S. Appl. No. 16/532,930, dated Mar. 23, 2020, 13 pages.
Notice of Acceptance received for Australian Patent Application No. 2018204661, dated Dec. 9, 2019, 3 pages.
Notice of Allowance received for Japanese Patent Application No. 2015-512803, dated Jan. 27, 2017, 3 pages.
Notice of Allowance received for Korean Patent Application No. 10-2019-7015056, dated Jun. 19, 2020, 4 pages.
Notice of Allowance received for U.S. Appl. No. 13/894,350, dated May 2, 2019, 13 pages.
Nozawa et al., "iPhone 4S Perfect Manual", vol. 1, First Edition, Nov. 11, 2011, 4 pages.
Office Action received for Australian Patent Application No. 2013262796 dated Jul. 6, 2016, 3 pages.
Office Action received for Australian Patent Application No. 2013262796, dated Aug. 11, 2015, 3 pages.
Office Action received for Australian Patent Application No. 2016213815, dated Apr. 24, 2018, 4 pages.
Office Action received for Australian Patent Application No. 2016213815, dated Jun. 26, 2018, 6 pages.
Office Action received for Australian Patent Application No. 2016213815, dated Jun. 27, 2017, 3 pages.
Office Action received for Australian Patent Application No. 2018204661, dated Jun. 18, 2019, 5 pages.
Office Action received for Australian Patent Application No. 2020201464, dated Sep. 14, 2020, 4 pages.
Office Action received for Chinese Patent Application No. 201380028514.1, dated Apr. 10, 2018, 15 pages.
Office Action received for Chinese Patent Application No. 201380028514.1, dated Jul. 4, 2017, 9 pages.
Office Action received for Chinese Patent Application No. 201380028514.1, dated Mar. 25, 2019, 9 pages.
Office Action received for Chinese Patent Application No. 201380028514.1, dated Nov. 13, 2018, 13 pages.
Office Action received for Chinese Patent Application No. 201380028514.1, dated Oct. 17, 2016, 13 pages.
Office Action received for Japanese Patent Application No. 2015-512803, dated Feb. 29, 2016, 6 pages.
Office Action received for Japanese Patent Application No. 2017-032503, dated May 18, 2018, 5 pages.
Office Action received for Japanese Patent Application No. 2018-162033, dated Sep. 2, 2019, 5 pages.
Office Action received for Korean Patent Application No. 10-2014-7033380, dated Jun. 29, 2016, 11 pages.
Office Action received for Korean Patent Application No. 10-2014-7033380, dated Mar. 30, 2017, 7 pages.
Office Action received for Korean Patent Application No. 10-2014-7033380, dated Oct. 22, 2015, 12 pages.
Office Action received for Korean Patent Application No. 10-2017-7018070, dated Sep. 5, 2017, 2 pages.
Office Action received for Korean Patent Application No. 10-2017-7035093, dated Dec. 28, 2018, 6 pages.
Office Action received for Korean Patent Application No. 10-2017-7035093, dated Mar. 12, 2018, 9 pages.
Office Action received for Korean Patent Application No. 10-2017-7035093, dated Mar. 25, 2019, 9 pages.
Office Action received for Korean Patent Application No. 10-2019-7015056, dated Aug. 5, 2019, 9 pages.
Osxdaily, "Get a List of Siri Commands Directly from Siri", Online available at:—<http://osxdaily.com/2013/02/05/list-siri-commands/>, Feb. 5, 2013, 15 pages.
Pathak et al., "Privacy-preserving Speech Processing: Cryptographic and String-matching Frameworks Show Promise", In: IEEE signal processing magazine, Online available at:—<http://www.merl.com/publications/docs/TR2013-063.pdf>,, Feb. 13, 2013, 16 pages.
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at:—<https://www.youtube.com/watch?v=0CIdLR4fhVU>, Jun. 3, 2014, 3 pages.
Rios Mafe, "New Bar Search for Facebook", YouTube, available at:—<https://www.youtube.com/watch?v=vwgN1WbvCas>, Jul. 19, 2013, 2 pages.
Routines, "SmartThings Support", Online available at:—<https://web.archive.org/web/20151207165701/https://support.smartthings.com/hc/en-us/articles/205380034-Routines>, 2015, 3 pages.
Samsung Support, "Create a Quick Command in Bixby to Launch Custom Settings by at Your Command", Online Available at:—

(56) References Cited

OTHER PUBLICATIONS

<https://www.facebook.com/samsungsupport/videos/10154746303151213>, Nov. 13, 2017, 1 page.
Sarawagi Sunita, "CRF Package Page", Online available at:—<http://crf.sourceforge.net/>, retrieved on Apr. 6, 2011, 2 pages.
Seehafer Brent, "Activate Google Assistant on Galaxy S7 with Screen off", Online available at:—<https://productforums.google.com/forum/#!topic/websearch/lp3qlGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Settle et al., "End-to-End Multi-Speaker Speech Recognition", Proc. ICASSP, Apr. 2018, 6 pages.
Simonite, Tom, "One Easy Way to Make Siri Smarter", Technology Review, Oct. 18, 2011, 2 pages.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
SRI, "SRI Speech: Products: Software Development Kits: EduSpeak", Online available at:—<http://web.archive.org/web/20090828084033/http://www.speechatsri.com/products/eduspeak>shtml, retrieved on Jun. 20, 2013, pp. 1-2.
Sullivan Danny, "How Google Instant's Autocomplete Suggestions Work", Online available at:—<http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", Interspeech 2012, Sep. 9-13, 2012, pp. 194-197.
Tan et al., "Knowledge Transfer In Permutation Invariant Training For Single-channel Multi-talker Speech Recognition", ICASSP 2018, 2018, pp. 5714-5718.
Tofel et al., "SpeakToit: A Personal Assistant for Older iPhones, iPads", Apple News, Tips and Reviews, Feb. 9, 2012, 7 pages.
Tucker Joshua, "Too Lazy to Grab Your TV Remote? Use Siri Instead", Engadget, Nov. 30, 2011, pp. 1-8.
Vaswani et al., "Attention Is All You Need", 31st Conference on Neural Information Processing Systems (NIPS 2017), 2017, pp. 1-11.
Vodafone Deutschland, "Samsung Galaxy S3 Tastatur Spracheingabe", Online available at—<https://www.youtube.com/watch?v=6kOd6Gr8uFE>, Aug. 22, 2012, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions On Audio, Speech, And Language Processing, vol. 23, No. 10, Oct. 2015, pp. 1670-1679.
Wikipedia, "Acoustic Model", Online available at:—<http://en.wikipedia.org/wiki/AcousticModel>, retrieved on Sep. 14, 2011, pp. 1-2.
Wikipedia, "Home Automation", Online Available at:—<https://en.wikipedia.org/w/index.php?title=Home_automation&oldid=686569068>, Oct. 19, 2015, 9 pages.
Wikipedia, "Language Model", Online available at:—<http://en.wikipedia.org/wiki/Language_model>, retrieved on Sep. 14, 2011, 4 pages.
Wikipedia, "Siri", Online Available at:—<https://en.wikipedia.org/w/index.php?title=Siri&oldid=689697795>, Nov. 8, 2015, 13 Pages.
Wikipedia, "Speech Recognition", Online available at:—<http://en.wikipedia.org/wiki/Speech_recognition>, retrieved on Sep. 14, 2011, 12 pages.
Wikipedia, "Virtual Assistant", Wikipedia, Online Available at:—<https://en.wikipedia.org/w/index.php?title=Virtual_assistant&oldid=679330666>, Sep. 3, 2015, 4 pages.
X.Ai, "How it Works", Online available at:—<https://web.archive.org/web/20160531201426/https://x.ai/how-it-works/>, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Policy Optimization of Dialogue Management in Spoken Dialogue System For Out-of-Domain Utterances", 2016 International Conference On Asian Language Processing (IALP), IEEE, Nov. 21, 2016, pp. 10-13.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yates Michaelc., "How Can I Exit Google Assistant After I'm Finished with it", Online available at:—<https://productforums.google.com/forum/#!msg/phone-by-google/faECnR2RJwA/gKNtOkQgAQAJ>, Jan. 11, 2016, 2 pages.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Yu et al., "Permutation Invariant Training Of Deep Models For Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zainab, "Google Input Tools Shows Onscreen Keyboard in Multiple Languages [Chrome]", Online available at:—<http://www.addictivetips.com/internet-tips/google-input-tools-shows-multiple-language-onscreen-keyboards-chrome/>, Jan. 3, 2012, 3 pages.
Zangerle et al., "Recommending #—Tags in Twitter", proceedings of the Workshop on Semantic Adaptive Socail Web, 2011, pp. 1-12.
Zhong et al., "JustSpeak: Enabling Universal Voice Control on Android", W4A'14, Proceedings of the 11th Web for All Conference, No. 36, Apr. 7-9, 2014, 8 pages.
Zmolikova et al., "Speaker-Aware Neural Network Based Beamformer For Speaker Extraction In Speech Mixtures", Interspeech 2017, Aug. 20-24, 2017, pp. 2655-2659.
Office Action received for Chinese Patent Application No. 202010842958.0, dated Jul. 20, 2021, 14 pages (7 pages of English Translation and 7 pages of Official Copy).
Notice of Allowance received for U.S. Appl. No. 16/532,930, dated Nov. 16, 2021, 7 pages.
Corrected Notice of Allowance received for U.S. Appl. No. 16/532,930, dated Dec. 9, 2021, 4 pages.
Office Action received for Chinese Patent Application No. 202010842958.0, dated Nov. 10, 2021, 6 pages (3 pages of English Translation and 3 pages of Official Copy).
Office Action received for Chinese Patent Application No. 202010844566.8, dated Dec. 21, 2021, 13 pages (6 pages of English Translation and 7 pages of Official Copy).

\* cited by examiner

SYSTEMS AND METHODS FOR INTEGRATING THIRD PARTY SERVICES WITH A DIGITAL ASSISTANT

RELATED APPLICATIONS

This application is a continuation of U.S. patent application Ser. No. 16/532,930, filed on Aug. 6, 2019, entitled "Systems and Methods for Integrating Third Party Services with a Digital Assistant" which is a continuation of U.S. patent application Ser. No. 13/894,350, filed on May 14, 2013, entitled "Systems and Methods for Integrating Third Party Services with a Digital Assistant" which claims priority to U.S. Provisional Patent Application Ser. No. 61/799,916, filed Mar. 15, 2013, entitled "Systems and Methods for Integrating Third Party Services with a Digital Assistant" and U.S. Provisional Patent Application Ser. No. 61/647,434, filed May 15, 2012, entitled "Systems and Methods for Integrating Third Party Services with a Digital Assistant." These applications are incorporated by reference herein in their entirety.

TECHNICAL FIELD

The disclosed embodiments relate generally to digital assistant systems, and more specifically, third party computer systems and services integrated with a digital assistant system.

BACKGROUND

Just like human personal assistants, digital assistant systems can perform requested tasks and provide requested advice, information, or services. A digital assistant system's ability to fulfill a user's request is dependent on the digital assistant system's correct comprehension of the request or instructions. Recent advances in natural language processing have enabled users to interact with digital assistant systems using natural language, in spoken or textual forms. Such digital assistant systems can interpret the user's input to deduce the user's intent, translate the deduced intent into actionable tasks and parameters, execute operations or deploy services to perform the tasks, and produce output that is intelligible to the user. Ideally, the output produced by a digital assistant system should fulfill the user's intent expressed during the natural language interaction between the user and the digital assistant system.

The ability of a digital assistant system to produce satisfactory responses to user requests depends on the natural language processing, knowledge base, and artificial intelligence available to the digital assistant system. Moreover, while numerous third party systems and services currently exist, there is no efficient means for a digital assistant system to integrate efficiently with such third party computer systems and services.

SUMMARY

As described above, there is a need for digital assistant systems to integrate with third party computer systems and services that have access to databases otherwise not available to the digital assistant systems. This enables the digital assistant systems to perform tasks that the digital assistant systems cannot otherwise perform.

The embodiments disclosed herein provide methods, systems, and computer readable storage media that integrate a digital assistant system with one or more third party service provider systems to generate a response to a user request based on information or assistance obtained from at least one of the one or more third party service provider systems.

Some embodiments provide a method for processing a user input performed at an electronic device with one or more processors and memory. This method includes receiving a first set of one or more predefined task types from a service provider, and integrating the first set of one or more predefined task types with a second set of predefined task types not associated with the service provider to generate a plurality of predefined tasks. The method also includes receiving an input of a user, and, in accordance with the input, identifying a respective task type from the plurality of predefined task types. The respective task type corresponds to one of the first set of one or more predefined task types. The method further includes, in response to identifying the respective task type, sending to the service provider a request to perform at least a portion of a task associated with the input.

In some embodiments, a method for processing a user input, performed at an electronic device with one or more processors and memory, includes receiving an input of a user, and, in accordance with the input, identifying a respective task type from a plurality of predefined task types associated with a plurality of third party service providers. The respective task type is associated with at least one third party service provider for which the user is authorized and at least one third party service provider for which the user is not authorized. The method also includes, in response to identifying the respective task type, sending a request to perform at least a portion of a task to a third party service provider of the plurality of third party service providers that is associated with the respective task type.

In some embodiments, a method for processing a user input, performed at an electronic device with one or more processors and memory, includes receiving an input of a user, and, in accordance with the input, identifying a respective task type from a plurality of predefined task types. The method also includes, in response to identifying the respective task type, locating one or more service providers. Each located service provider is associated with an identification of one or more supported task types (also called herein "competencies"), and the one or more supported task types for the service provider include the respective task type. The method further includes, after locating the one or more service providers, sending a request to perform at least a portion of a task to a service provider of the one or more service providers.

In some embodiments, a method for processing a user input, performed at a server system with one or more processors and memory, includes identifying a location of a portable electronic device associated with a user, identifying a respective domain corresponding to the location of the portable electronic device associated with the user, receiving an input of the user, and, in accordance with the input, identifying a respective task type corresponding to the respective domain. The method also includes, in response to identifying the respective task type, sending a request, associated with the input, to perform at least a portion of a task to a respective service provider associated with the respective domain.

In some embodiments, the input is a voice input of the user.

In accordance with some embodiments, an electronic device includes one or more processors and memory storing one or more programs for execution by the one or more processors. The one or more programs include instructions for performing the operations of any of the methods described above. In accordance with some embodiments, a graphical user interface on an electronic device with a display, memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions, which, when executed by an electronic device with one or more processors and memory, cause the device to perform the operations of any of the methods described above. In accordance with some embodiments, an electronic device includes means for performing the operations of any of the methods described above. In accordance with some embodiments, an information processing apparatus, for use in an electronic device includes means for performing the operations of any of the methods described above. In accordance with some embodiments, an electronic device includes a processing unit configured to perform the operations of any of the methods described above.

Thus, digital assistant systems are provided with new and improved methods that integrate third party service providers, thereby improving and expanding the capabilities of the digital assistant systems. Such methods and systems may complement or replace existing methods and systems.

BRIEF DESCRIPTION OF THE DRAWINGS

Like reference numerals refer to corresponding parts throughout the drawings.

DESCRIPTION OF EMBODIMENTS

Figure 1:
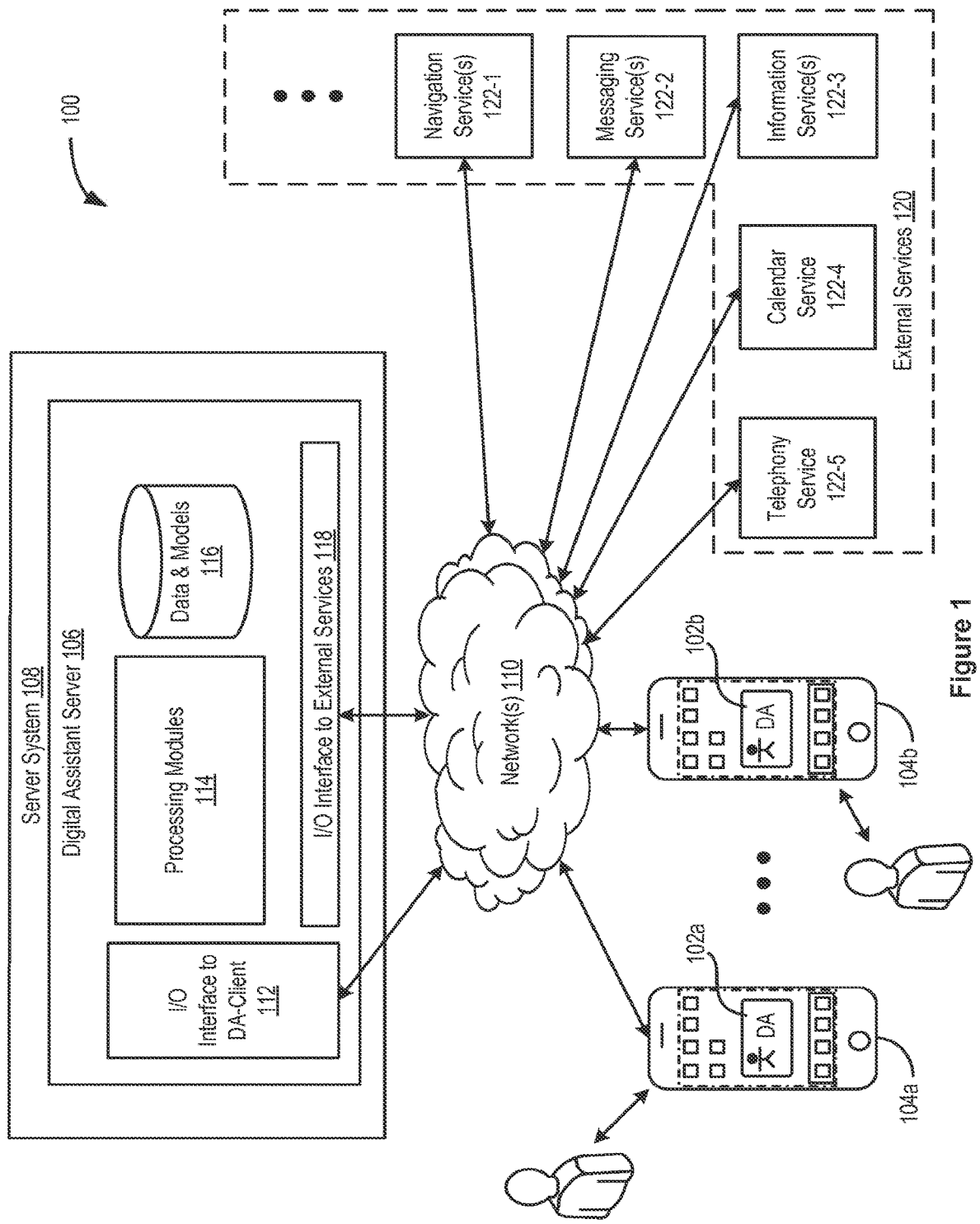
FIG. 1 is a block diagram illustrating an environment in which a digital assistant operates in accordance with some embodiments.

FIG. 1 is a block diagram of an operating environment 100 of a digital assistant according to some embodiments. The terms "digital assistant," "virtual assistant," "intelligent automated assistant," or "automatic digital assistant," refer to any information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider); and generating output responses to the user in an audible (e.g., speech) and/or visual form.

Specifically, a digital assistant system is capable of accepting a user request at least partially in the form of a natural language command, request, statement, narrative, and/or inquiry. Typically, the user request seeks either an informational answer or performance of a task by the digital assistant system. A satisfactory response to the user request is generally either provision of the requested informational answer, performance of the requested task, or a combination of the two. For example, a user may ask the digital assistant system a question, such as "Where am I right now?" Based on the user's current location, the digital assistant may answer, "You are in Central Park near the west gate." The user may also request the performance of a task, for example, by stating "Please invite my friends to my girlfriend's birthday party next week." In response, the digital assistant may acknowledge the request by generating a voice output, "Yes, right away," and then send a suitable calendar invite from the user's email address to each of the user' friends listed in the user's electronic address book. There are numerous other ways of interacting with a digital assistant to request information or performance of various tasks. In addition to providing verbal responses and taking programmed actions, the digital assistant can also provide responses in other visual or audio forms (e.g., as text, alerts, music, videos, animations, etc.).

As shown in FIG. 1, in some embodiments, a digital assistant system is implemented according to a client-server model. The digital assistant system includes a client-side portion (e.g., 102a and 102b) (hereafter "digital assistant (DA) client 102") executed on a user device (e.g., 104a and 104b), and a server-side portion 106 (hereafter "digital assistant (DA) server 106") executed on a server system 108. The DA client 102 communicates with the DA server 106 through one or more networks 110. The DA client 102 provides client-side functionalities such as user-facing input and output processing and communications with the DA server 106. The DA server 106 provides server-side functionalities for any number of DA clients 102 each residing on a respective user device 104 (also called a client device).

In some embodiments, the DA server 106 includes a client-facing I/O interface 112, one or more processing modules 114, data and models 116, and an I/O interface to external services 118. The client-facing I/O interface facilitates the client-facing input and output processing for the digital assistant server 106. The one or more processing modules 114 utilize the data and models 116 to determine the user's intent based on natural language input and perform task execution based on the deduced user intent.

In some embodiments, the DA server 106 communicates with external services 120 (e.g., navigation service(s) 122-1, messaging service(s) 122-2, information service(s) 122-3, calendar service 122-4, telephony service 122-5, etc.) through the network(s) 110 for task completion or information acquisition. The I/O interface to the external services 118 facilitates such communications.

Examples of the user device 104 include, but are not limited to, a handheld computer, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, or a combination of any two or more of these data processing devices or any other suitable data processing devices. More details on the user device 104 are provided in reference to an exemplary user device 104 shown in FIG. 2.

Examples of the communication network(s) 110 include local area networks ("LAN") and wide area networks ("WAN"), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 can be implemented on at least one data processing apparatus and/or a distributed network of computers. In some embodiments, the server system 108 also employs various virtual devices and/or services of third party service providers (e.g., third-party cloud service providers) to provide the underlying computing resources and/or infrastructure resources of the server system 108.

Although the digital assistant system shown in FIG. 1 includes both a client-side portion (e.g., the DA client 102) and a server-side portion (e.g., the DA server 106), in some embodiments, a digital assistant system refers only to the server-side portion (e.g., the DA server 106). In some embodiments, the functions of a digital assistant can be implemented as a standalone application installed on a user device. In addition, the divisions of functionalities between the client and server portions of the digital assistant can vary in different embodiments. For example, in some embodiments, the DA client 102 is a thin-client that provides only user-facing input and output processing functions, and delegates all other functionalities of the digital assistant to the DA server 106. In some other embodiments, the DA client 102 is configured to perform or assist one or more functions of the DA server 106.

Figure 2:
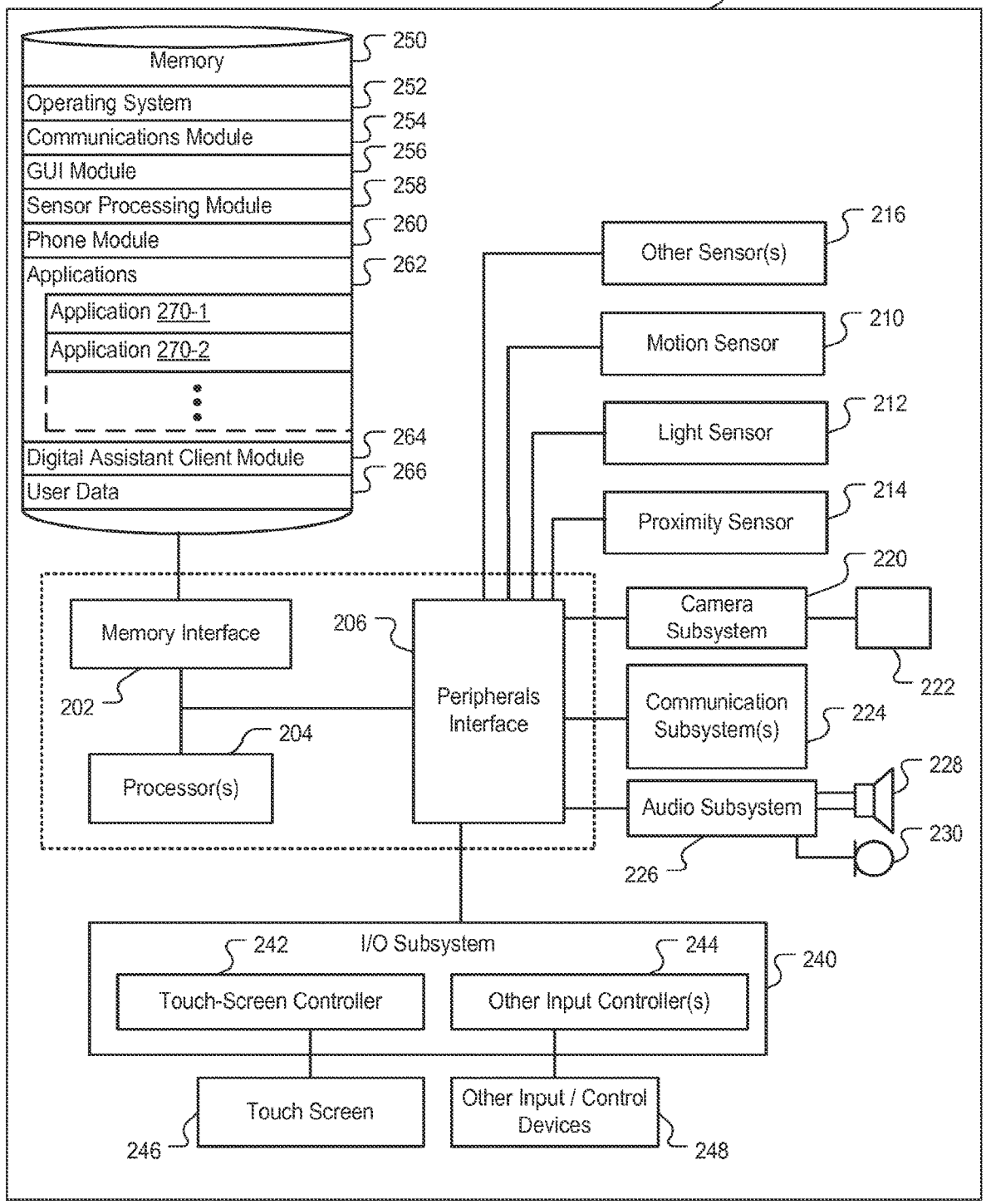
FIG. 2 is a block diagram illustrating a digital assistant client system in accordance with some embodiments.

FIG. 2 is a block diagram of a user device 104 in accordance with some embodiments. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

For example, in some embodiments, a motion sensor 210, a light sensor 212, and a proximity sensor 214 are coupled to the peripherals interface 206 to facilitate orientation, light, and proximity sensing functions. In some embodiments, other sensors 216, such as a positioning system (e.g., GPS receiver), a temperature sensor, a biometric sensor, and the like, are connected to the peripherals interface 206, to facilitate related functionalities.

In some embodiments, the user device 104 includes a camera subsystem 220 coupled to the peripherals interface 206. In some embodiments, an optical sensor 222 of the camera subsystem 220 facilitates camera functions, such as taking photographs and recording video clips. In some embodiments, the user device 104 includes one or more wired and/or wireless communication subsystems 224 provide communication functions. The communication subsystems 224 typically includes various communication ports, radio frequency receivers and transmitters, and/or optical (e.g., infrared) receivers and transmitters. In some embodiments, the user device 104 includes an audio subsystem 226 coupled to one or more speakers 228 and one or more microphones 230 to facilitate voice-enabled functions, such as voice recognition, voice replication, digital recording, and telephony functions.

In some embodiments, an I/O subsystem 240 is also coupled to the peripheral interface 206. In some embodiments, the user device 104 includes a touch screen 246, and the I/O subsystem 240 includes a touch screen controller 242 coupled to the touch screen 246. When the user device 104 includes the touch screen 246 and the touch screen controller 242, the touch screen 246 and the touch screen controller 242 are typically configured to, for example, detect contact and movement or break thereof using any of a plurality of touch sensitivity technologies, such as capacitive, resistive, infrared, surface acoustic wave technologies, proximity sensor arrays, and the like. In some embodiments, the user device 104 includes a display that does not include a touch-sensitive surface. In some embodiments, the user device 104 includes a separate touch-sensitive surface. In some embodiments, the user device 104 includes other input controller(s) 244. When the user device 104 includes the other input controller(s) 244, the other input controller(s) 244 are typically coupled to other input/control devices 248, such as one or more buttons, rocker switches, thumb-wheel, infrared port, USB port, and/or a pointer device such as a stylus.

The memory interface 202 is coupled to memory 250. In some embodiments, the memory 250 includes a non-transitory computer readable medium, such as high-speed random access memory and/or non-volatile memory (e.g., one or more magnetic disk storage devices, one or more flash memory devices, one or more optical storage devices, and/or other non-volatile solid-state memory devices).

In some embodiments, the memory 250 stores an operating system 252, a communications module 254, a graphical user interface module 256, a sensor processing module 258, a phone module 260, and applications 262, and a subset or superset thereof. The operating system 252 includes instructions for handling basic system services and for performing hardware dependent tasks. The communications module 254 facilitates communicating with one or more additional devices, one or more computers and/or one or more servers. The graphical user interface module 256 facilitates graphic user interface processing. The sensor processing module 258 facilitates sensor-related processing and functions (e.g., processing voice input received with the one or more microphones 228). The phone module 260 facilitates phone-related processes and functions. The application module 262 facilitates various functionalities of user applications, such as electronic-messaging, web browsing, media processing, navigation, imaging and/or other processes and functions. In some embodiments, the user device 104 stores in the memory 250 one or more software applications 270-1 and 270-2 each associated with at least one of the external service providers.

As described above, in some embodiments, the memory 250 also stores client-side digital assistant instructions (e.g., in a digital assistant client module 264) and various user data 266 (e.g., user-specific vocabulary data, preference data, and/or other data such as the user's electronic address book, to-do lists, shopping lists, etc.) to provide the client-side functionalities of the digital assistant.

In various embodiments, the digital assistant client module 264 is capable of accepting voice input, text input, touch input, and/or gestural input through various user interfaces (e.g., the I/O subsystem 244) of the user device 104. The digital assistant client module 264 is also capable of providing output in audio, visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server (e.g., the digital assistant server 106, FIG. 1) using the communication subsystems 224.

In some embodiments, the digital assistant client module 264 utilizes various sensors, subsystems and peripheral devices to gather additional information from the surrounding environment of the user device 104 to establish a context associated with a user input. In some embodiments, the digital assistant client module 264 provides the context information or a subset thereof with the user input to the digital assistant server (e.g., the digital assistant server 106, FIG. 1) to help deduce the user's intent.

In some embodiments, the context information that can accompany the user input includes sensor information, e.g., lighting, ambient noise, ambient temperature, images or videos of the surrounding environment, etc. In some embodiments, the context information also includes the physical state of the device, e.g., device orientation, device location, device temperature, power level, speed, acceleration, motion patterns, cellular signals strength, etc. In some embodiments, information related to the software state of the user device 106, e.g., running processes, installed programs, past and present network activities, background services, error logs, resources usage, etc., of the user device 104 is also provided to the digital assistant server (e.g., the digital assistant server 106, FIG. 1) as context information associated with a user input.

In some embodiments, the DA client module 264 selectively provides information (e.g., at least a portion of the user data 266) stored on the user device 104 in response to requests from the digital assistant server. In some embodiments, the digital assistant client module 264 also elicits additional input from the user via a natural language dialogue or other user interfaces upon request by the digital assistant server 106 (FIG. 1). The digital assistant client module 264 passes the additional input to the digital assistant server 106 to help the digital assistant server 106 in intent deduction and/or fulfillment of the user's intent expressed in the user request.

In some embodiments, the memory 250 may include additional instructions or fewer instructions. Furthermore, various functions of the user device 104 may be implemented in hardware and/or in firmware, including in one or more signal processing and/or application specific integrated circuits, and the user device 104, thus, need not include all modules and applications illustrated in FIG. 2.

Figure 3A:
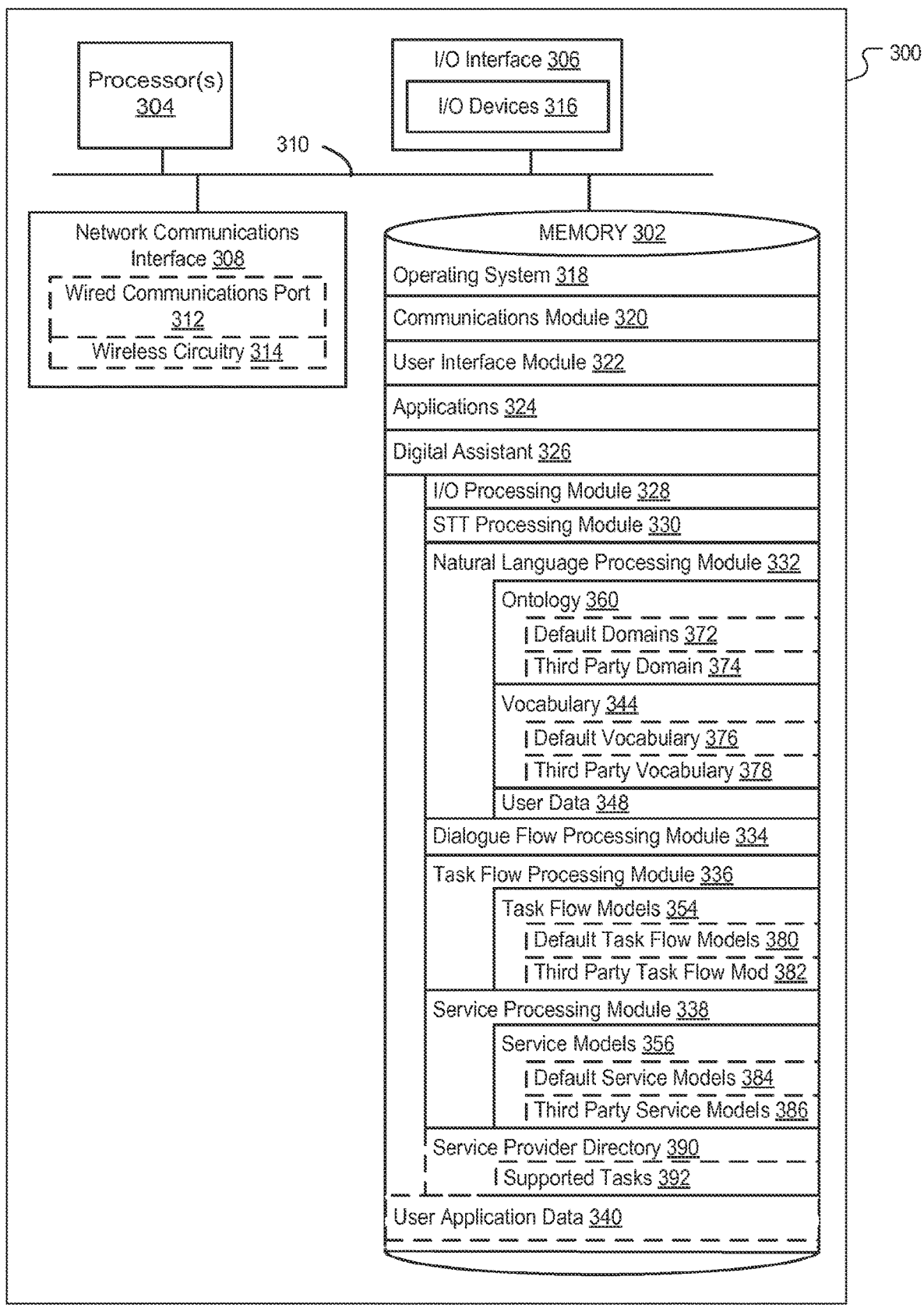
FIG. 3A is a block diagram illustrating a standalone digital assistant system or a digital assistant server system in accordance with some embodiments.

FIG. 3A is a block diagram of an exemplary digital assistant system 300 in accordance with some embodiments. In some embodiments, the digital assistant system 300 is implemented on a standalone computer system. In some embodiments, the digital assistant system 300 is distributed across multiple computers. In some embodiments, some of the modules and functions of the digital assistant are divided into a server portion and a client portion, where the client portion resides on a user device (e.g., the user device 104) and communicates with the server portion (e.g., the server system 108) through one or more networks, e.g., as shown in FIG. 1. In some embodiments, the digital assistant system 300 is an embodiment of the server system 108 (and/or the digital assistant server 106) shown in FIG. 1. In some embodiments, the digital assistant system 300 is implemented in a user device (e.g., the user device 104, FIG. 1), thereby eliminating the need for a client-server system. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some embodiments, the memory 302 includes a non-transitory computer readable medium, such as high-speed random access memory and/or a non-volatile computer readable storage medium (e.g., one or more magnetic disk storage devices, one or more flash memory devices, one or more optical storage devices, and/or other non-volatile solid-state memory devices).

The I/O interface 306 couples input/output devices 316 of the digital assistant system 300, such as displays, a keyboards, touch screens, and microphones, to the user interface module 322. The I/O interface 306, in conjunction with the user interface module 322, receives user inputs (e.g., voice input, keyboard inputs, touch inputs, etc.) and process them accordingly. In some embodiments, when the digital assistant is implemented on a standalone user device, the digital assistant system 300 includes any of the components and I/O and communication interfaces described with respect to the user device 104 in FIG. 2 (e.g., one or more microphones 228). In some embodiments, the digital assistant system 300 represents the server portion of a digital assistant implementation, and interacts with the user through a client-side portion residing on a user device (e.g., the user device 104 shown in FIG. 2).

In some embodiments, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some embodiments, the non-transitory computer readable storage medium of memory 302 stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communication module 320 may communicate with the communications module 254 of the device 104 shown in FIG. 2. The communications module 320 also includes various software components for handling data received by the wireless circuitry 314 and/or wired communications port 312.

In some embodiments, the user interface module 322 receives commands and/or inputs from a user via the I/O interface 306 (e.g., from a keyboard, touch screen, and/or microphone), and provides user interface objects on a display.

The applications 324 include programs and/or modules that are configured to be executed by the one or more processors 304. For example, if the digital assistant system is implemented on a standalone user device, the applications 324 may include user applications, such as games, a calendar application, a navigation application, or an email application. If the digital assistant system 300 is implemented on a server farm, the applications 324 may include resource management applications, diagnostic applications, or scheduling applications, for example.

The memory 302 also stores the digital assistant module (or the server portion of a digital assistant) 326. In some embodiments, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, and a service processing module 338. Each of these processing modules has access to one or more of the following data and models of the digital assistant 326, or a subset or superset thereof: ontology 360, vocabulary index 344, user data 348, task flow models 354, and service models 356.

In some embodiments, the ontology 360 includes one or more third party domains 374. In some embodiments, the digital assistant system 300 includes one or more default domains 372.

In some embodiments, the one or more default domains 372 include one or more private domains. In some embodiments, the one or more third party domains 374 include one or more public domains. In some embodiments, the one or more third party domains 374 include one or more developer domains.

In some embodiments, the vocabulary 344 includes one or more third party vocabularies 378. In some embodiments, the vocabulary 344 includes one or more default vocabularies 376.

In some embodiments, the task flow models 354 include one or more third party task flow models 382. In some embodiments, the task flow models 354 include one or more default task flow models 380.

In some embodiments, the service models 356 include one or more third party service models 386. In some embodiments, the service models 356 include one or more default service models 384.

In some embodiments, the memory 302 also stores a service provider directory 390. In some embodiments, the service provider directory 390 includes a list of supported tasks or competencies 392 for respective third party service provider systems.

In some embodiments, using the processing modules (e.g., the input/output processing module 328, the STT processing module 330, the natural language processing module 332, the dialogue flow processing module 334, the task flow processing module 336, and/or the service processing module 338), data, and models implemented in the digital assistant module 326, the digital assistant system 300 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some embodiments, the digital assistant also takes appropriate actions when a satisfactory response was not or could not be provided to the user for various reasons.

In some embodiments, the memory 302 also includes a user application data 340, which identifies one or more software applications a respective user is authorized to use. In some embodiments, the user application data 340 also includes the frequency and recency (i.e., indication of how recently the one or more software applications were used) of use of the one or more software applications. In some embodiments, the user application data 340 is included in the user data 348.

In some embodiments, a server of a third party service provider (e.g., external services 120 in FIG. 1) also includes components shown in FIG. 3A (e.g., ontology 360, task flow models 354, etc.).

Figure 3B:
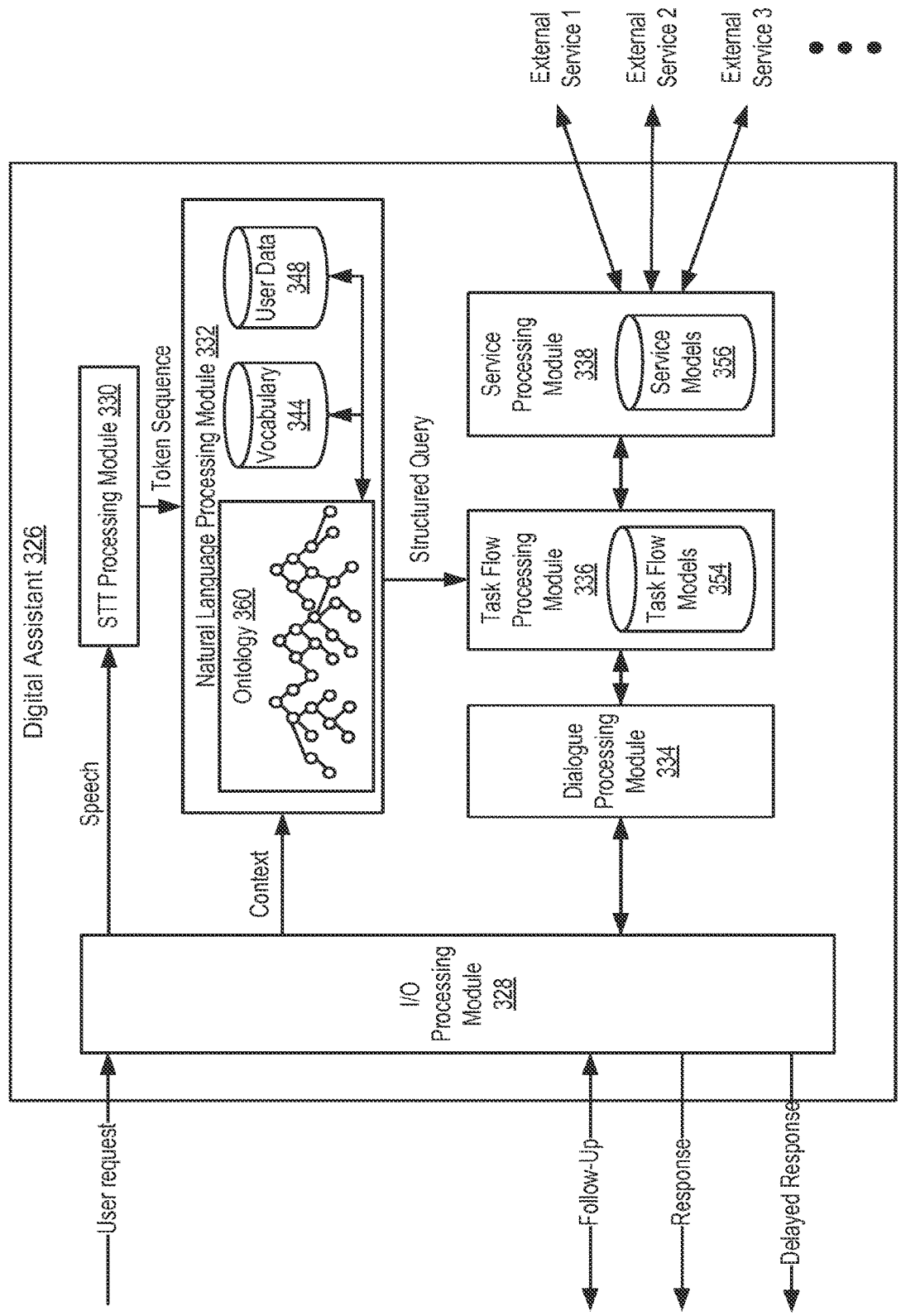
FIG. 3B is a block diagram illustrating functions of the digital assistant shown in FIG. 3A in accordance with some embodiments.

As shown in FIG. 3B, in some embodiments, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some embodiments, the context information also includes software and hardware states of the device (e.g., the user device 104 in FIG. 1) at the time the user request is received, and/or information related to the surrounding environment of the user at the time that the user request was received. In some embodiments, the I/O processing module 328 also sends follow-up questions to, and receives answers from, the user regarding the user request. In some embodiments, when a user request is received by the I/O processing module 328 and the user request contains a speech input, the I/O processing module 328 forwards the speech input to the speech-to-text (STT) processing module 330 for speech-to-text conversions.

In some embodiments, the speech-to-text processing module 330 receives speech input (e.g., a user utterance captured in a voice recording) through the I/O processing module 328. In some embodiments, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some embodiments, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction.

The natural language processing module 332 ("natural language processor") of the digital assistant 326 takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 326 and/or the digital assistant system 300 (FIG. 3A), and has an associated task flow implemented in the task flow models 354. The associated task flow is a series of programmed actions and steps that the digital assistant system 300 takes in order to perform the task. The scope of a digital assistant system's capabilities is dependent on the number and variety of task flows that have been implemented and stored in the task flow models 354, or in other words, on the number and variety of "actionable intents" that the digital assistant system 300 recognizes. The effectiveness of the digital assistant system 300, however, is also dependent on the digital assistant system's ability to deduce the correct "actionable intent(s)" from the user request expressed in natural language.

In some embodiments, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some embodiments, the natural language processing is based on an ontology 360. The ontology 360 is a hierarchical structure containing a plurality of nodes, each node representing either an "actionable intent" or a "property" relevant to one or more of the "actionable intents" or other "properties". As noted above, an "actionable intent" represents a task that the digital assistant system 300 is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some embodiments, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes.

Figure 3C:
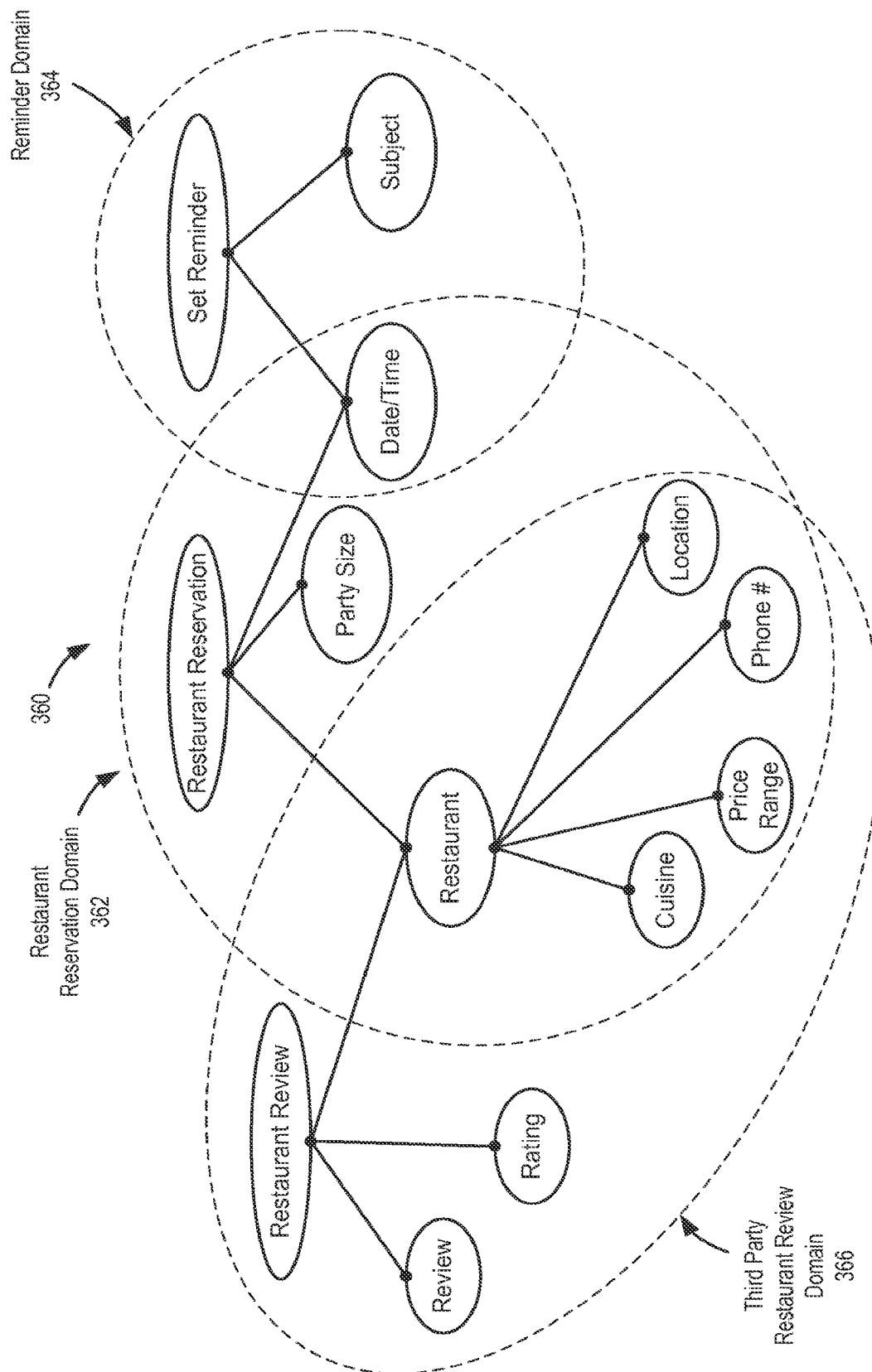
FIG. 3C is a network diagram illustrating a portion of an ontology in accordance with some embodiments.

For example, the ontology 360 shown in FIG. 3C includes a "restaurant reservation" node, which is an actionable intent node. Property nodes "restaurant," "date/time" (for the reservation), and "party size" are each directly linked to the "restaurant reservation" node (an actionable intent node). In addition, property nodes "cuisine," "price range," "phone number," and "location" are sub-nodes of the property node "restaurant," and are each linked to the "restaurant reservation" node through the intermediate property node "restaurant." For another example, the ontology 360 shown in FIG. 3C also includes a "set reminder" node, which is another actionable intent node. Property nodes "date/time" (for the setting the reminder) and "subject" (for the reminder) are each linked to the "set reminder" node. Since the property node "date/time" is relevant to both the task of making a restaurant reservation and the task of setting a reminder, the property node "date/time" is linked to both the "restaurant reservation" node and the "set reminder" node in the ontology 360. The ontology 360 shown in FIG. 3C further includes a "restaurant review" node, which is an actionable intent node. Property nodes "review" (e.g., user comments), "rating" (e.g., numerical scores), and "restaurant" are each directly linked to the "restaurant review" node. Since the property node "restaurant" is relevant to both the task of making a restaurant reservation and the task of retrieving a restaurant review, the property node "restaurant" is linked to both the "restaurant reservation" node and the "restaurant review" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362, an example of a reminder domain 364, and an example of a third party restaurant review domain 366 within the ontology 360. The restaurant reservation domain 362 includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." The restaurant review domain 366 includes the actionable intent node "restaurant review," property nodes "review," "rating," and "restaurant," and sub-property nodes "cuisine," "price range," "phone number," and "location." In some embodiments, the ontology 360 is made up of many domains. Each domain may share one or more property nodes with one or more other domains. For example, the "date/time" property node may be associated with many other domains (e.g., a scheduling domain, a travel reservation domain, a movie ticket domain, etc.), in addition to the restaurant reservation domain 362 and the reminder domain 364.

While FIG. 3C illustrates two exemplary domains within the ontology 360, the ontology 360 may include other domains (or actionable intents), such as "initiate a phone call," "find directions," "schedule a meeting," "send a message," and "provide an answer to a question," and so on. For example, a "send a message" domain is associated with a "send a message" actionable intent node, and may further include property nodes such as "recipient(s)", "message type", and "message body." The property node "recipient" may be further defined, for example, by the sub-property nodes such as "recipient name" and "message address."

In some embodiments, the ontology 360 includes all the domains (and hence actionable intents) that the digital assistant is capable of understanding and acting upon. In some embodiments, the ontology 360 may be modified, such as by adding or removing domains or nodes, or by modifying relationships between the nodes within the ontology 360.

In some embodiments, nodes associated with multiple related actionable intents may be clustered under a "super domain" in the ontology 360. For example, a "travel" super-domain may include a cluster of property nodes and actionable intent nodes related to travels. The actionable intent nodes related to travels may include "airline reservation," "hotel reservation," "car rental," "get directions," "find points of interest," and so on. The actionable intent nodes under the same super domain (e.g., the "travels" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some embodiments, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 (FIG. 3B) in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

In some embodiments, the natural language processor 332 shown in FIG. 3B receives the token sequence (e.g., a text string) from the speech-to-text processing module 330, and determines what nodes are implicated by the words in the token sequence. In some embodiments, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the digital assistant system 300 has previously correctly interpreted a similar request from a user.

In some embodiments, the digital assistant system 300 also stores names of specific entities in the vocabulary index 344, so that when one of these names is detected in the user request, the natural language processor 332 will be able to recognize that the name refers to a specific instance of a property or sub-property in the ontology. In some embodiments, the names of specific entities are names of businesses, restaurants, people, movies, and the like. In some embodiments, the digital assistant system 300 can search and identify specific entity names from other data sources, such as the user's address book, a movies database, a musicians database, and/or a restaurant database. In some embodiments, when the natural language processor 332 identifies that a word in the token sequence is a name of a specific entity (such as a name in the user's address book), that word is given additional significance in selecting the actionable intent within the ontology for the user request.

For example, when the words "Mr. Santo" is recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

Once the natural language processor 332 identifies an actionable intent (or domain) based on the user request, the natural language processor 332 generates a structured query to represent the identified actionable intent. In some embodiments, the structured query includes parameters for one or more nodes within the domain for the actionable intent, and at least some of the parameters are populated with the specific information and requirements specified in the user request. For example, the user may say "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. Based on the information contained in the user's utterance, the natural language processor 332 may generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some embodiments, the natural language processor 332 populates some parameters of the structured query with received context information. For example, if the user requested a sushi restaurant "near me," the natural language processor 332 may populate a {location} parameter in the structured query with GPS coordinates from the user device 104.

In some embodiments, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some embodiments, the various procedures necessary to complete these tasks are provided in task flow models 354. In some embodiments, the task flow models 354 include procedures for obtaining additional information from the user, and task flows for performing actions associated with the actionable intent.

In some embodiments, the digital assistant 326 includes a template processing module. In some embodiments, the token sequence generated by the speech-to-text processing module 330 is sent to the template processing module in addition to, or instead of, the natural language processing module 332. The template processing module has access to a plurality of predefined templates. A template typically defines a particular linguistic pattern. Exemplary templates include "play [x]," "play [x] on [y]," "buy [a] from [b]," and "forward [c] to [d]."

In some embodiments, the template processing module is directly coupled with external services. In some embodiments, the template processing module communicates with external services through the service processing module 338. In some embodiments, the service models 356, which include information identifying external services, are associated with a particular template. In some embodiments, a third party service provider sends a request to be associated with a particular template or a particular set of templates, and in response, the information in the service models 356 is updated to indicate that the third party service provider is associated with the particular template or the particular set of templates. In some embodiments, an application (e.g., an application installed on the device) includes information indicating that a corresponding third party service provider is associated with a particular template or a particular set of templates. In some embodiments, subsequent to installing an application, the digital assistant 326 updates the information to reflect that the corresponding third party service provider is associated with a particular template or a particular set of templates (e.g., for the device or its user).

In some embodiments, templates are grouped. For example, "play [x]" and "play [x] on [y]" can be grouped together as a set of music (and/or video) templates. In some embodiments, templates are grouped together based on contexts (e.g., location of the device). For example, a set of "in car" video templates includes video templates used while the device is in a car (e.g., templates for playing audio without video of a movie file, templates for controlling car stereo, etc.), and a set of "at home" video templates includes video templates used while the device is at home (e.g., templates for playing both video and audio data of a movie file, templates for controlling a home stereo system, etc.). In another example, a set of "moving" news templates includes news templates used while the device (or its user) is moving (e.g., templates for retrieving short stories, headlines, and/or text-only stories that are better suited for reviewing when the user is driving about town), and a set of "stationary" news templates includes news templates used while the device (or its user) is stationary (e.g., templates for retrieving long stories and/or graphics that are better suited for reviewing when the user has more time to review). In some embodiments, third party service providers are associated with one or more templates and not with some other templates. For example, new service provider XYZ may be associated with "moving" news templates, but not with "stationary" news templates, while new service provider JKL may be associated with both "moving" and "stationary" news templates.

In some embodiments, one or more templates are provided by one or more third party service providers. For example, a third party service provider sends a template to the digital assistant 326, and the digital assistant 326 integrates the received template with the plurality of predefined templates. This allows third party service providers to create templates with a new vocabulary (e.g., "tweet [x]"). In some embodiments, the received template also includes one or more synonyms for the new vocabulary.

In some embodiments, the digital assistant 326 determines that the received input corresponds to at least one predefined template and at least one third party provided template, and selects a predefined template. In other words, a predefined template has priority over a third-party provided template.

In some embodiments, the templates include templates in multiple languages. For example, the templates may include a first template in English, and a second template in Spanish. In some embodiments, the first template corresponds to the second template (e.g., both the first template and the second template are for a same action).

In some embodiments, the digital assistant 326 receives an input that corresponds to a predefined template, and in response, sends the input to a particular third party service provider. For example, in some embodiments, the input is "play [x] on [y]" and the digital assistant 326 sends the input (e.g., a speech data or a corresponding text) to a third party service provider that corresponds to [y].

In some embodiments, the digital assistant 326 receives an input that corresponds to a particular template while displaying a user interface of an application that corresponds to a particular third party service provider, determines that the particular template is associated with the particular third party service provider, and sends the input to the particular third party service provider. For example, the digital assistant receives an input "forward [x] to [y]," while displaying a messaging application (e.g., email or SMS application), and forwards the input to a third party service provider that corresponds to the displayed or open messaging application. In some embodiments, the digital assistant 326 determines that the particular template is not associated with the particular third party service provider, and disregards the input.

In some embodiments, the digital assistant 326 receives a user input while displaying a user interface of a particular application, and determines whether the input corresponds to one or more templates associated with the particular application. In accordance with a determination that the input corresponds to one or more templates associated with the particular application, the digital assistant 326 sends the input to the third party service provider associated with the particular application. For example, the digital assistant 326 receives a user input "play [x]" while displaying a user interface of a particular music player application, and sends the input to a third party service player associated with the particular music player application (even if multiple music service providers are associated with the same template).

In some embodiments, the digital assistant 326 receives a user input, and determines that the user input corresponds to a particular template that is associated with multiple third party service providers. The digital assistant 326 selects one of the multiple third party service providers associated with the particular template, and sends the user input to the selected third party service provider. In some embodiments, the selection of a third party service provider is based on a review of the multiple third party service providers. In some embodiments, the selection of a third party service provider is based on a priority ranking of the multiple third party service providers. In some embodiments, the priority ranking of the multiple third party service providers is based on an amount each third party service provider has agreed to pay to be listed on the priority ranking. For example, a third party service provider that makes a high bid is ranked higher than a third party service provider that makes a lower or no bid.

In some embodiments, the digital assistant 326 receives a user input, and determines that the user input corresponds to a particular template that is associated with multiple third party service providers. The digital assistant 326 sends the user input to two or more third party service providers, and receives an acknowledgement indicating whether a respective third party service provider is available. In some embodiments, the digital assistant 326 determines that only one third party service provider is available and select the available third party service provider. In some embodiments, the digital assistant 326 determines that a particular service provider has provided the acknowledgement faster than the remainder of the multiple third party service providers, and selects the particular service provider.

In some embodiments, template selection rules are published so that all third party service providers may know the template selection rules.

In some embodiments, the third party service provider includes a third party digital assistant. The third party digital assistant is similar to the digital assistant 326 described herein. In some embodiments, the third party digital assistant includes an ontology (similar to the ontology 360), third party vocabulary (similar to vocabulary 344), third party user data (similar to user data 348), and one or more third party task flow models (similar to task flow models 354). The third party service provider receives the input and processes the received input with the third party digital assistant in a manner similar to the operations of the digital assistant 326 described herein. The third party service provider provides results to the digital assistant 326, and the digital assistant 326 causes the results to be presented to the user (e.g., in a dialogue user interface for the digital assistant 326 or as a voice output). In some embodiments, the results from the third party digital assistant are output using a voice different from a voice used for outputting results not from the third party digital assistant.

In some embodiments, the digital assistant 326 receives a request to disambiguate an input from a third party service provider. For example, the digital assistant 326 sends a user input "play Rock and Roll" to a music service provider, and the music service provider sends a request back to the digital assistant 326 to disambiguate to the digital assistant 326. In this case, the request may include a request to disambiguate whether to play a radio station with rock and roll music or to play a song entitled "Rock and Roll."

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue flow processing module 334 to engage in a dialogue with the user. In some embodiments, the dialogue flow processing module 334 determines how (and/or when) to ask the user for the additional information, and receives and processes the user responses. In some embodiments, the questions are provided to and answers are received from the users through the I/O processing module 328. For example, the dialogue flow processing module 334 presents dialogue output to the user via audio and/or visual output, and receives input from the user via spoken or physical (e.g., touch gesture) responses. Continuing with the example above, when the task flow processor 336 invokes the dialogue flow processing module 334 to determine the "party size" and "date" information for the structured query associated with the domain "restaurant reservation," the dialogue flow processing module 334 generates questions such as "For how many people?" and "On which day?" to pass to the user. Once answers are received from the user, the dialogue flow processing module 334 populates the structured query with the missing information, or passes the information to the task flow processor 336 to complete the missing information from the structured query.

In some cases, the task flow processor 336 may receive a structured query that has one or more ambiguous properties. For example, a structured query for the "send a message" domain may indicate that the intended recipient is "Bob," and the user may have multiple contacts named "Bob." The task flow processor 336 will request that the dialogue flow processing module 334 disambiguate this property of the structured query. In turn, the dialogue flow processing module 334 may ask the user "Which Bob?", and display (or read) a list of contacts named "Bob" from which the user may choose.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=3/122012, time=7 pm, party size=5}, the task flow processor 336 may perform the steps of: (1) logging onto a server of the ABC Café or a restaurant reservation system that is configured to accept reservations for multiple restaurants, such as the ABC Café, (2) entering the date, time, and party size information in a form on the website, (3) submitting the form, and (4) making a calendar entry for the reservation in the user's calendar.

In some embodiments, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device, and invoke or interact with third party services (e.g. a restaurant reservation portal, a social networking website, a banking portal, etc.). In some embodiments, the protocols and application programming interfaces (API) required by each service can be specified by a respective service model among the services models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by the task flow processor 336, the service processor 338 can establish a network connection with the online reservation service using the web address stored in the service models 356, and send the necessary parameters of the reservation (e.g., time, date, party size) to the online reservation interface in a format according to the API of the online reservation service.

As explained above, in some embodiments, the one or more default domains 372 include one or more private domains. In some embodiments, the one or more private domains include a domain that corresponds to a task that does not require an external service (e.g., external service 120 in FIG. 1). In some embodiments, the one or more private domains include a domain that corresponds to a default service provider (e.g., a private domain corresponds to a task that requires an external service from the default service provider). For example, a private domain may include a calendar service domain that is used for storing and/or retrieving a calendar event, and the calendar service domain corresponds to a task that requires calendar event storing and/or retrieving services from a default calendar service provider. In some embodiments, a private domain is owned by a developer of the device or the digital assistant 326 (e.g., APPLE Inc.). Thus, user interfaces and content are both under control of the developer of the device or the digital assistant 326.

As explained above, in some embodiments, the one or more third party domains 374 include one or more public domains. In some embodiments, the one or more public domains are developed by a developer of the device or the digital assistant 326, whereas content is provided from a third party.

In some embodiments, the one or more third party domains 374 include one or more developer domains. In some embodiments, both a public domain and a developer domain correspond to tasks that require an external service from one or more third party service providers. As used herein, a third party service provider is a service provider other than a default service provider. In some embodiments, a public domain is not developed by a third party service provider (e.g., a public domain developed by a manufacturer of the device based on information available from a third party service provider). In some embodiments, a developer domain is developed by a third party service provider. In some embodiments, a developer domain corresponds to a task flow model 354 developed by a third party service provider and/or a dialogue flow model developed by a third party service provider for processing by the dialogue flow processing module 334 (FIG. 3B). In some embodiments, the developer domain is stored at a server of a third party service provider (e.g., external services 120).

In some embodiments, the natural language processor 332, dialogue flow processing module 334, and task flow processor 336 are used collectively and iteratively to deduce and define the user's intent, obtain information to further clarify and refine the user intent, and finally generate a response (e.g., provide an output to the user, or complete a task) to fulfill the user's intent.

In some embodiments, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some embodiments, the digital assistant also requests the user to indicate whether the user is satisfied with the response produced by the digital assistant 326.

Figure 4A:
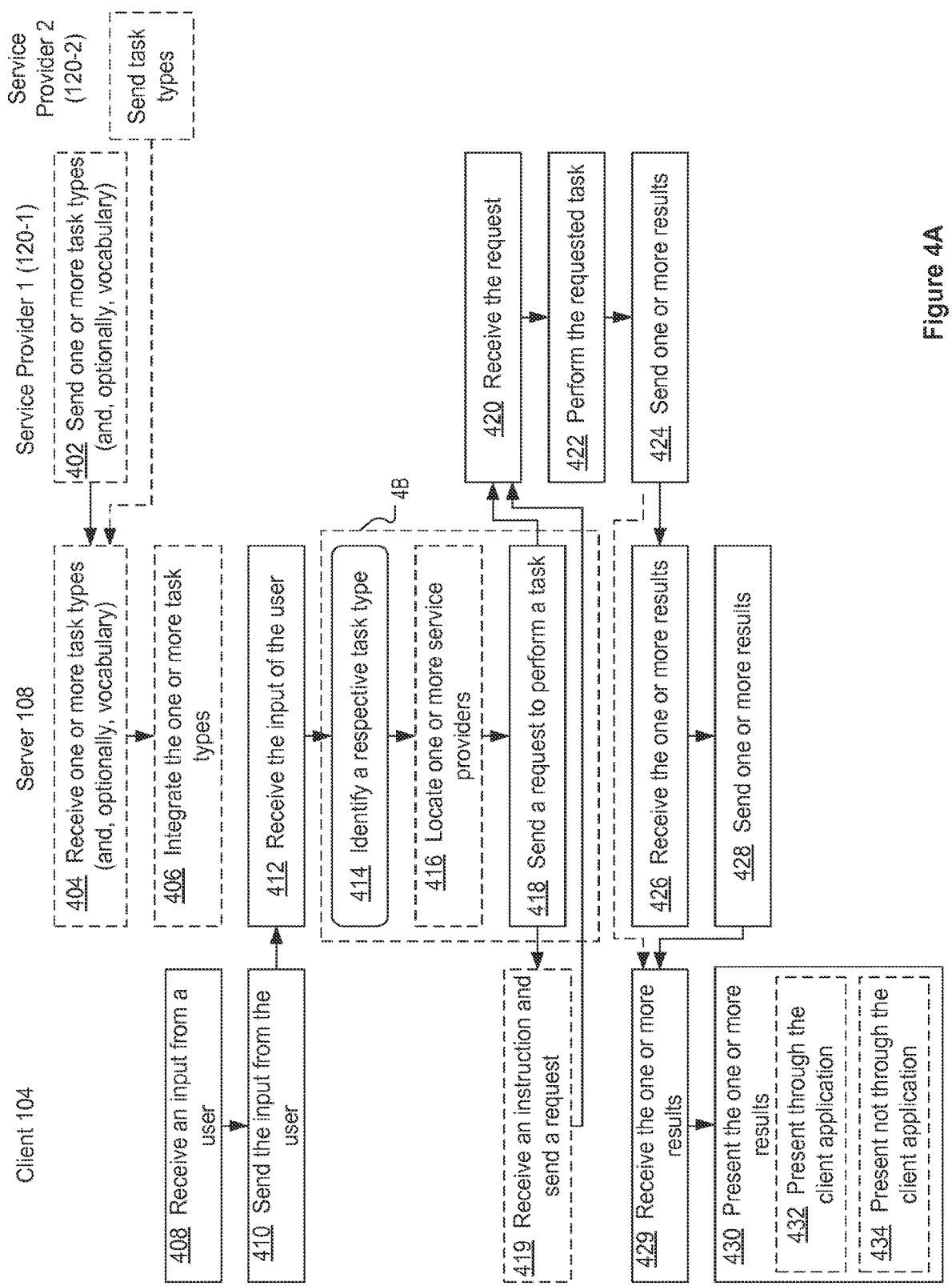
FIGS. 4A-4B are flow charts illustrating operations performed by a client system, a server system, and a service provider system in accordance with some embodiments.
Figure 4B:
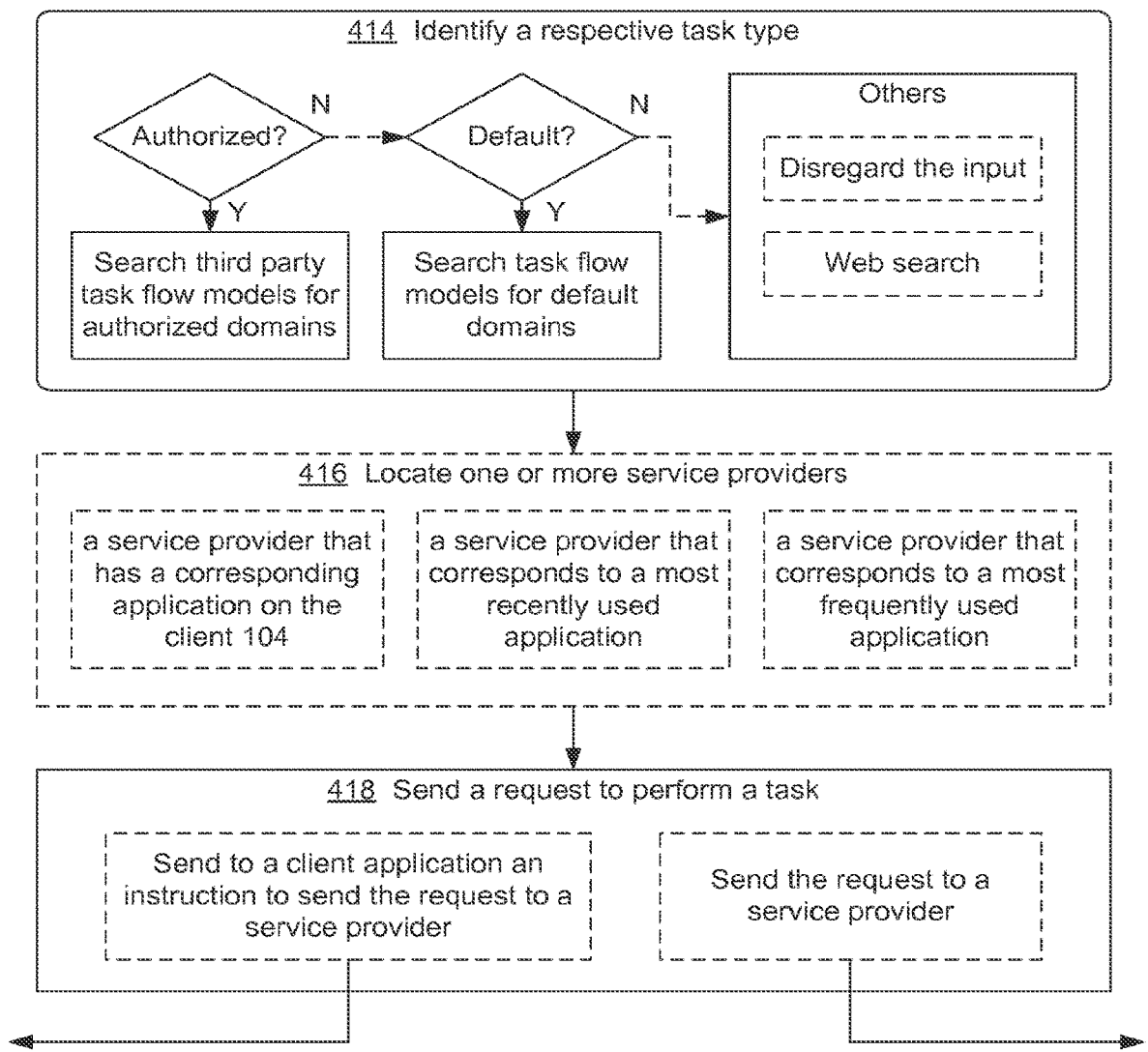

FIGS. 4A-4B are flow diagrams illustrating exemplary operations undertaken by a DA server, a DA client, and a service provider (e.g., the server system 108, the user device 104a, and a messaging service 122-2 in FIG. 1). These operations are merely exemplary and fewer or less other interactions may be performed by the DA server, the DA client, and service provider(s) in various embodiments.

In some embodiments, the service provider (e.g., Service Provider 1(120-1)) sends (402) one or more task types (e.g., "make a restaurant reservation" and/or "find a match score") to the DA server. In some embodiments, the one or more task types identify one or more task types supported by the service provider. In some embodiments, the service provider sends a vocabulary or an identification of a vocabulary. In some embodiments, the service provider sends domain information (e.g., a data model as illustrated in FIG. 3C) regarding at least one of the one or more task types. In some embodiments, the service provider sends two or more of: the one or more task types, the vocabulary or the identification of the vocabulary, and the domain information.

Typically, a third party service provider and the digital assistant system 300 are not owned by a same person or entity. For example, the digital assistant system 300 is owned by Applicant, APPLE Inc., while the third party service provider is a server owned by a restaurant reservation service provider (e.g., OPENTABLE, Inc.).

In some embodiments, the DA server receives (404) and integrates (406) the one or more task types into the task flow models 354 (e.g., as one or more third party task flow models in the third party task flow models 382). As described above with reference to FIG. 3A, in some embodiments, the task flow models 354 include the third party task flow models 382 and the default task flow models 380, which are not received from a third party service provider. In some embodiments, the task flow models 354 already include existing third party task flow models, and the DA server stores the received one or more task types with the existing third party task flow models. In some embodiments, the DA server performs a task corresponding to a task flow model in the third party task flow models 382. For example, when the digital assistant system 300 (FIG. 3A) is configured to support making restaurant reservations by default (i.e., not using task flow models provided by third party service provider systems), the default task flow models 380 include task flow models for making restaurant reservations. Continuing with the example, when the digital assistant system 300 is configured to provide sports scores based on third party domains 374, the third party task flow models 382 include a flow model for retrieving sports scores (e.g., retrieving sports scores from the Service Provider 1).

In some embodiments, the DA server receives and integrates the vocabulary or the identification of the vocabulary into the vocabulary 344 (e.g., the third party vocabulary 378). As described above with reference to FIG. 3A, in some embodiments, the vocabulary 344 includes the third party vocabulary 378 (or a third party vocabulary index) and the default vocabulary 376 (or a default vocabulary index), which is not received from a third party service provider. For example, in some embodiments, when the digital assistant system 300 (FIG. 3A) is configured to support making restaurant reservations by default (i.e., not using ontology data or vocabulary provided by third party service provider systems), the one or more default vocabulary indices 376 include terms related to making restaurant reservations, such as "restaurant," "reservation," and "party size." In some embodiments, each of these terms is separately affiliated with a list of synonyms. In some embodiments, the default vocabulary 376 also includes restaurant names and/or restaurant locations (e.g., street names). In comparison, the one or more third party vocabulary indices 378, when the digital assistant system 300 is configured to provide sports scores based on third party domains 374, include terms related to sports, such as types of sports (e.g., baseball, basketball, football, soccer, etc.), names of players and teams, and locations of sports events.

Similarly, in some embodiments, the DA server receives and integrates the domain information into the ontology 360 (e.g., the third party domain 374). As described above with reference to FIG. 3A, in some embodiments, the ontology 360 includes the third party domain 374 and the default domains 370 (e.g., the restaurant reservation domain 362 and the reminder domain 364, FIG. 3C), which are not received from a third party service provider. Typically, the one or more third party domains 374 correspond to one or more task types that do not correspond to the default domains 372. For example, in some embodiments, the default domains 372 do not correspond to retrieving sports scores, but one or more third party domains 374 include a "sports scores" domain for addressing sports score queries from users.

In some embodiments, in response to receiving the one or more task types and/or the domain information, the DA server updates the service provider directory 390 and/or the supported tasks 392. The service provider directory 390 typically includes a list of third party service providers that the DA server has access to. The supported tasks 392 typically include a list of task types supported by respective third party service providers and/or a list of third party service providers that support respective task types. For example, the DA server adds the Service Provider 1 to the service provider directory 390 and lists task types supported by the Service Provider 1 in the supported tasks 392 in connection with the Service Provider 1.

In some embodiments, at least one of the one or more third party domains 374 (or information for the one or more third party domains 374) is provided that is location specific. For example, in some embodiments, when the DA client 104 approaches or enters a particular hotel, the hotel's service provider system automatically provides a domain relevant to that hotel to the digital assistant system 300. In some embodiments, the digital assistant system 300 automatically receives the domain relevant to that hotel. In other embodiments, the digital assistant system 300 asks the user whether the user wants to receive the local domain (e.g., the domain relevant to that hotel). In some embodiments, the at least one domain provided by the hotel's service provider system includes tasks or task types related to that particular hotel (e.g., finding room rates, locating restaurant facilities in the hotel, etc.).

In some embodiments, the DA client 104 generates a voice output with a voice having a first set of voice characteristics for tasks associated with default domains 372 and generates a voice output with a voice having a second set of voice characteristics for tasks associated with third party domains 374. For example, the DA client 104 may generate a voice output with a certain female voice for tasks associated with the default domains 372, and generate a voice output with a certain male voice for tasks associated with a third party domain 374. Voice characteristics may include one or more of pitch, speed, and volume, and/or characteristics typical to a particular group of speakers classified based on, for example, gender (e.g., male or female), age (e.g., adult or child), and accents. In some embodiments, respective third party domains are associated with respective voices having respective sets of voice characteristics. For example, a first third party domain may be associated with a voice having a third set of voice characteristics and a second third party domain may be associated with a voice having a fourth set of voice characteristics. For example, a high-end hotel chain may have a domain associated with a refined accent.

In some embodiments, when the DA client 104 moves away from a predefined location, the DA client automatically removes one or more domains associated with the predefined location. For example, when the DA client 104 moves away from the hotel, the DA client automatically removes one or more domains provided by the hotel's service provider system. In some other embodiments, the DA client retains a predefined number of recently used third party domains (e.g., before receiving a new third party domain, the DA client removes a third party domain stored in the DA client that was used last, also known as the first-in-first-out (FIFO)). In some embodiments, the DA client removes a third party domain based on a frequency of use (e.g., removes a domain that is least frequently used) instead of the time of last use. In yet other embodiments, the DA server asks the DA client whether it wants to remove the one or more domains provided by the hotel's server provider system. In some embodiments, a list of the one or more third party domains 374 available to the DA client is stored in the DA server, and based on the response from the DA client, the DA server removes one or more third party domains from the list. In other embodiments, the list of the one or more third party domains 374 available to the DA client is stored on the DA client, and the DA client removes one or more third party domains from the list.

While these operations (e.g., the operations 402, 404, and 406) are typically performed before a user provides an input (i.e., prior to receiving an input from a user) that would initiate the particular task, these may also be performed in real time after a user provides input.

In some embodiments, another service provider (e.g., Service Provider 2 (120-2)) also sends task types supported by that service provider to the DA server, and the DA server integrates these into the task flow models 354 and/or the service provider directory 390, as described above. However, until the server 108 identifies a task type corresponding to that service provider, the server 108 typically does not send a request to that service provider.

At anytime thereafter, the DA client receives (408) an input (e.g., a voice input) from the user. In some embodiments, the DA client receives the input through one or more microphones. For example, the DA client may receive a voice command of the user, such as "book a restaurant at 7 pm." In some embodiments, the DA client receives the input through a touch-sensitive surface. The DA client sends (410) the input from the user to the DA server, and may also send contextual information, such as the location of the DA client.

The DA server receives (412) the input of the user, and identifies (414) a respective task type as described below in reference to FIG. 4B. In some embodiments, when the input of the user is a voice command, the DA server receives the input as an audio file (or as a string of text corresponding to the speech if the DA client includes a text-to-speech engine). As described above with reference to FIG. 3B, in some embodiments, the DA server uses the digital assistant 326 (FIG. 3B) to identify the respective task type. For example, the DA server may determine from the input of the user that the user wants to make a restaurant reservation (i.e., identify "making a restaurant reservation" as a requested task type). For example, when the user input is "book a restaurant tonight," the identified task type is a restaurant reservation that corresponds to at least one restaurant reservation service provider, and when the user input is "what is the latest Giants' score," the identified task type is retrieving sports scores.

In some embodiments, the device identifies the respective task type in accordance with a vocabulary (or an identification of a vocabulary, such as associating an existing vocabulary with a new task or domain) received from the third party service provider. For example, after receiving an inquiry from the user, "where is Jeremy Lin playing today," the device may determine that the term, Jeremy Lin, matches an entry in a third party vocabulary index from a sports game schedule service provider as an athlete's name, and identify that retrieving a location of a sports game is the requested task. Similarly, after receiving an inquiry from the user, "where is the Hunger Games playing today," the device may determine that the term, the Hunger Games, matches an entry in a third party vocabulary index from a movie schedule/ticketing service provider as a movie title, and identify that retrieving a location of the movie screening is the requested task.

In some embodiments, the DA server locates (416) one or more service providers that can perform the identified task type. In some embodiments, the DA server locates the one or more service providers that can perform the identified task type in accordance with information in the service provider directory 390 and/or the list of supported tasks or competencies 392. By using competencies, the DA server can more efficiently identify service providers that are suitable for an identified task type. For example, two restaurant reservation service providers (e.g., a first restaurant reservation service provider and a second restaurant reservation service provider) may have one or more supported task types including making restaurant reservations, indicating that the two restaurant reservation service providers can provide restaurant reservation services. In another example, one or more supported task types associated with a particular service provider may include "sports schedules," indicating that the particular service provider can provide information about sports game schedules.

In some embodiments, when the DA server locates two or more service providers that can perform the identified task type, the DA server selects one of the two or more service providers. In some other embodiments, the DA server selects multiple service providers of the two or more service providers. In some embodiments, the DA server sends (418) a request to the one or more selected service providers, typically one service provider, to perform a task of the identified task type. Alternatively, in other embodiments, the DA server sends the request to the DA client 104, and the DA client receives the request and sends (419) the request to the one or more selected service providers. In some embodiments, the respective service provider is configured to complete the task. In some other embodiments, the task requires multiple service providers. For example, the task may be "buy tickets for a most popular movie starring actor X." Performing this task may require receiving information from, or performing a task with, a movie ranking service provider, a movie database service provider, and a movie ticket purchase service provider. In other words, each service provider performs a portion of the task, and the device integrates information from multiple selected service providers.

In some embodiments, the DA server locates one or more default service providers that correspond to private domains and one or more third party service providers, both the one or more default service providers and the one or more third party service providers capable of performing the identified task type, and selects one or more default service providers.

The service provider then receives (420) the request, performs (422) the requested task, and sends (424) one or more results relating to the performance of the requested task to the DA server 108.

The DA server 108 receives (426) the one or more results from the service provider, and sends (428) one or more of the one or more results to the DA client 104.

Alternatively, the service provider sends the one or more results directly back to the client 104 (shown by broken arrow between 424 and 429).

The DA client 104 receives (429) the one or more results, and presents (430) the one or more received results to the user (e.g., as an audio output or a visual display). In some embodiments, the DA client 104 presents (432) at least a portion of the one or more received results to the user through a user interface of a software application (e.g., 270-1 or 270-2, FIG. 2) other than the digital assistant client module 264. In some embodiments, the DA client 104 presents (434) at least a portion of the one or more received results to the user not through a user interface of a software application other than the digital assistant client module 264 (e.g., through a user interface of the digital assistant client module 264 or through an audio interface not associated with any particular software application). In some embodiments, the DA client 104 outputs speech of the one or more received results.

FIG. 4B is a flow diagram providing additional details of certain operations illustrated in FIG. 4A.

In some embodiments, identifying (414) a respective task type includes determining whether the user is authorized to use services of one or more third party service providers. In some embodiments, the user is deemed to be authorized for a particular third party service provider when the user is authorized to use a software application associated with the particular third party service provider. For example, if the user has bought an application for a particular service provider (e.g., a restaurant rating service provider), then the user is deemed to be authorized to use services of the particular service provider (and corresponding third party domains 374). If the user is authorized for the one or more third party service providers, the DA server searches the domains (e.g., one or more third party domains 374) in the ontology 360. Once the DA server identifies a relevant domain, the DA server uses an appropriate task flow model associated with the relevant domain (and corresponding to the one or more authorized third party service providers).

In some embodiments, the DA server identifies one or more private domains (e.g., default domains 372) and one or more third party domains (e.g., third party domains 374) and uses an appropriate task flow model associated with a private domain. In other words, in some embodiments, the DA server selects a private domain over a third party domain when both the private domain and the third party domain correspond to the input.

In some embodiments, if the user is not authorized for the one or more third party service providers, or if no authorized third party domain corresponds to the input of the user, the DA server determines whether to search default domains. For example, the DA server determines whether the default domains include a domain that corresponds to the input of the user. If the DA server determines to search the default domains (e.g., the DA server determines that the default domains include a domain that corresponds to the input of the user), the DA server searches the default domains to identify a respective default task flow model that corresponds to the input of the user, and processes the respective default task flow model.

In some embodiments, if the DA server determines not to search the default domains, or if no default domain corresponds to the input of the user, the DA server may perform other actions, such as searching a search engine or a knowledge engine or disregarding the input.

In some embodiments, if the DA server determines not to punt the input of the user, the DA server disregards the input.

In some embodiments, the DA server 108 communicates with the DA client 104. In some embodiments, the DA client 104 stores in the memory 250 one or more software applications 270-1 and 270-2 that corresponds to third party service providers (e.g., ZAGAT software application and YELP application that correspond to different restaurant review providers). As explained above, in some embodiments, the DA server includes the user application data 340.

In some embodiments, the DA server 340 selects a service provider based on one or more software applications that the user is authorized to use, as explained in detail below. In some embodiments, locating (416) the one or more service providers includes locating a third party service provider for which a corresponding application is stored in the DA client (FIG. 1). For example, the digital assistant system 300 may have access to a plurality of restaurant review providers. This is based on an assumption that the user of the DA client 104 is interested in receiving information from the third party service provider, because the user of the DA client 104 chose to store (e.g., install) the corresponding application on the DA client 104. In some embodiments, when the DA client 104 is authorized to use the ZAGAT software application but not the MICHELIN GUIDE application, the DA server selects ZAGAT as a restaurant review provider, and sends a request for restaurant reviews to a ZAGAT server. One reasoning is that the user of the DA client 104 is assumed to have a preference for the ZAGAT restaurant reviews, because the user is authorized to use the ZAGAT software application, but not the MICHELIN GUIDE application.

Although the above example describes the DA client 104 having the software application corresponding to the service provider system, in some embodiments, the DA client 104 need not store the software application corresponding to the service provider system. For example, the user may have purchased the software application, but have not yet downloaded or installed the software application on the DA client 104, or the user may have installed the software application on another DA client owned by the user. Alternatively, the user may have an existing account (e.g., a subscription or a license) with the service provider system. In some embodiments, the user application data 340 identifies one or more software applications the user is authorized to use. In some embodiments, the user application data 340 also identifies one or more service providers that correspond to the one or more software applications the user is authorized to use (e.g., websites or company names associated with the one or more software applications). In some embodiments, the user application data 340 identifies one or more service providers that the user is authorized to use other than default service providers (e.g., service providers all users of the digital assistant system 300 are authorized to use).

In some embodiments, the digital assistant system 300 has access to two or more service provider systems that support a same task type. For example, the two or more service provider systems may be configured to perform tasks of the same task type (e.g., both ZAGAT and YELP for providing restaurant reviews).

In some embodiments, locating (416) the one or more service providers includes locating a service provider that corresponds to a software application that the user has purchased (e.g., ZAGAT over YELP). In some embodiments, locating (416) the one or more service providers includes locating a third party service provider that corresponds to a most recently used application. In some embodiments, locating (416) the one or more service providers includes locating a third party service provider that corresponds to a most frequently used application.

In some embodiments, locating (416) the one or more service providers include multiple service providers. For example, the DA server may select ZAGAT and YELP out of three restaurant review providers, ZAGAT, YELP, and MICHELIN GUIDE, and combine results provided by both ZAGAT and YELP. Alternatively, the DA server may ask the user to choose a preference between ZAGAT and YELP. In some embodiments, the DA server stores the user preference (e.g., in the user data 348). For example, the user may choose to allow certain service providers to provide results to the user. Additionally, or alternatively, the user may choose to block some other service providers from providing results to the user. In some embodiments, the user selects a number of times a particular provider is permitted to provide results (e.g., once per day). In some embodiments, the user selects a number of results a particular provider is permitted to provide in response to each input.

In some embodiments, locating (416) the one or more service providers includes selecting one or more service providers based on an identity of the user. For example, when two news service providers ("XYZ News" and "XYZ Kids") are located, a news service provider is selected based on the identity of the user (e.g., if the user is an adult, select "XYZ News" that is designed for adults, and if the user is a child, select "XYZ Kids" that is designed for children). In some embodiments, the identity of the user is determined from a user profile stored in the device. In some embodiments, the identity of the user is determined from one or more recently used applications, time of day, types of inputs, etc.

In some embodiments, sending (418) a request to perform a task includes sending the request to one or more selected service providers. In turn, the DA server receives (426) the one or more results from one or more of the one or more selected service providers. For example, in some embodiments, the DA server sends the request to multiple service providers (e.g., multiple airlines for ticket pricing) and receives results from a subset of the multiple service providers (e.g., during a predefined time period). This allows the DA server to utilize results provided by those service providers that respond quickly, and avoid unacceptable delays, in waiting for the results, that degrade the user experience.

Then, the DA server sends (428) one or more of the one or more results to the DA client 104 for presentation (e.g., visual or audio) to the user. The DA client 104 receives the one or more results sent by the DA server, and presents (430) at least a portion of the one or more results to the user.

In some embodiments, sending (418) the request includes sending to a third party software application stored in the DA client an instruction to send the request to one or more service providers (e.g., including one or more third party service providers). In turn, the DA client, in response to receiving the instruction from the DA server, sends the request to one or more service providers. Then, the DA client receives one or more results from one or more of the one or more service providers, and presents (430) at least a portion of the one or more results to the client.

In some embodiments, the DA client presents the results through the third party software application stored in the DA client (e.g., the results are displayed in the user interface of the third party software application). For example, the results from the ZAGAT service provider are presented on the user interface of the ZAGAT application stored on the DA client. In some embodiments, the DA client presents the results not through the third party software application (e.g., the results are displayed in the user interface of the digital assistant client module 264, FIG. 2). For example, the results from the ZAGAT service provider are presented on the user interface of the digital assistant client module 264.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing a user input for speech recognition, the method performed at an electronic device with one or more processors and memory, the method comprising:
   at the electronic device:
   identifying a location of a portable electronic device associated with a user;
   receiving a domain corresponding to the location of the portable electronic device associated with the user from a service provider, wherein the domain includes a plurality of actionable intent nodes and property nodes;
   identifying the domain corresponding to the location of the portable electronic device associated with the user;
   receiving an input of the user;
   in accordance with the input, identifying a respective task type corresponding to the domain; and,
   in response to identifying the respective task type, sending a request, associated with the input, to perform at least a portion of a task to the service provider associated with the domain.

2. The method of claim 1, further comprising receiving the domain from the service provider prior to identifying the location of the portable electronic device.

3. The method of claim 1, further comprising receiving at least one task flow model from the service provider prior to identifying the location of the portable electronic device.

4. The method of claim 1, further comprising, receiving at least an identification of a vocabulary from the service provider prior to identifying the location of the portable electronic device.

5. The method of claim 1, further comprising, associating the domain with the portable electronic device.

6. The method of claim 5, further comprising:
   identifying an updated location of the portable electronic device;
   determining that the updated location no longer corresponds to the domain; and,
   in accordance with the determination, dissociating the domain from the portable electronic device.

7. The method of claim 6, further comprising:
   after dissociating the domain from the portable electronic device:
   receiving a second input of the user;
   in accordance with the second input, identifying a task type that does not correspond to the domain; and,
   in response to identifying the task type, sending a request, associated with the input, to perform at least a portion of a task to a service provider other than the service provider.

8. The method of claim 1, wherein the input is a voice input of the user that has been converted to text.

9. The method of claim 1, wherein the domain further includes a sub-property node.

10. The method of claim 9, wherein a property node of the domain is shared with another domain.

11. The method of claim 9, wherein the respective task type is determined based on an activated actionable intent node of the domain.

12. An electronic device comprising:
   one or more processors;
   a memory; and
   one or more programs for speech processing, wherein the one or more programs are stored in the memory and configured to be executed by the one or more processors, the one or more programs including instructions for:
   identifying a location of a portable electronic device associated with a user;
   receiving a domain corresponding to the location of the portable electronic device associated with the user from a service provider, wherein the domain includes a plurality of actionable intent nodes and property nodes;
   identifying the domain corresponding to the location of the portable electronic device associated with the user;
   receiving an input of the user;
   in accordance with the input, identifying a respective task type corresponding to the domain; and,
   in response to identifying the respective task type, sending a request, associated with the input, to perform at least a portion of a task to the service provider associated with the domain.

13. The electronic device of claim 12, wherein the one or more programs further include instructions for:
   receiving the domain from the service provider prior to identifying the location of the portable electronic device.

14. The electronic device of claim 12, wherein the one or more programs further include instructions for:
   receiving at least one task flow model from the service provider prior to identifying the location of the portable electronic device.

15. The electronic device of claim 12, wherein the one or more programs further include instructions for:
receiving at least an identification of a vocabulary from the service provider prior to identifying the location of the portable electronic device.

16. The electronic device of claim 12, wherein the one or more programs further include instructions for:
associating the domain with the portable electronic device.

17. The electronic device of claim 16, wherein the one or more programs further include instructions for:
identifying an updated location of the portable electronic device;
determining that the updated location no longer corresponds to the domain; and,
in accordance with the determination, dissociating the domain from the portable electronic device.

18. The electronic device of claim 17, wherein the one or more programs further include instructions for:
after dissociating the domain from the portable electronic device:
receiving a second input of the user;
in accordance with the second input, identifying a task type that does not correspond to the domain; and,
in response to identifying the task type, sending a request, associated with the input, to perform at least a portion of a task to a service provider other than the service provider.

19. The electronic device of claim 12, wherein the input is a voice input of the user that has been converted to text.

20. The electronic device of claim 12, wherein the domain further includes a sub-property node.

21. The electronic device of claim 20, wherein a property node of the domain is shared with another domain.

22. The electronic device of claim 20, wherein the respective task type is determined based on an activated actionable intent node of the domain.

23. A non-transitory computer-readable storage medium storing one or more programs for speech recognition configured to be executed by one or more processors of an electronic device, the one or more programs including instructions for:
identifying a location of a portable electronic device associated with a user;
receiving a domain corresponding to the location of the portable electronic device associated with the user from a service provider, wherein the domain includes a plurality of actionable intents and property nodes;
identifying the domain corresponding to the location of the portable electronic device associated with the user;
receiving an input of the user;
in accordance with the input, identifying a respective task type corresponding to the domain; and,
in response to identifying the respective task type, sending a request, associated with the input, to perform at least a portion of a task to the service provider associated with the domain.

24. The non-transitory computer-readable storage medium of claim 23, wherein the one or more programs further include instructions for:
receiving the domain from the service provider prior to identifying the location of the portable electronic device.

25. The non-transitory computer-readable storage medium of claim 23, wherein the one or more programs further include instructions for:
receiving at least one task flow model from the service provider prior to identifying the location of the portable electronic device.

26. The non-transitory computer-readable storage medium of claim 23, wherein the one or more programs further include instructions for:
receiving at least an identification of a vocabulary from the service provider prior to identifying the location of the portable electronic device.

27. The non-transitory computer-readable storage medium of claim 23, wherein the one or more programs further include instructions for:
associating the domain with the portable electronic device.

28. The non-transitory computer-readable storage medium of claim 27, wherein the one or more programs further include instructions for:
identifying an updated location of the portable electronic device;
determining that the updated location no longer corresponds to the domain; and,
in accordance with the determination, dissociating the domain from the portable electronic device.

29. The non-transitory computer-readable storage medium of claim 28, wherein the one or more programs further include instructions for:
after dissociating the domain from the portable electronic device:
receiving a second input of the user;
in accordance with the second input, identifying a task type that does not correspond to the domain; and,
in response to identifying the task type, sending a request, associated with the input, to perform at least a portion of a task to a service provider other than the service provider.

30. The non-transitory computer-readable storage medium of claim 23, wherein the input is a voice input of the user that has been converted to text.

31. The non-transitory computer-readable storage medium of claim 23, wherein the domain further includes a sub-property node.

32. The non-transitory computer-readable storage medium of claim 31, wherein a property node of the domain is shared with another domain.

33. The non-transitory computer-readable storage medium of claim 31, wherein the respective task type is determined based on an activated actionable intent node of the domain.

* * * * *